United States Patent [19]
Meeker

[11] Patent Number: 5,740,283
[45] Date of Patent: Apr. 14, 1998

[54] DIGITAL VIDEO COMPRESSION UTILIZING MIXED VECTOR AND SCALAR OUTPUTS

[75] Inventor: G. William Meeker, Silver Spring, Md.

[73] Assignee: Rubin, Bednarek & Associates, Inc., Washington, D.C.

[21] Appl. No.: 500,392

[22] Filed: Jul. 6, 1995

[51] Int. Cl.[6] .................................................... G06K 9/00
[52] U.S. Cl. ........................................... 382/248; 382/251
[58] Field of Search .................................. 382/236, 232, 382/235, 238, 239, 244, 245, 246, 247, 251, 252, 253, 248, 250, 249, 233; 348/595, 584, 578, 598, 705, 400, 403, 409, 415, 401, 402, 404, 405, 406, 407, 408, 418, 419, 420, 425; 358/426, 432, 433

[56] References Cited

U.S. PATENT DOCUMENTS

| | | | |
|---|---|---|---|
| 3,679,821 | 7/1972 | Schroeder | 348/401 |
| 4,463,386 | 7/1984 | Goddard et al. | 358/261 |
| 4,751,742 | 6/1988 | Meeker | 382/276 |
| 4,752,897 | 6/1988 | Zoeller et al. | 364/550 |
| 4,888,795 | 12/1989 | Ando et al. | 379/53 |
| 5,157,488 | 10/1992 | Rennebaker | 358/133 |

OTHER PUBLICATIONS

Recommendation, H.261—Video codec for audiovisual services at p x 64 kbit/s, CCITT Study Group XV, Geneva Meeting, Jul. 16–27, 1990, pp. 79–108, Report R37, Recomendations of the H–Series, Period 1989–1992, Com XV–R 37–E, Aug. 1990.

*Primary Examiner*—Leo Boudreau
*Assistant Examiner*—B. Tadayan
*Attorney, Agent, or Firm*—William L. Feeney; Kerkam, Stowell, Kondracki & Clarke, P.C.

[57] ABSTRACT

Interframe compression of moving image data is achieved by a combination of vector coding and scalar coding of transform coefficient differences formed by the subtraction of previous image transform coefficients from corresponding present image transform coefficients along a Zig-Zag path in the arrays of coefficients. More efficient scalar codes are used instead of vector codes for transmission of coefficient data where the previous image coefficients are non-zero along the path. Vector codes are used where a non-zero value in the previous image transform array has not been established but a non-zero value coefficient occurs in the present image transform array. Vector coding efficiency is improved by modified run length coding.

25 Claims, 43 Drawing Sheets

VIDEO DECODER

ENCODER AND DECODER

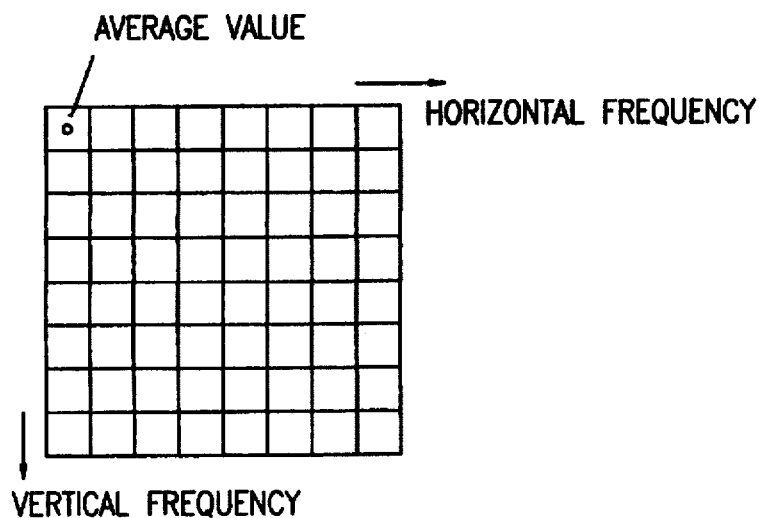
FIG. 3A
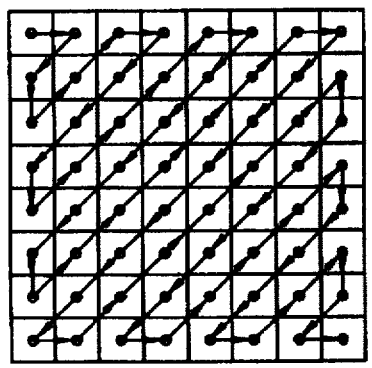
FIG. 3B
| -17 | 2 | -1 | 0 | 1 | 0 | 0 | 0 |
|---|---|---|---|---|---|---|---|
| 0 | 0 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
FIG. 3C

TOKEN ENCODING

TOKEN DECODING

QUANTIZATION PROCESSES

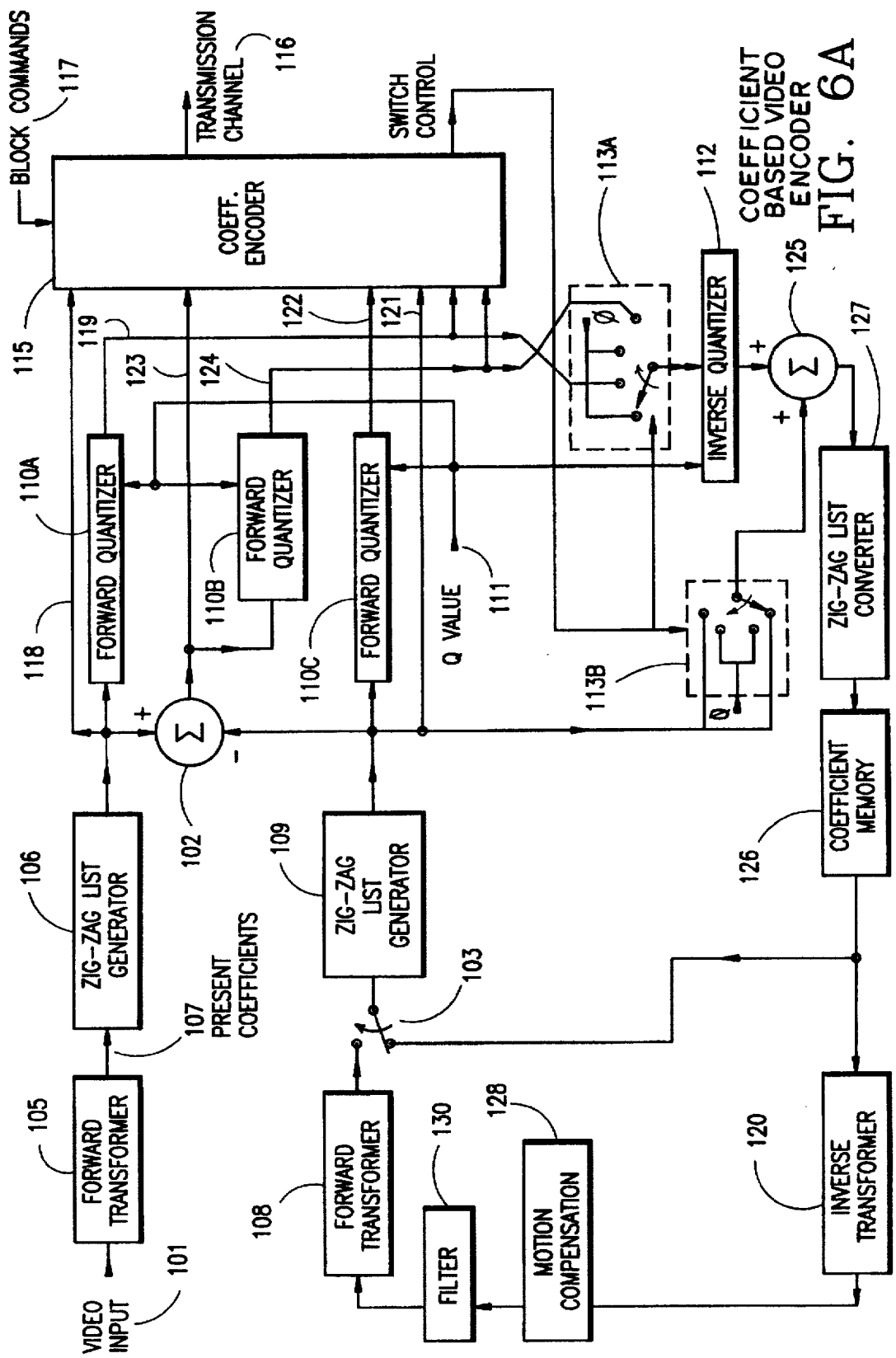

COEFFICIENT MODEL BASED VIDEO DECODER

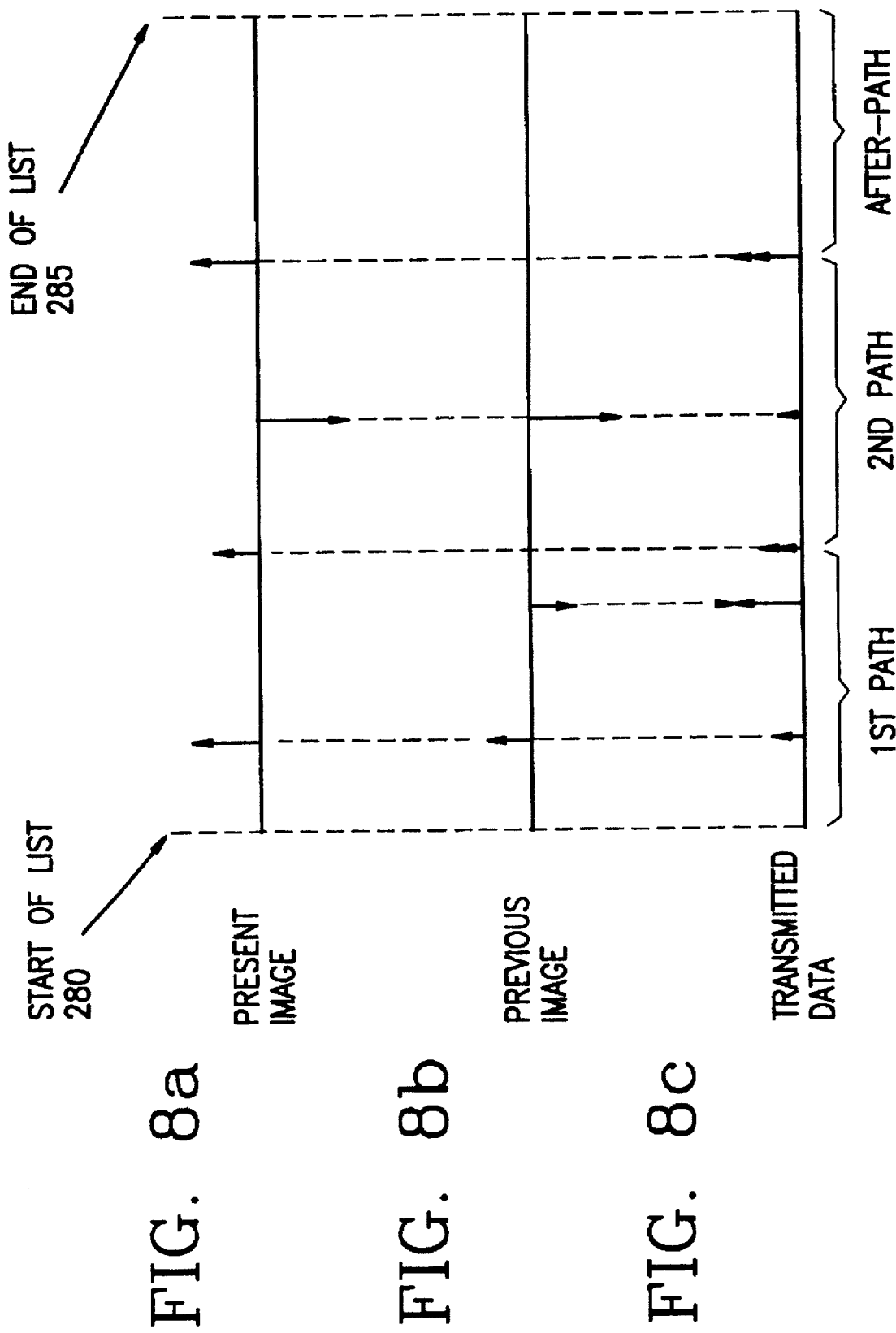

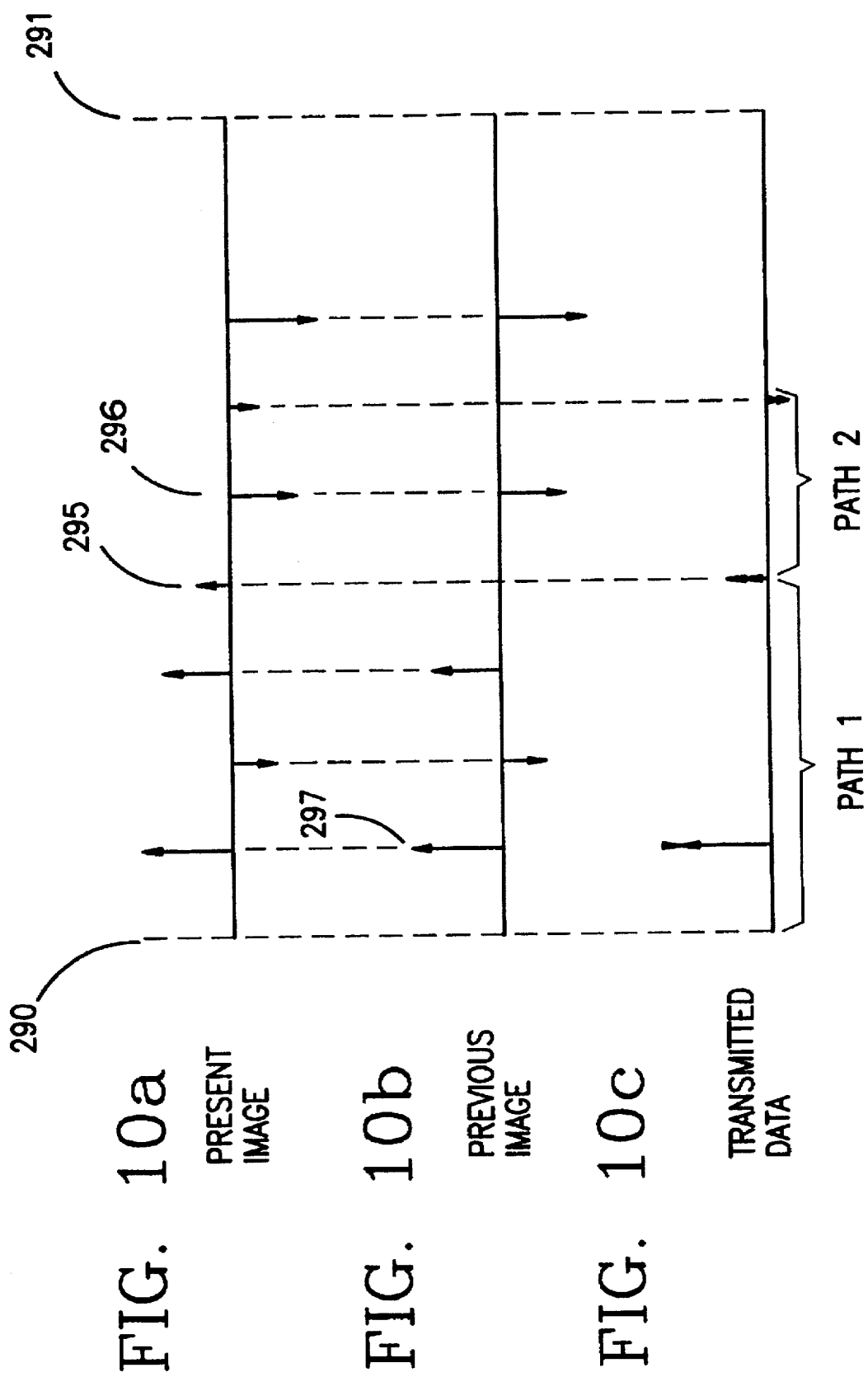

RUN-LENGTH DETERMINATION

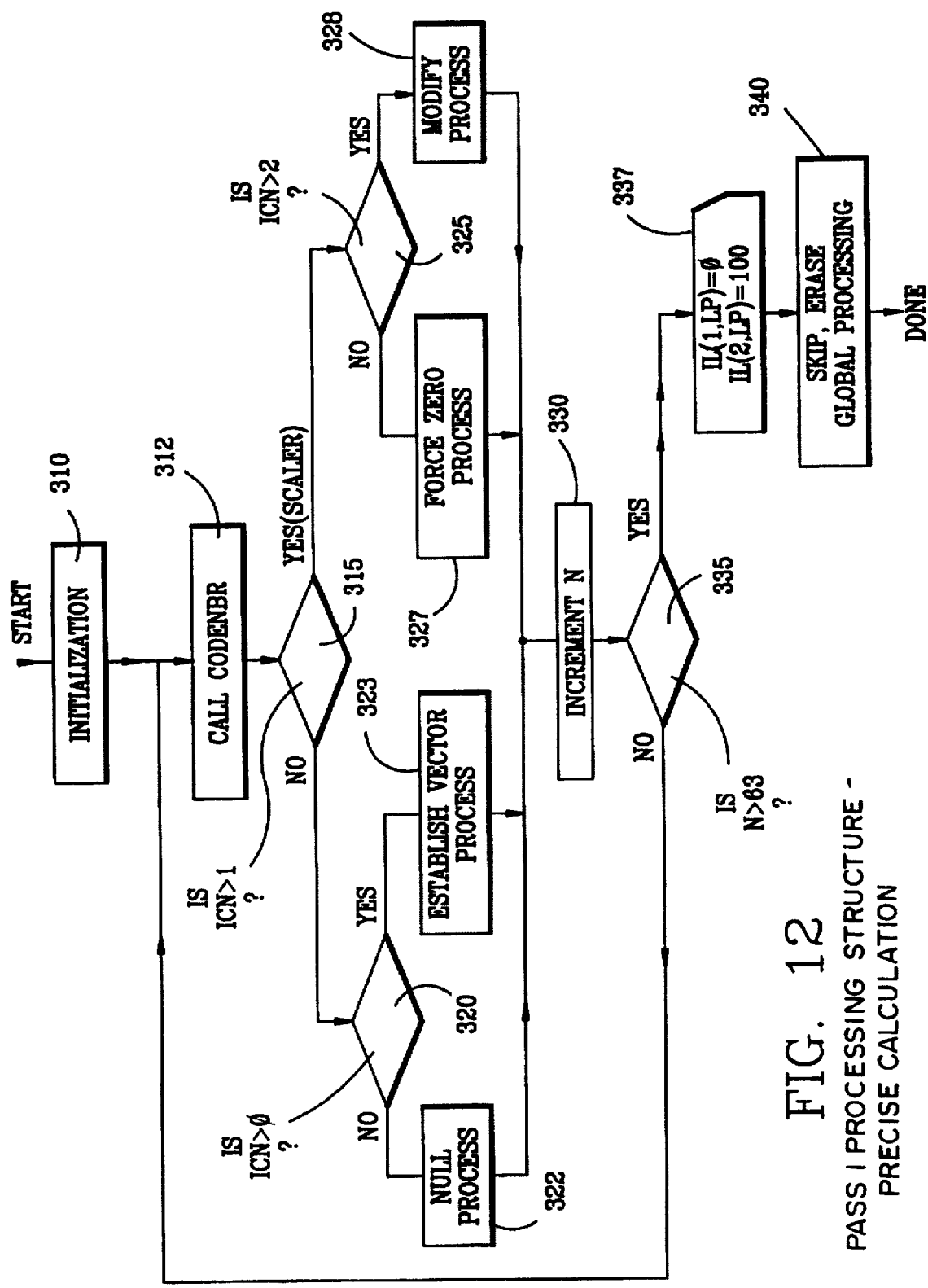
FIG. 12 PASS I PROCESSING STRUCTURE - PRECISE CALCULATION

MODIFY PROCESS

FORCE ZERO PROCESS

NULL PROCESS

ESTABLISH VECTOR PROCESS

SKIP, ERASE
GLOBAL PROCESSING

PASS 2 PROCESSING STRUCTURE—PRECISE CALCULATION CASE

EVECTORS

ESCALERS

LRPROC

POINT ERASE VECTOR

BACKWARD ERASE VECTOR

FORWARD ERASE VECTOR

EXAMPLE 1

EXAMPLE 2

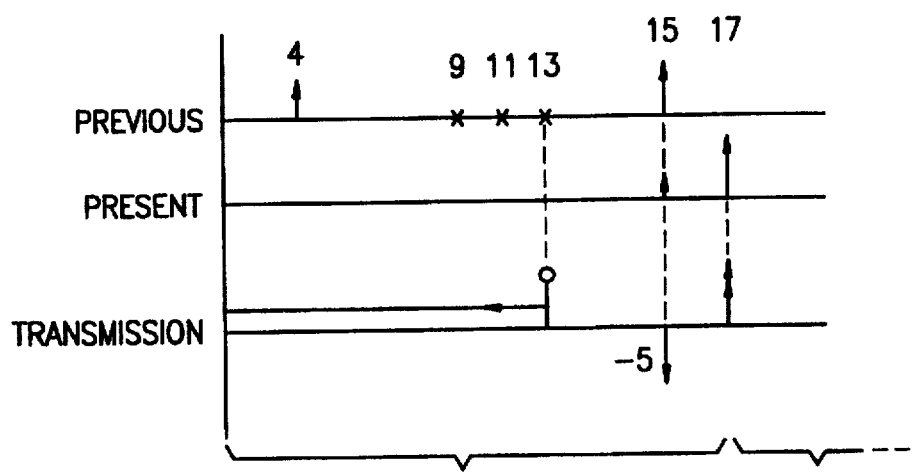
FIG. 19c  EXAMPLE 3
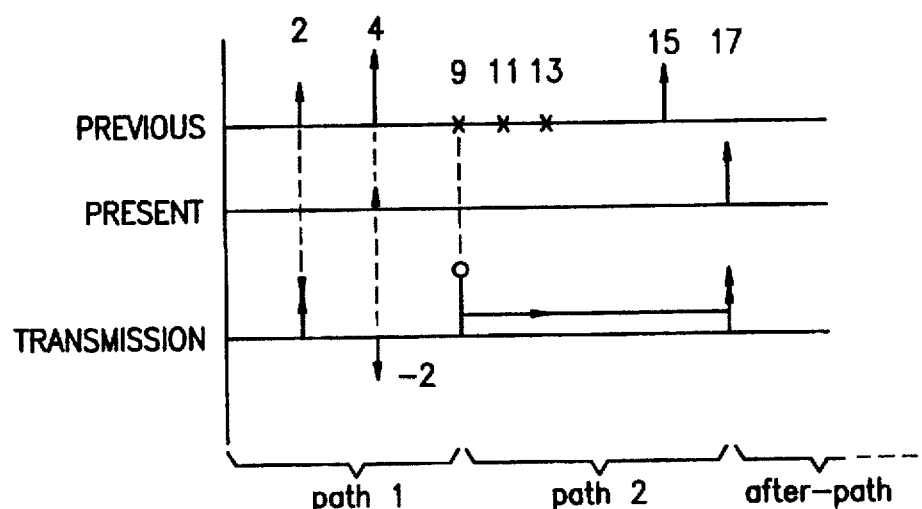
FIG. 19d  EXAMPLE 4
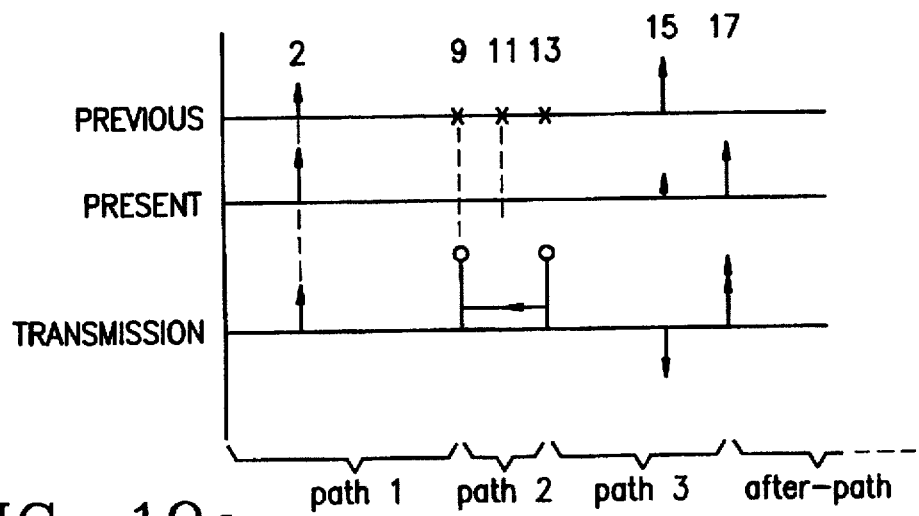
FIG. 19e  EXAMPLE 5

ENCODER MODIFICATIONS FOR NON-PRECISE CALCULATION CASE

VECTOR ERASE DETERMINATION

THRESHOLD DEVICE CHARACTERISTICS

PASS 1 PROCESSING STRUCTURE
NON-PRECISE CALCULATION

MODIFY PROCESS

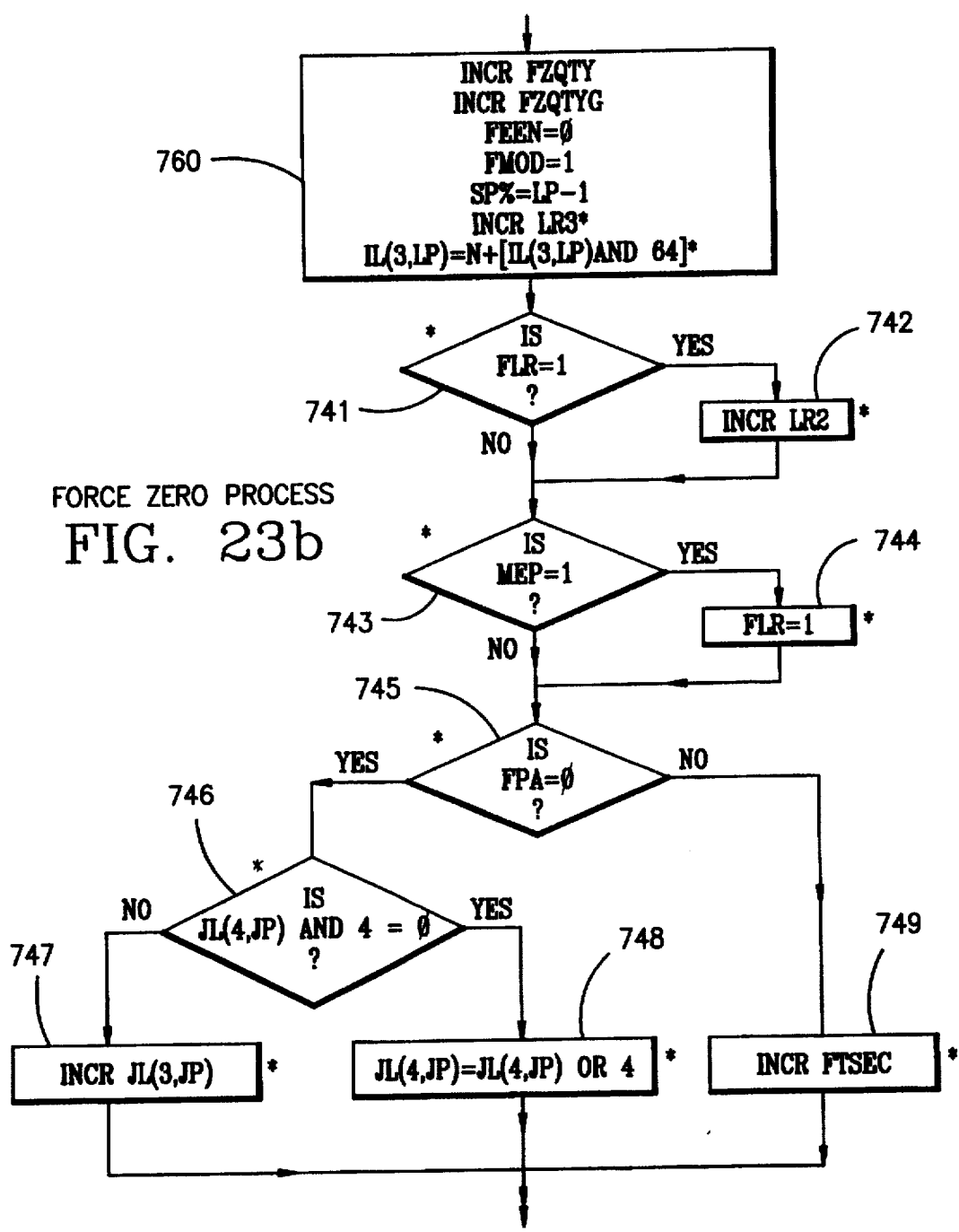
FORCE ZERO PROCESS
FIG. 23b
NULL PROCESS
FIG. 23c
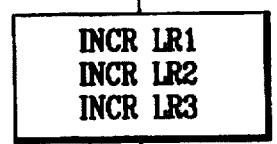

ESTABLISH VECTOR PROCESS

ERASE VECTOR PROCESS

PASS 2 PROCESSING STRUCTURE NON-PRECISE CASE

EVECTORS

EVECTORS, PART 2

ESCALERS — NON-PRECISE CALCULATION CASE

DECODER FLOW CHART
NON-PRECISE
CALCULATION
CASE

DSCALERS
NON-PRECISE CALCULATION CASE

LRPROC - NON-PRECISE CALCULATION CASE

DVECTORS1

DVECTORS2

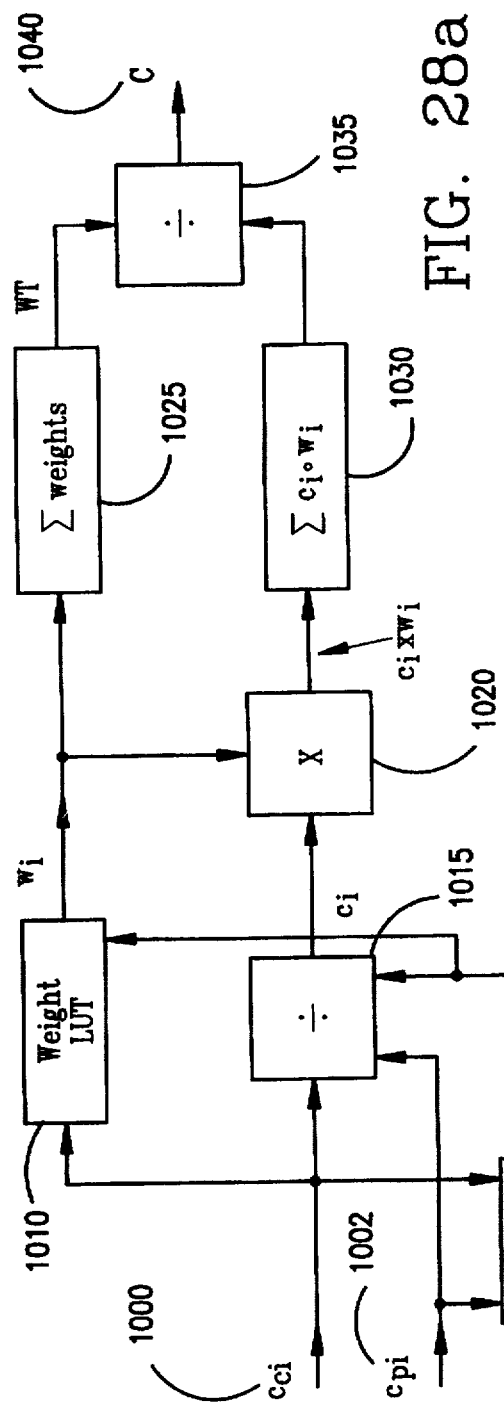
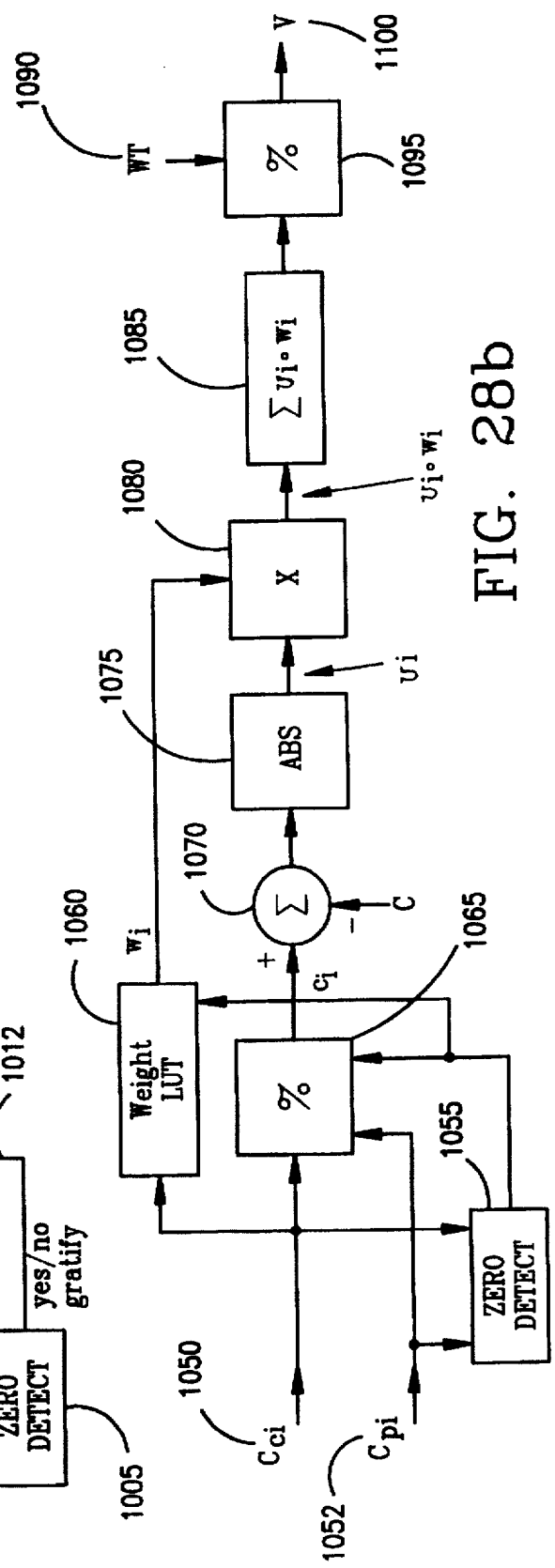
FIG. 28a
FIG. 28b

DIGITAL VIDEO COMPRESSION UTILIZING
MIXED VECTOR AND SCALAR OUTPUTS

TECHNICAL FIELD

This invention relates to the field of video processing and more particularly to the field of digital video compression.

BACKGROUND OF THE INVENTION

This invention addresses digital video compression, which involves processing of a digitized motion video signal to reduce the amount of data representing that signal to be stored and/or transmitted prior to reconstruction of a close replica of the original video signal at another time and/or another location. Through this compression the media capacity required for storage and/or transmission is reduced by a factor of about eight to 20 or more which in turn reduces media costs.

Video compression technology has developed substantially over approximately the last thirty years as has the integrated circuit capabilities necessary to implement it in hardware, and more recently in software. An important standard, the C.C.I.T.T. H.261 Standard for Audio-Visual Services, was written in the late 1980's and is now the basis for much of the video teleconferencing taking place. It in turn has been the basis for work by the Motion Picture Experts Group (MPEG), an IS0 committee, to evolve improved and specialized standards, MPEG1 and MPEG2 for computer applications and entertainment broadcasting among others.

Video compression systems utilize technology in three basic areas. The first is Motion Compensation prediction. This technique takes advantage of the principle that many portions of a new picture can be found in the preceding picture although sometimes at a somewhat different location in that picture due to camera movement or movement of objects in front of the camera. The motion compensation signal processing finds these like regions and uses the appropriate areas from the previous picture as an approximation, or prediction as it is called, of portions of the new picture. This process saves having to transmit data from transmitter to receiver which is already available at the receiver.

The second process is an image transformation process. The most popular transform among many which have been devised, is the Discrete Cosine Transform (DCT). The purpose of the transform is conversion to a spatial frequency domain wherein most of the resulting coefficient data have a value of zero, or values close enough to zero that an approximation of zero value will not cause unacceptable distortion when later reconstructed to a video signal. Also the non-zero value output data usually tends to be concentrated, fortuitously, in a few of the coefficients located near the zero frequency value. The transform process in and of itself does not produce any less output data than went into the transform process; however, the transformed data may subsequently be represented as variable length codes considerably more efficiently. Additionally, a quantization of the transformed coefficients permits still greater variable length coding efficiency. The quantization operation performed on transformed data is generally less noticeable in the reconstructed imagery than if made on the original data itself. Variable transform coefficient quantization adapts the number of bits per sample to be transmitted so as to accommodate a transmission channel of fixed data capacity, in bits per second.

The third process is that of the aforementioned variable length coding of the transformed data. The data which issues from the transform process has a highly useful statistical property similar to a property of the English alphabet. That is, some transform coefficients closest to zero value are more common than others just as the occurrence of some letters of the alphabet such as "e" and "o" are much more common than "q" and "z". The transmission of these coefficients is made more efficient by the use of variable length codes; shorter codes are used for the more prevalent data values and longer codes are used for the more infrequent data values. A second phenomenon is that the run-length between non-zero value coefficients is more frequent for small run-lengths than for longer run-lengths. Both phenomena can be combined into a vector variable length coding table which is even more efficient. This vector coding of DCT coefficients is incorporated in the aforementioned H.261 C.C.I.T.T. standard and the more recent MPEG standards.

The preceding three methods of video compression are well known to designers of compression and de-compression equipment and products. The subject of the present invention is an improvement in the transform coefficient coding method using variable length codes, the third of the aforementioned three processes, to significantly reduce the data which must be transmitted or stored to portray motion imagery. This new invention is based upon new principles not previously exploited and is not merely a minor improvement but provides substantially more efficient variable length codes than presently known methods.

Two prior art technologies serve as more specific background for this invention. The first is the aforementioned H.261 standard video compression method. The second is the "Priority Coding of Transform Coefficients", U.S. Pat. No. 4,751,472 issued Jun. 14, 1988. Each will be only briefly reviewed; complete descriptions can be found in the aforementioned H.261 specification and said U.S. Patent.

In the H.261 specification, the picture is first divided into many square blocks consisting usually of 64 picture elements in eight rows with eight columns. An entire picture might consist of a few thousand of said blocks, sometimes more and sometimes less, depending on the resolution requirements of the compression application. A block can optionally undergo an Intraframe DCT or it might undergo an Interframe DCT. The intraframe DCT uses only the picture data from the new (current) picture itself. The interframe DCT uses picture data derived from the subtraction of previous picture data from new picture data. That is, at the location of each particular picture element in a picture the value of that element in the previous picture is subtracted from the value of that element in the new picture. The Interframe process takes advantage of similarities between previous and new pictures as the difference picture created by the subtraction process can result in fewer DCT coefficients and lower amplitude coefficients to be transmitted when the two pictures are very similar. The new picture is "predicted" by the previous picture since the encoder only transmits the difference picture coefficients to the decoder. The decoder also has the previous picture stored locally and this same "predicted" picture is added to the decoded received difference picture to create the new picture. The less efficient Intraframe coding process must be used when the previous picture bears little resemblance to the new picture, such as at a scene change in the motion video, or when the "dirty window" phenomenon is to be removed.

To add further efficiency to this Interframe prediction process, a Motion Compensation process is employed. This produces a modification of the previous picture prior to subtraction from the new picture so that the difference picture will be as small in amplitude as possible. The small amplitude picture will result generally in small amplitude transform coefficients with many said coefficients having zero values. The non-zero value coefficients having small amplitudes will be efficiently coded with the variable length coding and hence the difference picture will be more efficient to transmit. A Motion Estimation process is carried out at the encoder which searches through the previous picture for a replica of the block in the new picture which is to be coded. When found, the replica block, rather than the spatially corresponding block in the previous picture, is subtracted from the new picture. So that the decoder can make the same compensation in adding the "prediction" to the transmitted coded difference picture, a motion vector is also transmitted for each block processed which contains the horizontal and vertical displacements of the replica block from the coded block locations. The decoder then locates the replica block in the previous picture stored locally using the transmitted motion vectors. The decoder then adds this motion compensated block to the inverse transformed difference block received from the transmitter to form the new block.

The two-dimensional transform coefficients which issue from the DCT, whether from an intraframe or interframe transformation, are selected in a Zig-Zag sequence generally in the order of increasing spatial frequency and placed in a one dimensional list. From this list so called tokens are formed each having two components, a run-length and a value. Every token is a vector having two components which describe both the number of zero valued entries in the run on the list to be skipped over prior to the next non-zero value coefficient on the list, and the value of the said next non-zero value coefficient.

The tokens are then transmitted using variable length coding. Each variable length code is constructed according to its frequency of occurrence in actual images by the process known as Huffman Coding. More frequently occurring tokens are given shorter codes whereas infrequent tokens are given longer codes. The H.261 variable length coding table for transform coefficients contains about 64 vector entries. Rarely occurring combinations are conveyed by an escape code followed by the actual eight bit coefficient and six bit run length.

The second prior art system is described in U.S. Pat. No. 4,751,742. This hierarchical signalling system includes interleaved map components and transform coefficients. The map components occur at fixed locations in the tree structured hierarchy although branches in the structure can be terminated at any point by action of a map component. Of particular interest with regard to this invention is the Erase command and the Existence bits. The Erase command terminates a branch of the tree structure by declaring all coefficients corresponding to all subsequent locations on said branch to now have a value of zero for the present image. The Existence bits indicate whether the map is continued further along branches connected to the present branch or not. If a branch is not continued then coefficients corresponding to all subsequent locations extending from the branch have their values unchanged for the present image with reference to the previous image. In the present invention the concept of an Erase command is used but outside of the context of a map configuration. The concept of the Existence bit is used but outside the context of the map configuration and in the context of a Skip command.

In the aforesaid patent an Interframe architecture was used wherein the prediction model held at both transmitter and receiver was a coefficient model, not an image model as used in the C.C.I.T.T. H.261 Standard. An Interframe architecture for this invention also utilizes coefficient models rather than picture models. The advantages will become apparent as the invention is described in detail.

DISCLOSURE AND OBJECTS OF THE INVENTION

The invention comprises new signalling and coding methods for the case of Interframe transmission. The variable length coding of transform coefficients in the prior art is done strictly as a vector coding operation using the two vector components of run length and value. * According to the invention a coefficient model representing the previous image is maintained at both the encoder and the decoder. A present image coefficient model is formed from the present image by performing an image transformation, such as by the Discrete Cosine Transform. A representation of the present image coefficient model is constructed at the decoder from the previous coefficient model residing at the decoder and from coefficient differences and commands transmitted from the encoder using new scalar coding techniques and improved vector techniques. In many cases the run length component of a prior art vector can, by means of this invention, be deduced at the decoder from previous transmissions and need not be explicitly transmitted. In such case only a scalar component need be transmitted, which is done more efficiently due to fewer code entries in a scalar variable length code table and hence shorter length codes.

In many interframe cases of transmission the image blocks are only slightly different from re-usable imagery located at or nearby said blocks already available at the decoder such as to require minor modification of those already available. In particular with reference to the aforementioned one-dimensional Zig-Zag list of transform coefficients a special relationship exists between the list which describes an image block in the current picture and a second list which describes the image block which is used from previously available imagery as the prediction of the current block. These two lists are produced by the Intraframe transformation of the current image block and of the prediction block respectively. In prior art systems such lists are not compared in forming an interframe coefficient list; rather a comparison of blocks is instead made in the spatial image domain by subtraction of picture elements of the prediction image from corresponding elements of the present image.

The comparison of blocks in the transform coefficient domain is made here to describe the principles of the new invention. The aforementioned special relationship is that many of the non-zero value coefficients in the two lists exist at the same locations along the Zig-Zag path of each list. The reason this occurs is that particular locations along the list correspond to particular spatial frequencies resulting from the transformation process some of which tend not to change, except for a small amplitude amount, as minor corrections to the prediction are made to obtain the transform coefficients for the present image.

When and if the locations of the non-zero value coefficients in the current and predictive lists do not change, then it is not necessary to send the run-length part of the tokens from transmitter to receiver but only the values of the changes to each coefficient. Since both the transmitter and the receiver keep a record of the data of the previous frame, the transmitter can determine the differences between present and previous coefficients located at the same points in the list, transmit them as successive scalar values, and the receiver apply them to successive non-zero value coefficients in the list it holds for the previous image. The transmission of this one-dimensional scalar data can be accomplished more efficiently than the two-dimensional vector data and is a substantial part of the new invention.

There are a few motion image situations in which scalar transmissions can accomplish virtually all of the signalling for predictive transmission. The first case concerns a stationary image which fades out over the course of several picture frames. This image has previously been established but now fades to black. Because the image is stationary, transform coefficients along the aforementioned lists do not change location. As the images fades to black the contrast and brightness both decrease and the amplitude of the coefficients correspondingly decrease. This decrease is effected by scalar transmission of the required differences between frames. The case of the image fade from black can in part be similarly accommodated by scalar transmissions, but only after the coefficients are first established by vector transmissions.

Another case in which scalar transmissions are very helpful is the cross-fade wherein one stationary image fades out and another fades in. In this case some of the coefficients increase in value with time whereas others decrease in value with time.

In general the modification process involved with the prediction and correction of previous imagery so as to be applicable to the current image will involve both vector and scalar alterations. The scalar transmissions can be used to modify the value of pre-existing coefficients at the decoder; vector transmissions can be used to initiate non-zero value coefficients at locations along the list which presently had zero-value. The invention provides efficient methods to accomplish this.

An additional improvement in variable length coding efficiency can be realized in this invention for those coefficients which must be vector coded. Vector coding must be used where a non-zero value coefficient is to be established at a Zig-Zag list location where a zero value coefficient existed in the previous coefficient model. At locations where a non-zero value existed in the previous model a marker serves to indicate where a scalar operation can occur. Thus vector coding need never occur where a marker exists. Since a vector will never point to marked locations these marker locations can be omitted in the counting of list locations between the previous vector end point and the current vector end point. The general reduction in the value of the run-lengths used in coding the vectors causes, on average, the run-lengths to be still more peaked at low values with fewer at higher values. This causes the variable length coding efficiency to increase since shorter codes can be assigned to the more prevalent shorter run lengths. This will be later described in detail, and shown by example.

Finally, the amount of coding to be performed in any particular block is potentially reduced by two methods which involve a coefficient evaluation step prior to the coefficient encoding process. In the first of these two methods the transform coefficients resulting from the present image are compared with those from the previous image, or more generally a motion compensated reference image, to determine if the difference in amplitudes between non-zero value coefficients in the reference image and the corresponding coefficient amplitudes in the present image are below a pre-determined threshold. If said differences are small then an election can be made to encode the coefficients in a Vectors-only mode wherein the coding of all scalar coefficients is omitted for this particular block in this particular frame. A Block command is transmitted from encoder to decoder to instruct the decoder that Vectors only are transmitted for this block. This mode can be effective for low bit-rate transmission systems where a picture such as from a scene change has very recently occurred demanding more than average capacity in bits-per-second to establish. The method of the invention permits postponing transmission of small coefficient differences until coefficients which must be transmitted by vector methods are encoded and transmitted.

The second of the new preprocessing methods provides for more efficient encoding of transform coefficients under the condition that an image is fading in, fading out. A "fade" is the artistic technique for gradually establishing a new image starting from a black image (a fade-in), or gradually reducing the image to a black image over the course of several frames a fade-out). The transform coefficients for fades tend to increase or decrease in amplitude together. One method of the invention involves measurement of the fade as applied to as many as possible of the transform coefficients from the reference model and corresponding transform coefficient locations of the present image. If a single parameter can be found in this preprocessing evaluation which predicts the amplitudes of a group of coefficients in the present image based on corresponding amplitudes in the reference image then those coefficients in the reference model are compensated by applying the measured parameter to them prior to the encoding process. The parameter is then transmitted to the decoder along with the coefficient data. The prediction error after application of this method can be considerably reduced such that encoding is made more efficient. This occurs since smaller coefficient values usually are given smaller length variable length codes for transmission, and since the first of these last two methods wherein scalar signalling of small transform coefficient differences may be omitted in any particular image frame of encoding. The parameter measured can be a multiplication factor implying a linear change in amplitude of all affected coefficients between two images or can be a factor applied to a non-linear process to reflect the non-linear brightness characteristic usually employed in video transmission.

The description of the invention will proceed first by describing the case of precise calculation wherein the calculations for the prediction of the model for the next image at the encoder yield precisely the same numerical results as the prediction calculations performed at the decoder. It is required that motion compensation, transform and inverse transform calculations obey this constraint. After the description for the precise calculation method a description of the case which permits non-precise calculations which introduces a small amount of round-off error in the transforms and elsewhere. In general in the non-precise calculation case a small amount of forward error correction is required for the scalar signalling and a process called "vector erase" is required for previous image coefficient models where coefficient values are close to zero.

A principal advantage of the invention is the provision of methods and apparatus which implement new and efficient techniques for image compression.

Another advantage of the invention is the provision of new and improved run length encoding techniques.

Another advantage of the invention for Interframe coding is the provision under certain conditions for substitution of the more efficient method of scalar signalling of coefficient values and commands in the place of the previously required prior art vector signalling method.

Another advantage of the invention for Interframe coding is a new and improved run-length encoding technique wherein the reckoning of the run-length produces shorter and more efficient variable length codes for transmission.

Another advantage of the invention is the provision of efficient techniques for fading an image in or out and for fading from one scene to another.

These and other objects of the invention are achieved by providing methods and apparatus for compressing video data by subtracting transformed values of a representation of a previous image from transformed values of a present image to derive difference values, representing for transmission or storage those difference values as a combination of vectors and as scalars, vectors constituting an ordered set comprising a value and a run-length and said scalars constituting a value or a command. The transformed values are typically derived using a discrete cosine transform. When representing said different values as vectors and as scalars, one subtracts values from two two dimensional arrays and reads out the elements of the arrays in a zig-zag order beginning with the upper left element of the arrays. Transformed values of a present image are stored in a present array and transformed values of a previous image are stored in a previous array. When representing said difference values as vectors and as scalars, vector establish transmission is replaced with scalar transmission except when a representation of a transformed value of a present image is non-zero and the corresponding transformed value of a previous image is zero.

Only scalar values are sent when both the transformed value coefficient of the present image and the corresponding transformed value coefficient of the previous image are non-zero.

Difference values may be formatted selectively as vectors or scalars or as mixed vectors and scalars. Vectors and scalars are represented with transmission codes of variable length. When sending only scalar values, the values sent represent the difference between a transform coefficient stored for the previous image and a value of a corresponding coefficient for a present image. The sequence of scalar values sent may be shortened by sending commands which execute a scalar path erase, a scalar global erase, a scalar path skip or a scalar global skip.

When retrieving or receiving difference values, run lengths and commands represented as vectors and as scalars the difference values are added to corresponding transformed values of a transform model of a previous image; and a transform model of a present image is constructed using said difference in values and said corresponding transformed values. The transform model of a present image is used as a model of a previous image when receiving a subsequent image.

Typically an encoder is coupled to a decoder over a communications link and the decoder maintains a model of image information which tracks a model of image information maintained at the encoder exactly, in one embodiment of the invention or inexactly in another embodiment. When using the inexact embodiment, vectors and scalars from said encoder are sent to said decoder to update said decoder model with change information about how a model of a present image differs from a model of said previous image and information is sent to the decoder from the encoder to establish exact correspondence between the models of image information at both the encoder and decoder.

The invention is also directed to a method of encoding video images which can be represented as a coefficient model of a transformed image by comparing a coefficient model of a present image with a coefficient model derived from a previous image, identifying one or more non-zero coefficients of a coefficient model of a present image which were zero in the coefficient model of a previous image, identifying non-zero coefficients of a coefficient model of said present image which were also non-zero in the coefficient model of said previous image, identifying non-zero coefficients of a coefficient model of a previous image which have a zero value at corresponding locations in the coefficient model of said present image, outputting vectors describing said non-zero coefficients of a coefficient model of a present image which were zero in the coefficient model of a previous image in a vector establish mode, sending scalar information about the difference in scalar values of non-zero coefficients of coefficient models of said previous and present images and/or updating a model of a previous image using a scalar erase mode to send information to cause zero values to be written in a model of a present image.

The invention is also directed to a method of fading video images which can be represented as a set of coefficients of a coefficient model of a transformed image by comparing a coefficient model of a present image with a coefficient model derived from a previous image, sending information about the difference in scalar values of said coefficient models from an encoder to a decoder by:

at said encoder, calculating an average ratio of non-zero value coefficients of said coefficient model of a present image to corresponding coefficients of a coefficient model of a previous image, sending from said encoder to said decoder an indication of a fade mode of operation together with said average ratio, and at the decoder, adjusting all coefficients of said coefficient model of a previous image by multiplying each by said average ratio to produce a corresponding coefficient of said coefficient model of a present image.

The decision to use a fade mode of operation is based on an average value of the differences between the individual ratios and said average ratio. The average value of differences may be a weighted average. When using fading, it is preferred to make corrections to an adjusted coefficient model by sending scalar values.

The invention is also directed to a method of improving efficiency of image compression transmission in an image compression system which sends information about images using both vectors and scalars by measuring run length from a previous vector to another vector omitting any scalars interposed between vectors rather than from the previous vector to reduce the average run length and thereby improve efficiency by increasing the usage of shorter variable length transmission codes.

The invention is also directed to encoder apparatus for compressing video data which receives video data in the form of a series of digital images, transforms a digital image into an array of scalar coefficients constituting a transform model of a present image, saves a representation of a model of a present image as a transform model of a previous image; and subtracts corresponding coefficients of an array of said transform model of a previous image from the coefficients of said transform model of a present image.

The invention is also directed to decoder apparatus for decoding encoded and compressed video data by receiving difference coefficients formed by subtracting corresponding coefficients of an array of coefficients constituting a transform model of a previous image from coefficients of an array constituting a transform model of a present image, adding received difference coefficients to corresponding coefficients of an array of a transform model of a previous image to produce an array of a transform model of a present image, and storing a transform model of a present image for subsequent use as a transform model of a previous image. The decoder may further perform an inverse transform on a transform model of a present image to produce a digital image.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature and not as restrictive.

BRIEF DESCRIPTION OF THE DRAWINGS

FIGS. 3a, 3b and 3c are illustrations of the creation of a zig-zag list of transform coefficients.

FIG. 6a is an illustration of a coefficient-based model encoder according to the invention.

FIGS. 8a, 8b and 8c is an illustration of an example of the replenishment process according to the invention.

FIGS. 10a, 10b and 10c is an example of the replenishment process utilizing a global skip command.

FIG. 12 is a flow chart of the processing occurring during the first pass in the precise calculation mode.

FIGS. 19a, 19b, 19c, 19d and 19e are examples of encoder and decoder behavior under certain conditions.

FIGS. 23a, 23b, 23c, 23d, and 23e illustrate additional details of the processing utilized in pass 1 of the non-precise calculation case.

FIGS. 28a and 28b are Block Diagrams of processing to perform calculations for efficiently fading methods of the invention.

DETAILED DISCLOSURE OF THE INVENTION

Figure 1A:
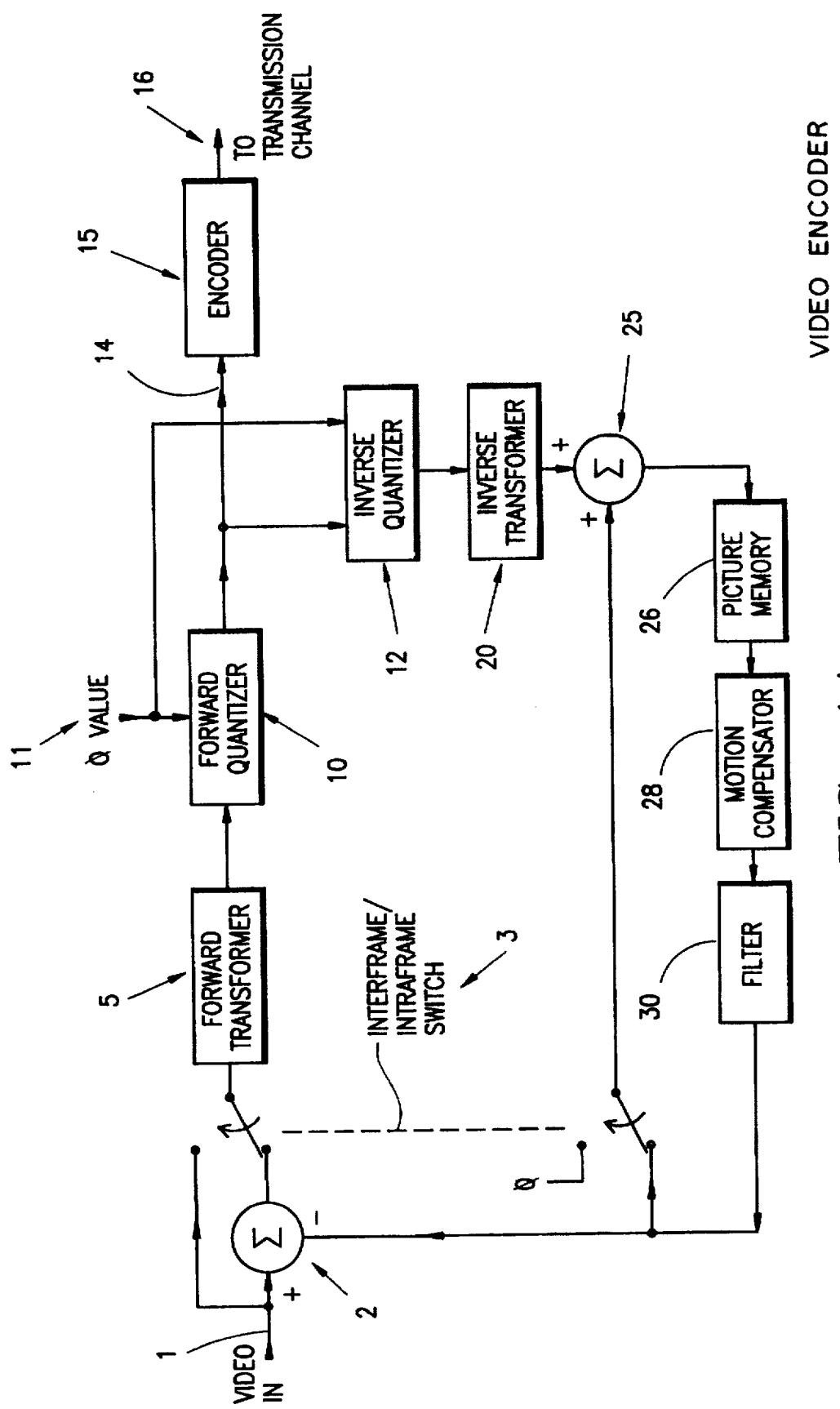
FIG. 1a is an illustration of a video encoder of the prior art.

According to this invention the transform coefficients representing the previous imagery and used as a predictive model are compared at the transmitter with the transform coefficients of the present image. In general, a considerable majority of said coefficients have a quantized value of zero. Modifications of non-zero value transform coefficients due to said comparison are sent to the receiver, and in conjunction with the receiver's predictive coefficient model, create a new set of transform coefficients which are subsequently used to reconstruct the present image. In this regard, those coefficients having non-zero value in the previous model are presumed to continue to have non-zero value at the same location in the so-called Zig-Zag list in the present coefficient model, although with a possible change of amplitude. For those coefficients where said presumption is valid, the amplitude change can be signalled from transmitter to receiver with only a scalar quantity since both transmitter and receiver will have non-zero value coefficients at the same list locations in their respective coefficient prediction models. In order to compare previous and present image transform coefficients both the previous image and present image must be available as coefficient models. This differs from the H.261 and MPEG systems wherein the prediction models exist only as image models and not as coefficient models. However, the system described in aforementioned U.S. Pat. No. 4,751,742 uses coefficient models as in this present invention.

As mentioned, a considerable majority of the coefficients in the transform coefficient model have the value of zero. Scalar coefficient difference values are transmitted only for list locations which contain non-zero value coefficients. Thus, the majority of locations, those having zero-value coefficients, are efficiently by-passed and require no signalling from transmitter to receiver. Additionally, a scalar skip-over signalling method will later be described which produces efficient by-passing of some portion of the non-zero value coefficients whose amplitudes are not changed from a previous frame to the present frame.

There will in general be some non-zero value coefficients in the present model which had zero values at corresponding locations in the previous model. When a zero-value coefficient is present in the previous model at the same list location it is necessary to transmit the location of this coefficient with a value of run-length in addition to a value. Thus, these particular coefficients must be transmitted as vector quantities containing both an amplitude change and a run-length.

For non-zero value coefficients in the prediction model which have zero value coefficients in the for responding list locations of the present image a special scalar transmission is sent which forces the new value at the receiver to zero. This is called a scalar erase transmission, or alternatively a scalar Force Zero transmission.

The non-zero value coefficients in the previous coefficient model are used not only as a model for the value of the corresponding present image coefficients but according to this invention used as markers for scalar transmissions in the Zig-Zag list. A list of scalar amplitude changes is sent from transmitter to receiver and each said change is applied in sequence to each succeeding marked location at the receiver one after another. The ordering of the list data at the transmitter must be identical to the order of use at the receiver to maintain proper synchronization and thus create the correct new image transform model at the receiver.

It is necessary that all of said markers be identified at the same list locations of the previous image coefficient models at both transmitter and receiver without error. If a non-zero value coefficient from the previous image coefficient model exists only at the transmitter or only at the receiver but not both then erroneous signalling will result, since to achieve this new scalar efficiency no locating data is transmitted.

The same calculations are performed at both transmitter and receiver after the modification data to be transmitted has been calculated at the transmitter. Said calculations use this modification data and the prediction model coefficients from the previous frame. As will be described subsequently only additions and subtractions are required if a motion compensation process is not used at a given block or if the compensated amount is zero in both spatial directions. However, use of a motion compensation process where either directional component is non-zero requires that an Inverse Transform be performed upon the previous image coefficient model to obtain the image itself. This image is then compensated for the motion using transmitted motion vectors A Forward Transform is next performed upon the motion compensated image block data to create the motion compensated previous image coefficient model. This data is then added to said modification data to obtain the transformation of the present image.

If calculations are performed identically at both transmitter and receiver such that calculation round-off always results in the same values then both transmitter and receiver will calculate identical transform models and the potential problem of having a non-zero value coefficient at only the receiver or transmitter but not both will not occur. This will be referred to as the precise calculation case. However, the present practice in H.261 and MPEG systems allows small calculation error between like processes at transmitter and receiver. Calculation differences occur because of difference in precision and because of differences in method, this later occurring primarily in Inverse and Forward Transforms wherein differing "fast" calculation algorithms are employed, dependent upon individual hardware transformer designs. Thus, currently available hardware from different manufacturers need not yield precisely identical results. Use of hardware or software which can result in non-identical calculated results between transmitter and receiver will be referred to as the non-precise calculation case.

The simplest and most efficient operation of this invention is achieved for the precise calculation case where transmitter and receiver calculations are identically performed yielding identical rounded results. However, this invention includes methods for operation with the imprecise calculation case. Said methods require transmission of additional error correction data not required for the precise calculation case where the results of calculations at transmitter and receiver are identical.

A review will first be made of the prior art H.261 system with reference to FIG. 1. This system employs motion compensated prediction with transform coding. In the interframe mode the prediction for a block in the present image frame is based on a block from the previous image frame. A model of the previous image is saved in memory at both transmitter and receiver to be used in the prediction processing to obtain the present image which in turn is employed at the next following frame as the previous image model. The difference between the new image and the motion compensated previous image is then transform coded, the resulting transform coefficients are quantized and the output coded with variable length vector codes.

Figure 1B:
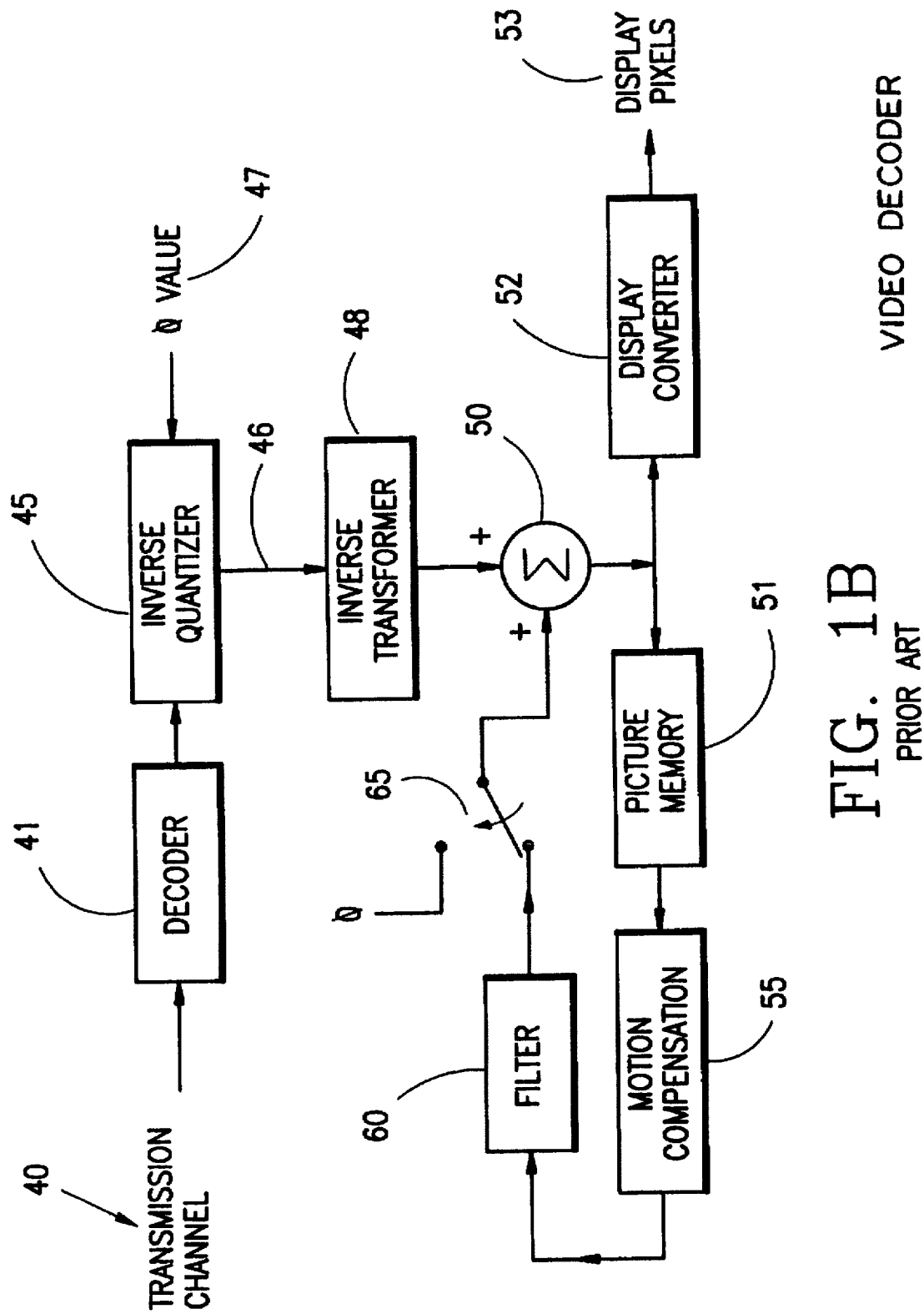
FIG. 1b is an illustration of a video decoder of the prior art.

FIG. 1A shows a simplified block diagram of the Video Encoder and FIG. 1B shows a simplified block diagram of the Video Decoder from the prior art. The encoder/decoder pair operate together in either the Intraframe or the Interframe mode. The Intraframe mode provides for transmission of picture data for a single frame at a time without prediction from one picture to the next. The Interframe mode provides for transmission of picture data in a predictive mode where previously transmitted imagery is used as a model for the current image. In the Interframe mode the transmitted data serves to modify the predicted image to more closely coincide with the actual current input image. The encoder/decoder pair switches back and forth between these two modes to provide for the best transmission efficiency and to periodically restart the prediction model due to the "dirty window" problem and due to the problem of divergence of transmitter and receiver models because of small calculation differences.

The detailed operation of these FIGS. 1A and 1B is next discussed. The Video In signal, 1, is in digital form and in a sequence of 64 pixels comprising a square block. Many blocks are used to cover all of the area of the whole picture. The order of pixels is a scanning pattern of eight columns and eight rows starting at the upper left of the block and proceeding toward the bottom right. Switch 3 passes Video In directly to Forward Transformer, 5, when the Intraframe mode is selected. Switch, 3, passes the difference formed by the subtractor, 2, between Video in, 1, and the output of Filter, 30, when the Interframe mode is selected. The Forward Transformer, 5, is often a Discrete Cosine Transformer but could be one of many other types of Transformers as well. In Intraframe mode the Video In signal itself is transformed whereas in interframe mode the difference between the Video In, 1, and the model from the Picture Memory, 26, via the Motion Compensator, 29, and the Filter, 30, is transformed. Thus in the Interframe mode only the correction to the model is operated on by the Forward Transformer, 5. The output from 5 is passed to the Forward Quantizer, 10, whose amount of quantization is controlled by the Q value, 11. In controlling the quantization, the number of non-zero coefficients per block and the range of values of these coefficients is made to vary such that the data presented to the Encoder, 15, is generally less for higher quantization values and generally more for lower quantization values. The quantization thus adapts the rate of generation of coefficient data which is dependent on the nature of Video in, 1, to a fixed rate transmission channel, 16.

The Encoder, 15, generates variable length vector codes in response to a value of a non-zero value coefficient and the run-length of zero value coefficients between the previous and present non-zero value coefficients. This coding, referred to as Huffman coding, uses codes based upon statistical averages of occurrences of the various combinations of value and run-length. The input to 15 also passes to the inverse Quantizer, 12, which scales the coefficients back to the same range as appeared at the input to 10 but with the selected quantization.

The Adder, 25, adds the output of 20 with the output of that section of Switch, 3, appearing at the Inverse Transformer lower left of FIG. 1A. In the Intraframe mode said switch provides a zero value signal to Adder, 25, and in the interframe mode provides the output of Filter 30 to Adder, 25. The output from Adder, 25, is passed to the Picture Memory, 26, which holds the resulting picture until needed for processing in the next video frame. The Picture Memory actually has two sections to it, the first providing space to place the said resulting picture for the next video frame and the second for holding the results of the previous frame's processing which is currently used to supply data to the Motion Compensation processor, 28. The two sections of the Picture Memory, 26, alternate roles after the processing of each frame.

The Motion Compensation block, 28, provides for the use of imagery found in Picture Memory, 26, moved to be used in a slightly different part of the frame from where previously used so as to accommodate image and/or camera motion. This provides considerably greater efficiency in the interframe mode over the Interframe efficiency realized without it.

The Motion Compensator output passes to the Filter, 30, which can be switched out upon command (not shown in FIG. 1A) or used as a low-pass spatial filter for both vertical and horizontal filtering. The filter is used for reduction of higher frequency artifacts which can be introduced by the motion compensation process. The output of Filter 30 then passes to Switch, 3, and Subtractor, 2, as previously discussed.

FIG. 1B shows a companion Video Decoder using prior art technology. Encoded video is received from the Transmission Channel, 40, and passed to the variable length Decoder, 41, which generates a stream of 64 coefficients for each block at its output. These are identical to those provided to the Encoder, 15, in FIG. 1A. The output from 41 is passed to the Inverse Quantizer, 45. The Q Value, 47, passed to 45 is the same for an image block as the Q Value, 11, in FIG. 1A. This so-called side information is passed from Encoder to Decoder by means not shown explicitly in FIG. 1. Thus the output from 45 in FIG. 2A is identical to the output of Inverse Quantizer, 12, in FIG. 1A.

Inverse Transformer 48 generates picture image values in response to the output, 46, of Inverse Quantizer 47 in the same way that inverse transformer 20 in FIG. 1A generates image values from the output of Inverse Quantizer 12. The Inverse Transformers generate outputs nearly identical to each other but which can vary slightly due to slight differences in transform implementation by different manufacturers.

The output of 48 is passed to one input of Adder, 50. The other input to Adder, 48, comes from Switch, 65, which selects the "0" input when in the Intraframe mode and the output from Filter, 60, when in the Interframe mode. Filter, 60, is passed its input from the output of the Motion Compensation block, 55, which in turn is passed its input from the Picture Memory, 51. Notice that blocks 45, 48, 50, 51, 55, 60 and 65 in FIG. 1B replicate the actions of blocks 12, 20, 25, 26, 28, 30 and 3 in FIG. 1A. The same operation is performed by both groups when the same quantization value and same set of motion vectors, both of these transmitted as side information in addition to the transform coefficients, are used.

In FIG. 1B the output from the Adder, 50, is also passed to the Display Converter, 52, which serves to format the pixels in a raster scanning format for picture presentation and issues these as Display Pixels, 53.

The details of Motion Estimation at the Encoder and the Motion Compensation at both Encoder and Decoder are not discussed herein as such techniques are well known in the art and the methods of the invention do not directly concern them.

The image model held in the Picture Memory, 26, of FIG. 1A and the Picture Memory, 51, of FIG. 1B gradually diverge from each other after many iterations of predictive coding due to the small differences in calculation results between the Video Encoder and Video Decoder. Both the Encoder and Decoder models tend to hold images after many iterations of Interframe coding which have the appearance of viewing the image through a dirty window. This effect occurs due to the non-linearities in the feedback loop in FIG. 1A formed by elements 5, 10, 12, 20, 25, 26, 28, 30, 2 and 3. These exist principally in quantizers 10 and 12 which must be operated at sufficiently high quantizations to make the video compression efficient. Small but noticeable artifacts are generated in the loop by the motion compensation and differencing processes and remain in the picture memory after many successive predictive coding operations. The purpose of the Filter, 30, in the Encoder and 60 in the Decoder is to minimize these effects but after a certain number of frames it becomes necessary to perform an intraframe transmission which completely replaces the contents of both Picture Memories, 26 and 51, at Encoder and Decoder respectively.

Attention is now directed to the operation of the Encoder, 15, in FIG. 1a, Decoder, 41, in FIG. 1b and the common transmission channel between them labeled 16 in FIG. 1a and 40 in FIG. 1b. The output from said Decoder, 41, will be identical to the input to Encoder, 15, if uncorrectible errors are not introduced in the transmission channel. This process is called lossless since the aforementioned output in FIG. 1b is identical to the aforementioned input in FIG. 1a.

Generally the Encoder, 15, in FIG. 1a compresses its input data to a more efficient format for transmissions using variable length coding based upon the statistical frequency of occurrence of the input data. The Decoder, 41, performs the complementary function of reconstructing the compressed data back to the same format as presented to the Encoder, 15.

Figure 2:
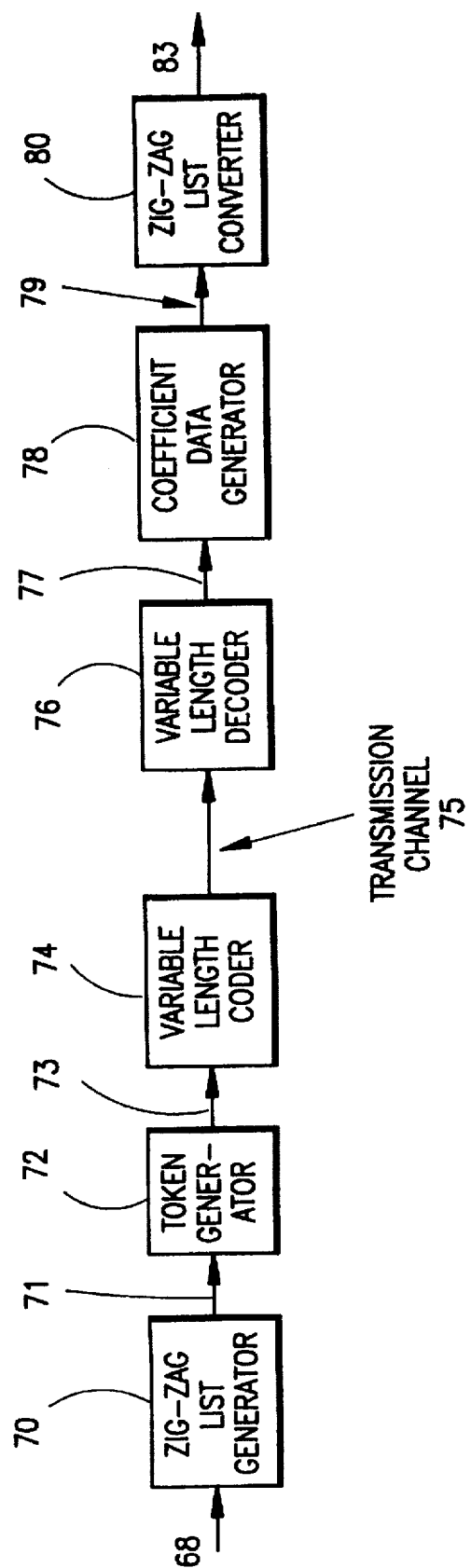
FIG. 2 is an illustration of portions of an encoder and decoder of the prior art linked together by a transmission channel.

FIG. 2 shows in additional detail the operation of Encoder, 15, in FIG. 1a, Decoder, 41, in FIG. 1b and the intervening transmission channel. In FIG. 2 the Encoder, 15, of FIG. 1a is divided into the three parts, Zig-Zag List Generator, 70, Token Generator, 72, and Variable Length Coder, 74. Also in FIG. 2, Decoder, 41, in FIG. 1b is divided into three parts, Variable Length Decoder, 76, Coefficient Data Generator, 78, and Zig-Zag List Converter, 80. Not shown are the usually employed elements of forward error correction, synchronization, the video rate buffer, et cetera as these are not directly involved in describing the prior art for the new invention.

The task of Zig-Lag List Generator, 70, is to generate a one dimensional Zig-Zag list given the 64 quantized coefficients, 64 being the number used as an example, at Input, 68. These spatial transform coefficients have been previously quantized to integers and emanate in sequence from a two-dimensional format shown in FIG. 3a which is organized such that increasing horizontal frequency proceeds from left to right and increasing vertical frequency proceeds from top to bottom. The coefficients in any particular row have the same vertical frequency and those in a single column have the same horizontal frequency. The top left bin has zero horizontal and zero vertical frequency and represents the average value of all 64 picture elements in the block prior to forward transformation. The bottom right bin has maximum horizontal and vertical frequency. The top left coefficient has a non-zero value for the Interframe compression case except when the difference in average values of the two subtracted pictures are the same for the particular block being processed. In practice the top left block is quantized with a fixed Q Value and the remaining coefficients are quantized with a Q Value which is varied to increase or decrease the video coefficient generation rate required to maintain a constant transmission rate.

The Zig-Zag path commonly employed is shown in FIG. 3b. This defines the sequence of transmission of the coefficients and is so designed to place the coefficients in a sequential order from most likely to have a non-zero value to least likely to have a non-zero value with a monotonicly decreasing frequency of occurrence.

The Token Generator, 72, in FIG. 2a next creates the tokens from the data in sequence on the Zig-Zag list at 71. Whereas the Zig-Zag list contains the same number of entries as the number of input coefficients a usually much smaller number of tokens is formed equal to one plus the number of non-zero value coefficients on the Zig-Zag list. Each token after the initial average value coefficient consists of a run-length and a coefficient value wherein the run-length is reckoned as one less than the number of zero valued coefficients in between the previous non-zero value coefficient and the current non-zero value coefficient being formed as a token. Thus two consecutive non-zero value coefficients have a run-length of zero between them. Also, the run-length to a non-zero value coefficient located first on the Zig-Zag list after the average value coefficient located in the upper left bin in FIG. 3 is equal to zero.

The process of expressing the coefficient data on the Zig-Zag list in terms of these tokens minimizes the number of tokens since a majority of the quantized coefficients have a value of zero. Since the non-zero valued coefficients are usually clustered in the top left corner of the Zig-Zag diagram of FIG. 3 the run-lengths tend to be small which subsequently yields efficient statistical coding.

At the end of the token generation for a block of 64 coefficients one additional token is generated which is called the End-of-Block message which subsequently informs the Coefficient Data Generator 78 in FIG. 2 that there are no further non-zero valued coefficients on the Zig-Zag list and hence the block being processed.

Each token consisting of both run-length and value is presented in the same sequence as its generation to the Variable Length Encoder, 74, in FIG. 2. Said Coder 74 serves to assign a unique variable length code (VLC) from its internal Look-Up Table for each different possible token and present the resulting data bits of the VLC to the transmission channel, 75, in the same sequence as the presentation of the tokens to Coder, 74.

The set of all possible tokens including the End-of-Block message which can be presented to Encoder, 74, is called the token alphabet. Similarly the set of VLC's output by the Coder, 74, at Transmission Channel, 75, is called the VLC alphabet.

As an example assume the coefficient values shown in FIG. 3c. Using the Zig-Zag order shown in FIG. 3b the transmission list, not including the average value (—17), becomes,

| Token Number | Run-length | Coefficient Value |
| --- | --- | --- |
| 1 | 0 | 2 |
| 2 | 1 | 1 |
| 3 | 1 | −1 |
| 4 | 8 | 1 |
| 5 | End-of Block | End-of Block |

Figure 4A:
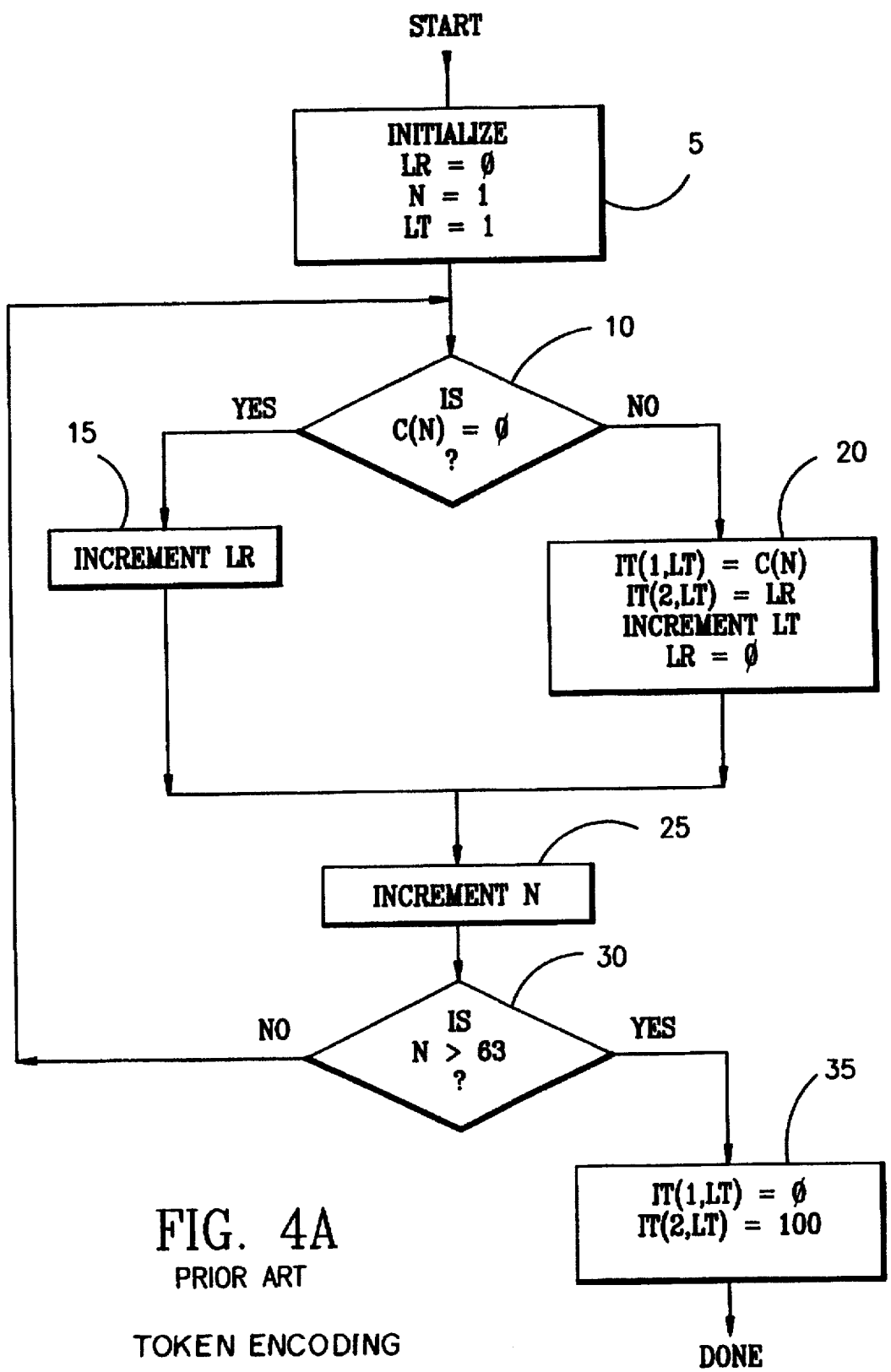
FIG. 4a is a flow chart showing prior art token encoding.

A technique for generating the tokens from the Zig-Zag list is shown in flow chart form in FIG. 4a. From this a hardware implementation is readily constructed using a sequential state machine with memory and counters. At the start of a block the run-length counter LR is set to zero, Zig-Zag counter index N is set to one, and List Counter index LT is set to one, as shown in the Initialize block 5 in FIG. 4a.

The Zig-Zag list items are presented in the one dimensional data array C(N) where N starts with value one and ends with 63. Decision block, 10, in FIG. 4a directs the processing operation dependent upon C(N) being zero or not being zero. If zero, the value of the run-length LR is incremented by one in block, 15; if C(N) is not zero then a token is formed in block, 20. The token has two parts: the coefficient value IT(1,LT) and accompanying run-length IT(2,LT). After the coefficient value C(N) has been placed into IT(1,LT) and the run-length LR has been placed into IT(2,LT) the token is complete and the token index counter LT is incremented by one. The value of LR is also reset to zero.

After the processing in FIG. 4a of either block, 15, or block, 20, the value of N, the coefficient counter index is incremented. A second decision block, 30, directs further processing dependent upon the value of N being greater than 63 the flow proceeds back to processing block 10 with the next value of N. If N was greater than 63 then block 35 is executed which generates the End-of-Block token by assigning the value zero to IT(1,LT) and 100 to IT(2,LT). Since this combination of values cannot occur as a result of assignment of values from the Zig-Zag list for N between one and 63 it is a unique token and will subsequently be recognized by the variable Length Coder 74 in FIG. 2 as such. In other words it is the part of the coder alphabet indicating the End-of-Block.

The number of tokens generated depends upon the number of non-zero value transform coefficients and in turn determines the number of subsequent VLC's generated by 74 in FIG. 2. Said VLC's are input to the Variable Length Decoder, 76, in FIG. 2 after passing through the transmissions channel, 75. Decoder, 76, generates a token list at its output, 77, identical to the token list, 73, by using look-up tables which yield the token two-dimensional data and the length of the variable length code used to transmit the data. The code length information is necessary to know where in the received bit stream to start looking for the first bit of the following code. The codes are generated by the Huffman coding technique such that no code is a prefix for any longer code and hence each transmitted variable length code can be uniquely decoded and its length uniquely determined.

The tokens at 77 in FIG. 2 are passed to the Coefficient Data Generator 78 whose task is to regenerate the Zig-Zag coefficient list, 79, identical to the list generated by Zig-Zag List Generator 70. A mechanized process to accomplish this task is in flow graph form shown in FIG. 4b wherein an output coefficient data value ID(N) is generated for each value of the index N where N includes all values from 1 to 63. The process is initialized in 50 of FIG. 4b by setting indexes N and LT to one and loading the first value of the decoded IT(1,LT) into LV and the first decoded value of IT(2,LT) into LR. The flag LG is set to zero and the index LT is incremented to point to the second decoded token.

Figure 4B:
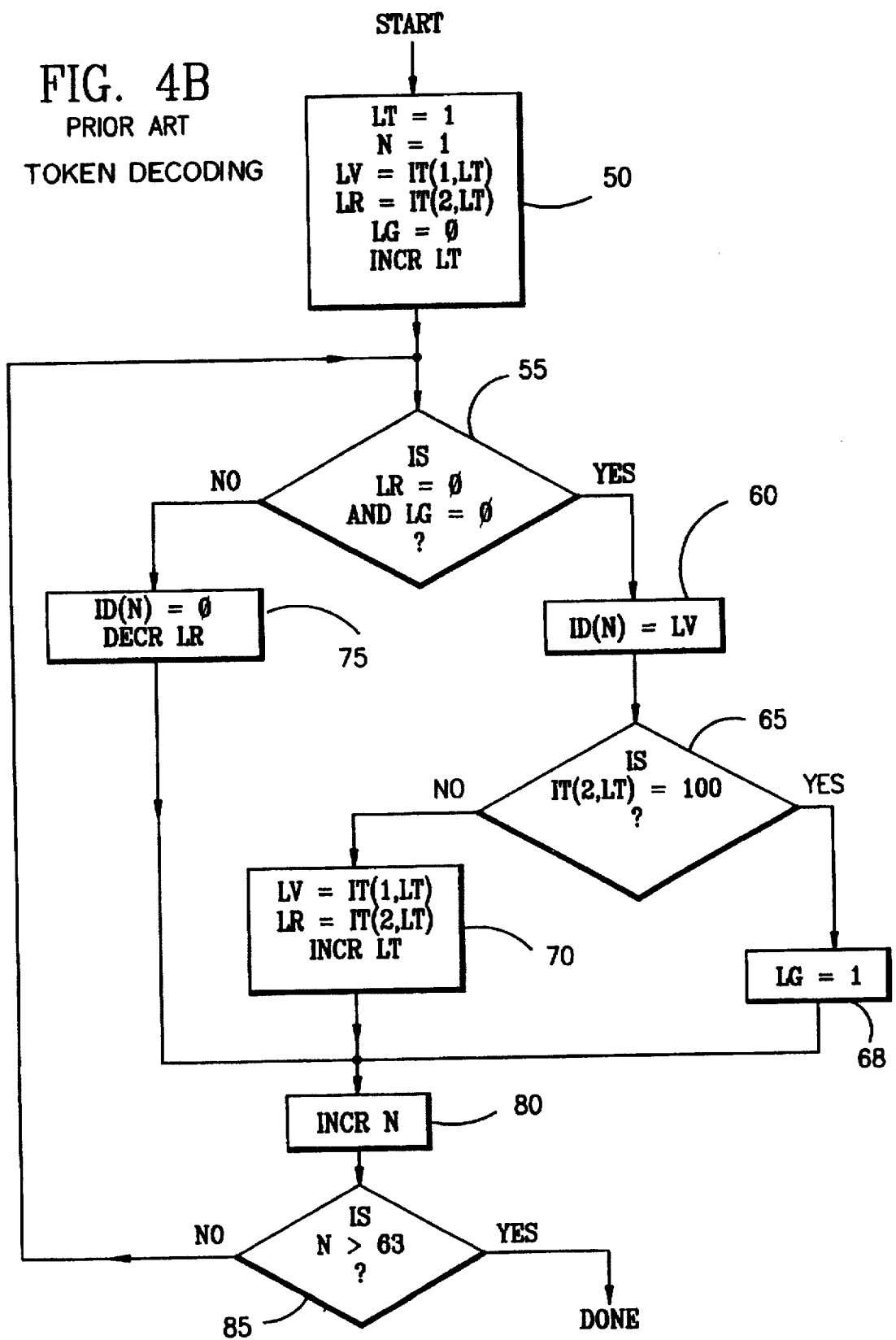
FIG. 4b is a flow chart showing prior art token decoding.

The values of LR and LG next determine the program flow in block 55 of FIG. 4b. If said values are both zero then the flow is directed to block 60 where the coefficient ID(N) is given the value held by LV. In block 65 the subsequent flow of processing is determined by whether the token value of IT(2,LT) is pointing at the End-of-Block message. If the value of IT(2,LT) is 100 then the End-of-Block message is carried by the token and the flow proceeds to block 68. In block 68 the LG flag, which later indicates to further processing that the end of the transmitted coefficients for the present coefficient block has been reached, is set to one. Processing thereafter passes to block 80. If IT(2,LT) is not 100 in block 65 then a token indicating a run-length and coefficient value is present and the flow is directed to block 70. In block 70 the value of IT(1,LT) is loaded into LV, and the value of IT(2,LT) is loaded into LR. The index LT is then incremented by one and the processing flow proceeds to block 80.

If LR and LG were not both equal to zero in decision block 55 of FIG. 4b then flow would be directed to block 75 where the value of ID(N) would be set to zero, the value of LR decremented by one and the processing then directed to block 80. At 80 the index N of ID(N) is incremented by one and this value then examined in decision block 85 to determine whether N exceeds the value of 63 or not. If N does not exceed 63 then processing flow is directed back to block 55 for the processing associated with the next value of N. If N exceeds 63 then all coefficients ID(N) have been generated and the process is completed.

The task of the Zig-Zag List Converter 80 in FIG. 2 is to convert the Zig-Zag list back into the two-dimensional format shown in FIG. 3 which is then output at 83 in FIG. 2. In practice the task of transmission of the first term in the Zig-Zag list corresponding to N equal to zero is performed outside of the processing just described in FIGS. 4a and 4b. Also, if all of the values of the coefficients for N equal to 1 through 63 have the value of zero then the processing is not performed and a flag sent from Encoder, 15, in FIG. 1a to Decoder, 41, in FIG. 1b indicating that all said values are zero and that no VLC's are transmitted for the block.

This completes a description of the basic encoding and decoding transform coefficients for transmission in the manner used in the H.261 and MPEG standards and serves both to describe the prior art and provide a basis for describing the increased transmission efficiency gained by use of the new invention. Note that a single pass through the Zig-Zag list data at the Encoder accomplishes the generation of the two-dimensional vector tokens. In the new invention two passes through the data will be used as a mechanized method to generate the one-dimensional scalar and two-dimensional vector tokens.

U.S. Pat. No. 4,751,742 also has relevance to the new invention and the similarities and differences are now briefly reviewed. Said patented system transmits transform domain coefficients corresponding to an image which undergoes change with time. It includes means for transform coefficient change identification by comparison of transform coefficients from a previous and a current frame and generation of a change data set necessary for the coefficient models at the transmitter and receiver to represent the current image frame. The transmitter and receiver models are identically replenished in a manner such that said models are identically replenished in a manner such that said models are driven in a direction towards correspondence with the current image frame, henceforward in this new invention called the present image frame.

Additionally disclosed in said Patent is a map having components do describe the location in the transform domain of non-zero valued transform domain coefficients, the map being organized in a branched manner beginning with a plurality of map components corresponding to the lowest band and continuing with a predetermined number of conditionally-existing map components for successive bands branched from each next proceeding band map component, each map component corresponding to coefficients in a particular band. The map components include an existence word indicating which further branches, if any, are present and a content word indicating whether to change, leave intact or erase a coefficient at a specific location in the present branch. This map signalling hierarchy is shown in FIGS. 8a and 8b of U.S. Pat. No. 4,751,742.

The new invention operates with transform domain coefficient models as does the system of U.S. Pat. No. 4,751,742, rather than image domain models as do the aforementioned H.261 and MPEG systems. Also, the transmitter and receiver coefficient domain models are identically replenished in a manner such that said coefficient models are driven in a direction towards correspondence with the present image frame.

However, the new invention differs in several important ways to provide improved transform coefficient signalling efficiency between transmitter and receiver. First, the map components, all of which require one or more bits to transmit to the receiver, are all replaced by either a self locating method of scalar signalling, or by a vector transmission which involved simultaneous signalling of both value and run-length. The scalar and vector signalling are interwoven in this invention in a manner to not require any overhead transmission bits to indicate whether a vector or a scalar is being transmitted. Rather, information inherently residing in the previous transform coefficient models at transmitter and receiver are used to determine whether a transmitted signal is a vector or a scalar transmission.

Also, the map commands in U.S. Pat. No. 4,751,742 to indicate operations of coefficient modifications and to indicate the existence or not of subsequent modifications along a list are not required in the new invention. Instead, the placement along a coefficient list of a portion of the coefficient modifications need not be explicitly signalled at all but rather determined in the new invention by using the locations marked by the non-zero value coefficients in the previous image list. The other portion of coefficients which are not so marked can be located by a modification of the vector signalling methods of the H.261 standard.

Figure 5:
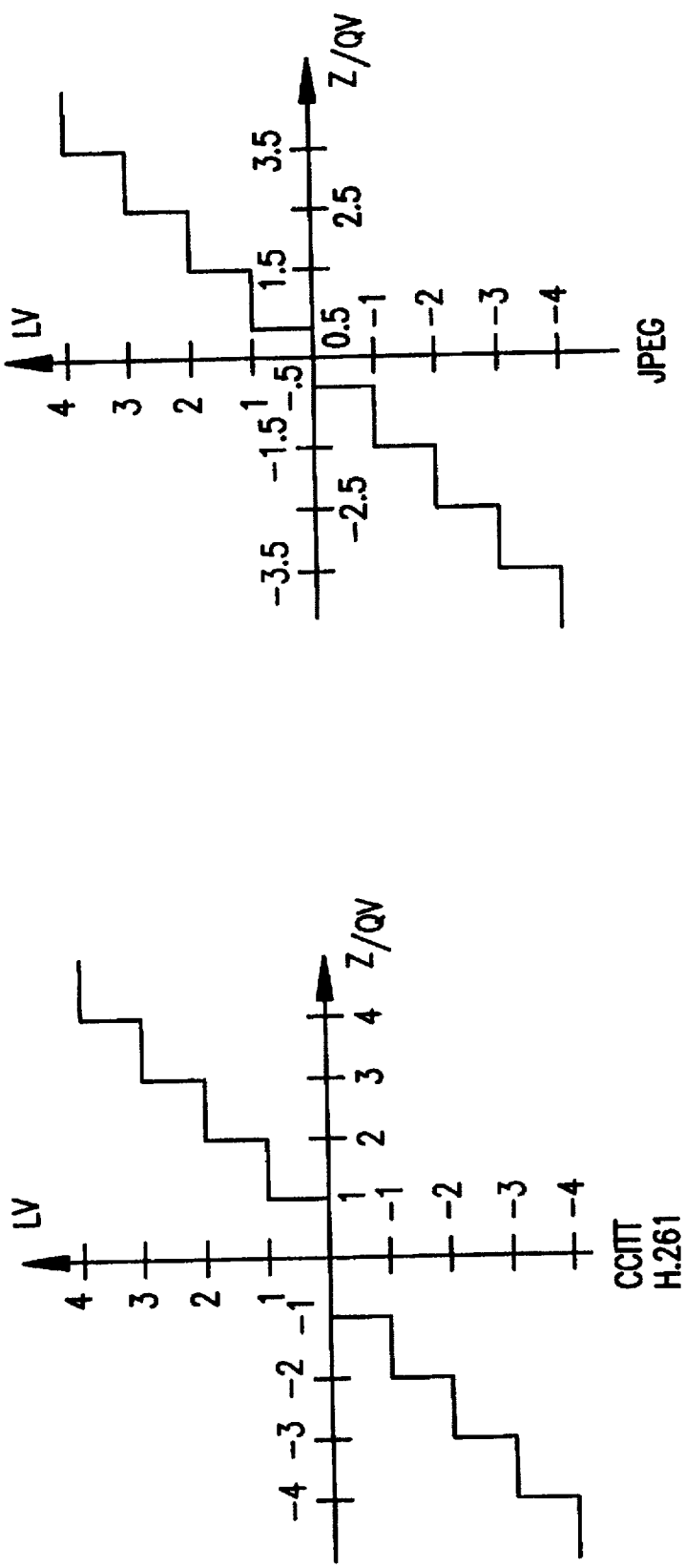
FIG. 5 is an illustration of quantization processes utilized by the C.C.I.T.T. and JPEG standards.

A brief explanation of the Quantization process as it is used in the C.C.I.T.T. H.261 Standard for Visual Telegraphy and as it is differently used in the JPEG standard for single image compression and storage is now given. FIG. 5 graphically shows the definition of these two quantization processes which primarily differ in the size of the "dead" zone around zero. The quantization processes can also be described mathematically as follows:

For the C.C.I.T.T. H.261, $$LV = trunc\left(\frac{ABS(z)}{QV}\right) \times SGN(Z)$$

For JPEG, $$LV = rnd\left(\frac{z}{QV}\right)$$

where z is the value of an input coefficient, QV is the positive integer value of Quantization selected for use and LV is the resulting value of the quantized coefficient. ABS, trunc and rnd are short notations for, the absolute value of, the truncated value of, and the rounded value of respectively. SGN(x) is defined as equal to one if x is positive, is equal to minus one if x is negative, and zero if x is zero.

The reconstructed values, albeit now quantized are not generally exactly the same as the input values to the quantization process. They are, For the C.C.I.T.T. H.261, $$CL = QV*[LV + 0.5*SGN(LV)].$$

For JPEG, $$CL = LV*QV.$$

With either type of quantization above the reconstructed output CL will be equal to the input z when z is integer and QV=1.

The Vector/Scalar coding methods are now described in detail. The description is divided into two separate but similar cases. The first is the case wherein precise calculation is maintained between transmitter and receiver such that calculated results are identical at the two locations. The second is the case wherein calculations made at transmitter and receiver may differ slightly due to calculation differences in hardware devices such as the inverse Cosine Transformer. The precise calculation case is first described and serves as a starting point for the non-precise case which is subsequently described.

Figure 6B:
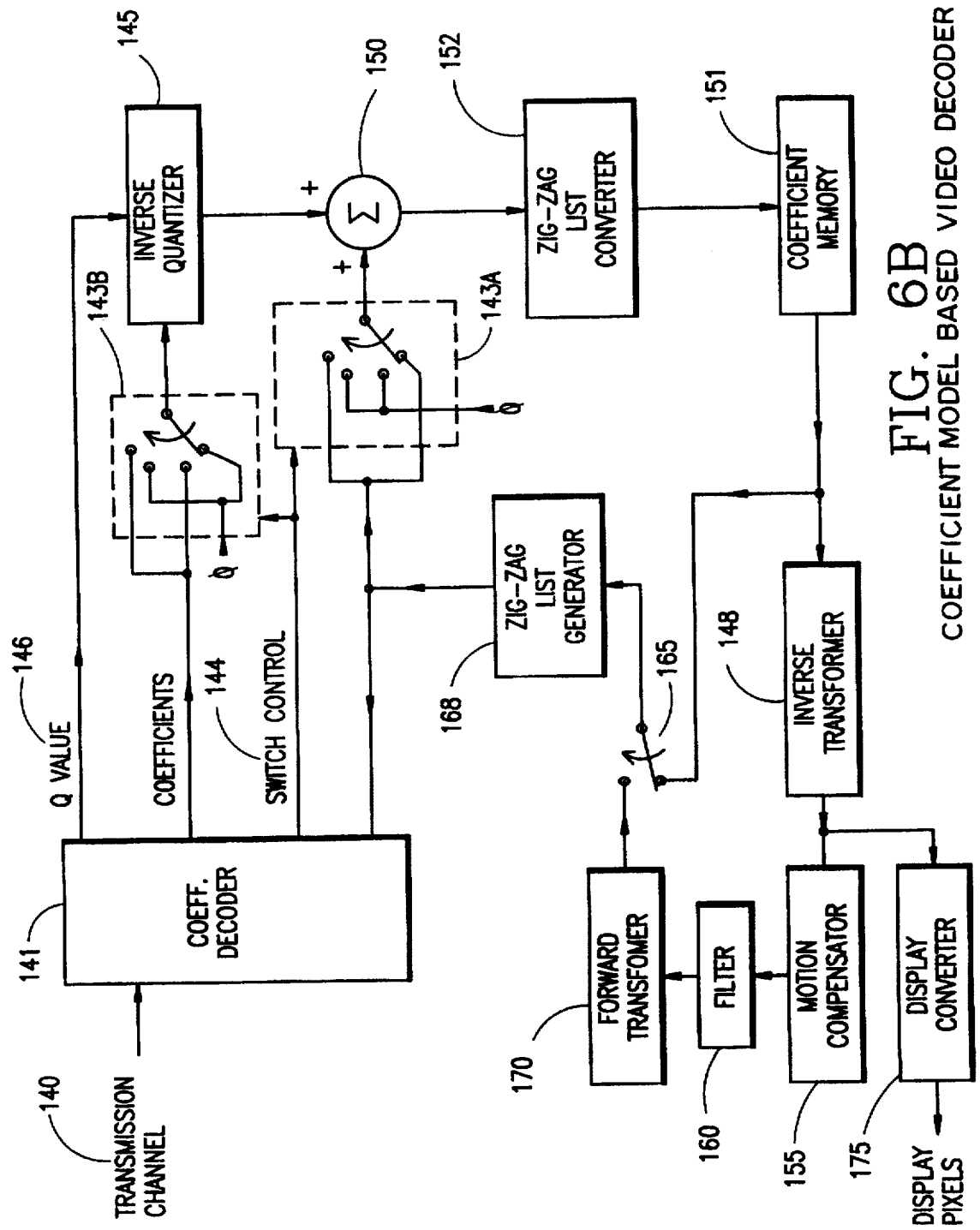
FIG. 6b is an illustration of a coefficient-based model decoder according to the invention.

FIG. 6a shows a block diagram of the Coefficient-based model Video Encoder wherein the prediction model is stored and compared with the transform coefficients of the new image. Correspondingly, FIG. 6b is a block diagram for the Coefficient-based model Video Decoder. Both FIGS. 1 and 6 accommodate motion compensated predictive coding video compression with adjustable quantization. A fundamental difference between them is that the models and the comparison of previous and present image data is performed in the coefficient domain in FIGS. 6a and 6b whereas it is performed in the spatial pixel domain in FIGS. 1a and 1b.

Block Diagrams in FIGS. 6a and 6b are first described as to general function prior to still more detailed diagrams, signal flow charts and computer simulations which follow. In FIG. 6a Video Input, 101, is passed to the Forward Transformer, 105, which develops transform coefficients, 107. Zig-Zag List Generator, 106, next forms a one-dimensional list of the transform coefficients using the Zig-Zag order previously described in FIG. 3 for the prior art system. This list generation is performed earlier in the signal processing of FIG. 6a to avoid having to perform it multiple times if done later on. The resulting coefficients from the List Generator, 106, are then used in Forward Quantizer, 110A, in Subtractor, 102, and Coefficient Encoder, 115. The previous image is held in Coefficient Memory, 126, and passed through switch, 103, directly or through the path formed by Inverse Transformer, 120, the Motion Compensation device, 128, the optional Filter, 130, and the Forward Transformer, 108. This latter path is used when motion compensation is to be performed on the previous image. The output from switch, 103, is passed to Zig-Zag List Generator, 109, whose output is next passed to the subtractor, 102, to the Forward Quantizer, 110C, to the Coefficient Encoder, 115, and to the four position electronic switch, 113B.

The output from the Subtractor 102, is passed to Forward Quantizer, 110B, and to Coefficient Encoder, 115. The outputs from the three forward quantizers are passed to the Coefficient Encoder, 115. Additionally the outputs from Forward Quantizers, 110A and 110B, are passed to switch, 113A, where they are selected for possible use as inputs to inverse Quantizer, 112. Q value, 111, is passed to the three forward quantizers and also to Inverse Quantizer, 112. Although not shown, the Q Value, 111, must be sent as side information to the decoder of FIG. 6b via the transmission channel for use there in the inverse quantizer. Inverse Quantizer, 112, also receives the output from switch, 113A, which selects a value of zero for the first and third positions of the switch, the quantized present coefficient in the second position, and the quantized difference between the present and previous coefficient in the fourth position.

Position one of the four position switch, 113, is used for the Scalar Modify With No Change operation wherein the previous image coefficient, either directly or via motion compensation is used as the new coefficient in the model. Switch, 113 position two is used for the Vector Establish operation wherein the present image coefficient is selected for use as the new coefficient in the model. Position three is used for the Null and the Force Zero operations wherein a zero value coefficient is to be used for the new model. Position four is used for the Scalar Modify With Change operation wherein the transmitted difference coefficient is inverse quantized and is then added to the coefficient from the previous image, either motion compensated or not as determined for the block.

Adder, 125, receives one input from the output of Inverse Quantizer, 112, and the second input from the output of switch, 113B. Said switch operates in conjunction with switch, 113A, such that the same switch position is always selected for both sections A and B. In the first and fourth positions the previous image transform coefficients, either directly or motion compensated according to switch, 103, are at the output of switch, 113B. In the second and third positions the value zero appears at switch 113B output.

The output of Adder 125 passes the value of the coefficients to the Zig-Zag List Converter 127, which performs the inverse of the Zig-Zag List Generation process performed in 106 or 109. Thus, the coefficients are re-ordered such as to pass to the Coefficient Memory 126, to be stored for the subsequent previous image. For switch 113, position one, the previous image coefficient appears at Adder 125, output and reflects s skip-over action. In the second position the quantized present coefficient appears at the output of Adder 125. This is used for the case where a new non-zero valued coefficient replaces the previous coefficient. It is also used in the Intraframe mode where a non-zero value coefficient is to be placed on the Zig-Zag list. In the third position a value of zero is entered on the Zig-Zag list. In the fourth position the value of the previous coefficient is added to a value which is the inverse quantized amount of the forward quantized difference between the present and previous coefficients. This operation is used for modification of a previous non-zero valued coefficient.

Coefficient Encoder 115 receives the six quantized or non-quantized coefficient values and also the block commands 117 to be later discussed. Encoded coefficients in either the scalar or vector mode are output to the Transmission Channel, 116. Encoder 115 generates the switch Control for switch 113, based upon the input quantized and non-quantized coefficients and the block commands. In actual operation there are delays of many clock periods in some of the signals required such that the correct quantities are processed at the same time. For example, Adder 125 must receive corresponding data inputs at the same time and switch 113 must receive its correct data and switch control inputs at the same time. Such appropriate required delays are not shown in FIGS. 6a and 6b to keep the diagrams as simple as possible and to facilitate understanding of the basic operation. Also not shown is the side information which is information other than transform coefficients transmitted to the receiver. This includes the motion vectors, the Q Value and the block commands among others.

The vector/scalar encoding operation performed by Coefficient Encoder 115, is lossless in that the quantized coefficients can be exactly reconstructed by the Coefficient-Based Model Video Decoder of FIG. 6b assume a transmission channel 116, which is errorless or can be made errorless with suitable error correction techniques outside the scope of this description. FIG. 6a will be discussed in more detail with the aid of FIG. 7 after a description of the Decoder of FIG. 6b.

FIG. 6b shows the processing blocks of the decoder for the precise calculation case of the invention. Coefficient Decoder 141, receives the variable length encoded data from Transmission Channel 140, decodes the transform coefficients and issues said coefficients in the Zig-Zag order to the four position switch 143b. Also required as inputs to said decoding process are the previous model coefficients. These are passed from the output of switch 165 by way of the Zig-Zag List Generator 168 to the Coefficient Decoder 141 and also to switch 143A. Q Value 146 which is carried as side information in the data from Transmission Channel 140 is passed to Inverse Quantizer 145. The switch Control signal 144 is generated by Decoder 141 in the process of decoding the coefficients from Transmission Channel 140 to apply to electronic switch 143A, and electronic switch 143B, which are ganged to switch together.

Inverse Quantizer 145 receives the output from switch 143B and the Q Value 146 from Decoder 141 and outputs the reconstructed coefficient value to one input of Adder 150. The second input to Adder 150 comes from the output of switch 143A. In the first position of both sections of switch, 143, the Adder 150 receives as inputs zero and the previous coefficient respectively and hence outputs just the previous coefficient to be stored in Coefficient Memory 151. In the second switch position, Adder 150 receives the coefficient value from inverse Quantizer 145 and zero from switch 143A. This is the new vector coefficient at a list location sent from the Encoder. This switch position is also used for Intraframe transmission wherein a non-zero coefficient is inserted into the subsequent Coefficient Memory, 151. In the third switch position Adder 150 receives zeroes from both switch 143A and switch 143B, corresponding to an Erase condition. This position is also used in Inframframe Coding where a list location is to receive a value of zero. This produces a zero at the adder output which is sent to Coefficient Memory 151 via Zig-Zag List Converter 152. The fourth switch position of switch 143B provides a difference quantized coefficient value to Inverse Quantizer 145. The reconstructed coefficient value is generated at the output of 145 and passed to one input of Adder 150. The second input to Adder 150 becomes the previous coefficient value from the output of Zig Zag List Generator 168. The two are added together to produce a modified coefficient value to send to Coefficient Memory 151 via Zig-Zag List Converter 152.

Switch 143 in FIG. 6b operates in synchronism with switch 113 in FIG. 6a and, hence produces the same coefficient values into Coefficient. Memory 151 at the Decoder of FIG. 6b that are input to the Coefficient Memory 126 at the Encoder of FIG. 6a. The reason for this is that the switch position is determined in each case by the quantized and non-quantized values of the previous coefficient which are available at both Encoder and Decoder and by the transmitted data from Encoder to Decoder. This is further described with reference to FIG. 7.

For the first switch position at either Encoder or Decoder the previous data held in the coefficient memory is simply replaced in the coefficient memory, either motion compensated or not. Since the data in the Encoder Coefficient Memory is presumed identical to the data in the Decoder Coefficient Memory to start with and the processing elements at both locations yielding identical calculated or passed results, identically replenished coefficient data results at encoder and decoder Coefficient Memories.

For the second switch position new coefficient data is generated at the encoder which is identically passed to the Coefficient Memory 126 at the Encoder of FIG. 6a and to the Coefficient Memory 151 at the Decoder of FIG. 6b. The inverse Quantizer, 145, at the Decoder must then operate identically to the inverse Quantizer 112 at the Encoder for the respective coefficient memories to be identically replenished. In the third switch position the value zero is inserted into both Encoder and Decoder coefficient memories at the same location.

For the fourth switch position differential coefficient data is generated to be added to the previous coefficient value held at both Encoder and Decoder. In this case the operations of inverse quantization and addition at both Encoder and Decoder must be identical as well as any motion compensation at encoder and decoder performed so that the resulting coefficients at the two respective coefficient memories are identical.

For the precise calculation case it is necessary that all elements which affect data precision at the Decoder of FIG. 6b operate identically to those corresponding elements at the Encoder of FIG. 6a. It has already been stipulated that the transmission channel conveys data without error and that the coefficient data encoded by Encoder 115 in FIG. 6a is exactly recovered by the Decoder 141 in FIG. 6b. In addition, data calculated or passed in the Decoder of FIG. 6b by switch 143, Inverse Quantizer 145, Adder 150, Zig-Zag List converter 142, Coefficient Memory 151, switch 165, Zig Zag List Generator 168, Inverse Transformer 148, Motion Compensator 155, optional Filter 160, and Forward Transformer 170 must be identically calculated or passed by corresponding Encoder elements in FIG. 6a, switch 113, Inverse Quantizer 112, Adder 125, Zig Zag List Converter 127, Coefficient Memory 126, switch 103, zig zag List Generator 109, Inverse Transformer 120, Motion Compensator 128, optional Filter 130, and Forward Transformer 108, respectively.

The above constraints guarantee that the transform coefficient model produced at the Coefficient Memory 151 in FIG. 6b is identical to the model in Coefficient Memory 126 in FIG. 6a. Further, the integer values of said coefficients in their respective memories become equal to the set produced at 107 in FIG. 6a when the Q Value 111 at Encoder and 146 at Decoder is equal to one. The condition of a Q value equal to one at least once every several frames guarantees that the "dirty window" phenomenon is periodically terminated and does not develop significantly in between. As was previously stated the exact coefficient set at 107 in FIG. 6a generated in response to a present image will become the next coefficient based model at both the Encoder and Decoder if the value of Q Value 111 at the Encoder and 146 at the Decoder is equal to one. Since the transformed image of a present image cannot be contaminated with remnants of previous imagery, any "dirty window" phenomena will therefore be terminated.

Coefficients are rounded in a particular location in the processing since greater precision is not required and it is desirable to provide coefficient storage with no more bits of word length than necessary. The first location of rounding is performed at the output of Forward Transformers 105 and 108 in the Encoder of FIG. 6a, and the Forward Transformer 170 in the Decoder of FIG. 6b. The other locations are at the output of Inverse Quantizer 112 of the Encoder of FIG. 6a and the inverse Quantizer 145 of the Decoder of FIG. 6b.

Figure 7:
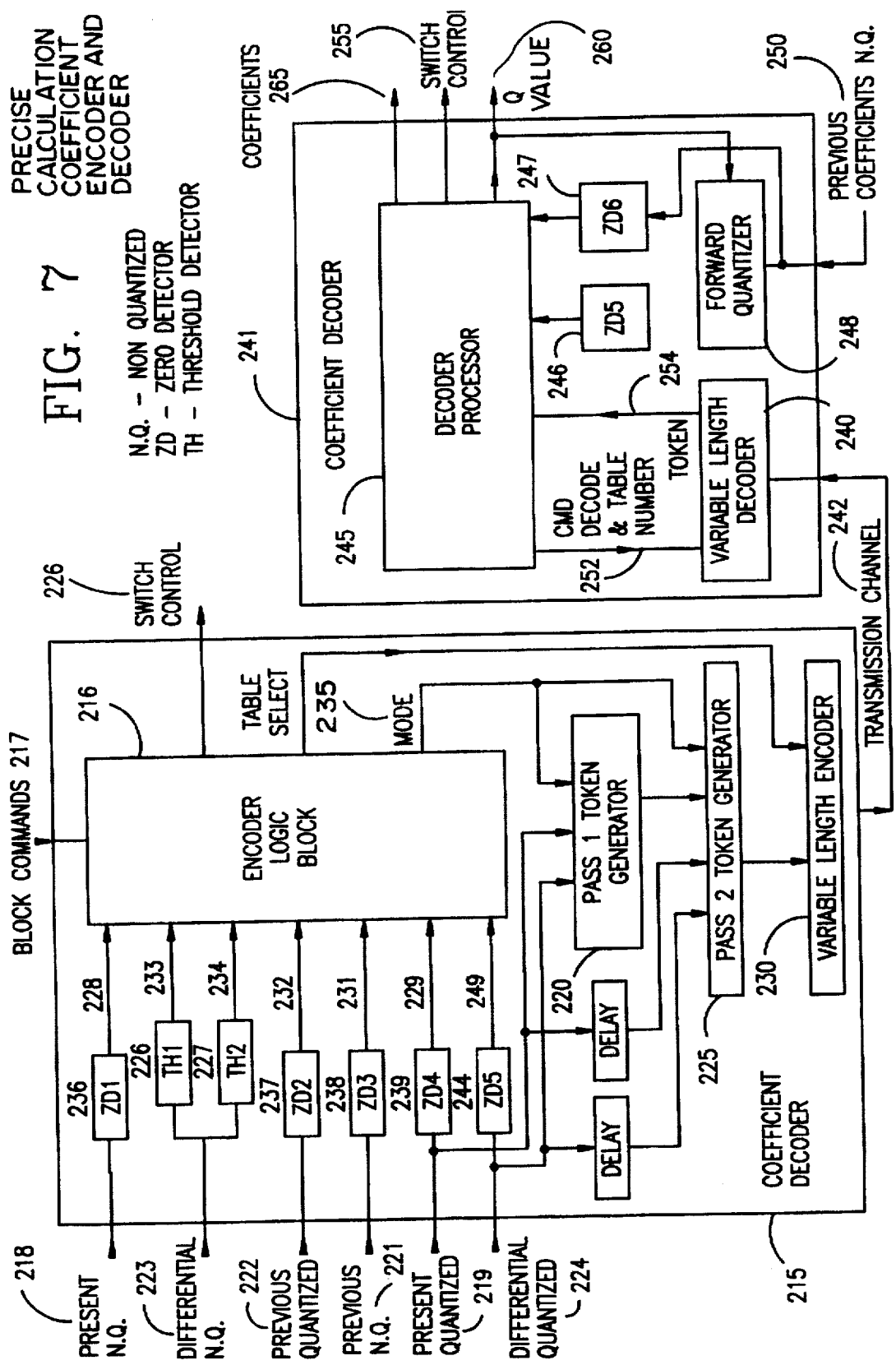
FIG. 7 is an illustration of portions of a coefficient encoder and coefficient decoder linked together over a transmission channel.

FIG. 7 shows in detail the Coefficient Encoder 115 in FIG. 6a and the Coefficient Decoder 141 in FIG. 6b which serves to focus on details of the invention. Six coefficient inputs enter the Coefficient Encoder 215 in FIG. 7 which correspond to the six entering the Coefficient Encoder 115 in FIG. 6a. All coefficients are in the Zig Zag List order. The correspondence is as follows where the abbreviation N.Q. denotes non-quantized:

| Coefficient Name | FIG. 6a Designator | FIG. 7 Coeff Designator | FIG. 7 Zero Det. Output |
|---|---|---|---|
| 1) Present Image N.Q. | 118 | 218 | 228 |
| 2) Present Image Quantized | 119 | 219 | 229 |
| 3) Differential N.Q. | 123 | 223 | — |
| 4) Differential Quantized | 124 | 224 | 249 |
| 5) Previous Image N.Q. | 121 | 221 | 231 |
| 6) Previous Image Quantized | 122 | 222 | 232 |

The Coefficients are all integer values which can be positive negative or zero. Zero detectors, labeled ZDn, where "n" is the number of the zero detector device, and Threshold Detectors, labeled THm, where "m" is the number of the threshold device, serve to generate binary inputs to Encoder Logic Block 216 in FIG. 7. A Zero Detector generates a binary zero at its output when its input has the value of zero; else its output is in binary value of one. A Threshold Detector generates an output which is binary one if the absolute value of its input exceeds a predetermined threshold value; else its output is zero.

The Encoder Logic Block 216 generates the Switch Control 226 which selects the switch position of switch 113 in FIG. 6a. Said Block also generates the Mode output 235 in FIG. 7 which instructs Pass 1 Token Generator 220 and Pass 2 Token Generator 225 as to which operating case to use for processing transform coefficients input at 219 and 224. The Table Select output 243 directs the Variable Length Encoder 230 which look-up table to use for encoding each coefficient. Outputs 226, 243 and 235 are also in part determined from the Block Commands 217 which are input to Encoder Logic Block 216. These Block Commands are also transmitted to the Coefficient Decoder 241 via Transmission Channel 216, although not shown here. Since said Block Commands are usually maintained at the same values for at least one processing block of 64 coefficients and are usually four or less in number there is little overhead transmission incurred by their use.

For the precise calculation version of this invention the Mode 235 consists of five actions in the interframe case which are communicated to Token Generators 220 and 225.

The Encoder Logic Block 216 determines which said action as a result of its seven data inputs which are in turn a result of a zero detection or a threshold operation on one of the six input coefficients from the above listing and the Block commands input 217 as can be seen in FIG. 7. The operation of Pass 1 Token Generator 220 and Pass 2 Token Generator 225 will be further described in detail with reference to flow charts and operate in particular ways dependent upon each specified action. As will subsequently be seen the Variable Length Decoder 240, also in FIG. 7, is instructed by the Decoder Logic Block 245, which decoder look-up table to use in decoding each transmitted coefficient. Decoder 240 is able to use a look-up table corresponding to the one used at Encoder 230 because it has the Block Commands 217 transmitted to it and has access to the previous image coefficients 250 which are the remaining information required to specify the correct look-up table. These separate look-up tables provide optimized variable length coding for vector tokens, for Minimum Feature scalar tokens and for Full Feature scalar tokens. Subsequent tables will show how this is accomplished.

The five particular Mode 235 actions are:

1. Null
2. Vector Establish
3. Scalar Erase
4. Scalar Modify with no change
5. Scalar Modify with change.

Table Select 243 specifies either a vector look-up table, a Minimum Feature table or a Full Feature table. The minimum Feature operation is the simpler and is described first; the Full Feature operation is an expansion of the Minimum Feature Operation and will be described afterwards. The two different operations are made possible due to the presence of the transform coefficient quantization operation. If said quantization is not used, in which the Q Value is always a value of one, the Full and Minimum Feature operations would be equivalent. Full and Minimum Feature operations become different when the Q value is greater than one which in turn causes non-quantized coefficient values to be different from quantized values.

The particular variable length codes for the look-up tables will not be specified in this description. They are generated using a computer simulation of the video encoding described herein operating on motion video sequences deemed to be typical to determine the statistical probability of occurrence of each transform coefficient value and each command. From the resulting determined probabilities Huffman Coding techniques, Arithmetic coding techniques or possibly other techniques can be used to generate the actual variable length codes to be used. This technology is well known by those skilled in the art of variable length coding and will not be further described here.

The Minimum Feature case uses only the input 229, which is derived from the quantized present image coefficient input 219, input 232, derived from the previous image quantized coefficient input 222, and input 249 derived from the differential quantized coefficient input 224 to determine for Interframe operation the Mode 235 actions (also referred to as the Case Number), the Table Select value 243 and the Switch Control 226, for switch 113. This is shown in Table 1. For the Minimum Feature Actions there are two Variable Length Encoder tables. Look-up Table 1 is the Vector table; Look-up Table 2 is the Scalar I table.

TABLE 1

Encoder Minimum Feature Actions

| Case # | 249 | 232 | 229 | Action | Mode 235 | 226 | 243 |
|---|---|---|---|---|---|---|---|
| A | X | 0 | 0 | Null | 0 | 3 | 0 |
| B | X | 0 | 1 | Vector Establish | 1 | 2 | 0 |
| C | X | 1 | 0 | Scaler Erase | 2 | 3 | 1 |
| D | 0 | 1 | 1 | Scaler Modify, No chg. | 3 | 1 | 1 |
| E | 1 | 1 | 1 | Scaler Modify, Change | 7 | 4 | 1 |

TABLE 1

An entry of "0" in the columns labeled 249, 232 or 229 denotes a zero value coefficient while an entry of "1" denotes a non-zero value coefficient. "X" means do not care. Values of four, five and six are not used as Mode 235 codes.

Case B in the above Table commands a Vector Establish operation wherein both a value and a run length are transmitted to the decoder. Case A requires no signalling in that Case B specifies the number of nulls to be skipped along the Zig Zag List to the location where a non-zero value is to replace a zero value entry. Below the line in Table 1, Cases C, D and E are locations in the Zig Zag list marked by non-zero value entries in the list of previous image coefficients. Since the locations are already marked at both Encoder and Decoder only a scalar Erase command need be sent in Case C, only a scalar zero value need be sent for Case D, and only a non-zero value scalar modification value need be sent in Case E.

The Decoder 241 in FIG. 7 can determine whether a decoding action is either in the Case A or Case B category or is in the Case C, D or E category since the previous image coefficient also resides at the Decoder and is used to make this category distinction. Thus, the Decoder can automatically determine whether to expect a vector or a scalar transmission. This importantly means that data is not required to be transmitted to indicate whether a variable length code corresponds to a vector or to a scalar transmission. Rather, the switching between vector and scalar transmissions is determined identically by encoder and decoder without explicit signalling to denote the vector or scalar type of coefficient or command.

Specifically, in FIG. 7 the output from Zero Detector 5, 246, is the zero detected quantized previous coefficient which is input to the Decoder Control 245 which controls whether the Vector Table or the Scalar 1 Table is used. The output from 246 is synchronous with the previous quantized and zero detected input 232 to the Encoder Logic Block so that encoder and decoder use the same Look-up Table. This Look-up Table decision as well as a command to decode data is passed to Variable Length Decoder 240 which in turn generates the Token 254 and which is input to the Decoder Control 245. The output from ZD6, 247, is not used with the Minimum Feature method and will be described later with the Full Feature Actions.

The output from ZD5, 246 and the Token 254 are sufficient to generate the outputs Switch Control 255 and Coefficient 265. The decoder token has the same data format as the encoder token passed from Pass 2 Token Generator 225 to Variable Length Encoder 230 in FIG. 7. For the Vector Alphabet in Look-up Table 1 the token contains a value and a run-length. For the Scalar 1 Alphabet in Look-up Table 2, the token can indicate the Erase command without any value, the Modify No Change Command with no value, but known to equal zero, and the Modify Change Command with accompanying differential coefficient value. Table 2 shows the outputs Switch Control 255 and the Coefficient 265, if any, for the Minimum Feature Actions at the Decoder.

TABLE 2

Decoder Minimum Feature Actions

| Case # | ZD5 | Token Data | Switch Control 255 | Coefficient 265 |
|---|---|---|---|---|
| A | 0 | — | 1 | — |
| B | 0 | Run-length & Value | 2 | Decoded Value |
| C | 1 | Erase Command | 3 | — |
| D | 1 | Modify, No Change | 1 | — |
| E | 1 | Modify, Change | 4 | Decoded Value |

TABLE 2

The Coefficient Value 265 in FIG. 7 and in Table 2 is passed to switch 143b in FIG. 6b. The Switch Control 255 in FIG. 7 and in Table 2 is shown in FIG. 6b as Switch Control 144 and controls both sections of Switch 143, also in FIG. 6b. The most counterclockwise position of this switch in FIG. 6b is position one while the most clockwise position corresponds to position four.

Operation with The Minimum Feature Table can produce operation which is not in some Interframe coding situations as efficient as operation with the Full Featured Table 3. One such situation is a block of coefficients which has been transmitted with a low Q value thus establishing high quality image reconstruction. Increased demands for replenishment of different blocks in a subsequent frame then causes the Q value to rise in order to not overflow the bits-per-second transmission channel capacity. The higher Q value may cause erasure of low amplitude coefficients in the aforementioned block which was previously reconstructed with the low Q Value which are still a valid part of the image. When the Q value is subsequently lowered after the motion subsides the low amplitude coefficients are then retransmitted to the receiver and the block is then adequately represented by coefficients for good quality reconstruction. The process of erasure and subsequent re-transmission can be avoided through use of the Full Featured Table of operation which considers both quantized values of coefficients and non-quantized values of the same coefficients.

TABLE 3

Encoder Full Feature Actions

| Case # | 231 | 249 | 232 | 229 | 228 | >Thresh. | Action | 235 | 226 | 243 |
|---|---|---|---|---|---|---|---|---|---|---|
| 1) (A) | 0 | X | 0 | 0 | X | X | Null | 0 | 3 | 0 |
| 2) (B) | X | X | 0 | 1 | 1 | X | Vect. Est. | 1 | 2 | 0 |
| 3) — | 1 | X | 0 | 0 | 0 | X | Scaler Erase | 2 | 3 | 2 |
| 4) — | 1 | X | 0 | 0 | 1 | Th. 1 0 | Modify (N.C.) | 3 | 1 | 2 |
| 5) — | 1 | X | 0 | 0 | 1 | Th. 1 1 | Scaler Erase | 2 | 3 | 2 |
| 6) — | 1 | X | 0 | 1 | 1 | Th. 2 0 | Modify (N.C.) | 3 | 1 | 2 |
| 7) — | 1 | X | 0 | 1 | 1 | Th. 2 1 | Modify (Chg.) | 7 | 4 | 2 |
| 8) (C) | 1 | X | 1 | 0 | 0 | X | Scaler Erase | 2 | 3 | 1 |
| 9) (D) | 1 | 0 | 1 | 0 | 1 | X | Modify (N.C.) | 3 | 1 | 1 |
| 10) (E) | 1 | 1 | 1 | 1 | 1 | X | Modify (Chg.) | 7 | 4 | 1 |

In Table 3 the letters in parentheses next to the Case number refer to a corresponding case in the Minimum Feature Actions. The header numbers for Table 3 refer to inputs from, and outputs to Encoder Logic Block 216 in FIG. 7. In the column "<Thresh." the Th.1 and Th.2 refer to blocks 226 and 227 in FIG. 7. "Th.1 0" means that the value of the output of Threshold Detector number one is zero, whereas "TH.1 1" means that the output is one. Th.2 is usually set to a greater value than Th.1. The suffix "N.C." indicates "No Change" The suffix "(Chg.)" indicates "Change" and the modification value is to be the quantized Differential value 224, input to the Coefficient Encoder 215 in FIG. 7. Also, all "Modify" actions are scalar actions, although not labeled as such in Table 3. "X" means do not care; "–" means not applicable.

Note that Table 3 is divided into three sections, the first containing Cases 1 and 2, the second containing Cases 3 through 7 and the last containing Cases 8 through 10. Within each of these three sections the columns having headings 231 and 232, indicating non-quantized and quantized previous image coefficient data, have the same pair of data entries. These entries also appear at the Decoder 241 in FIG. 7 since the previous image non-quantized and zero detected value appears at the output of Zero Detector 6, 247, the quantized and zero detected value appears at the output of Zero Detector 5, 246, and the value of the Q value has been separately transmitted from the Encoder to the Decoder. This Q Value 260 is shown in FIG. 7 as issuing from the Decoder Logic Block 245 after being decoded in Variable Length Decoder 240. Thus, the Decoder can by itself subdivide transmissions into one of the aforementioned three sections. This ability of both Encoder and Decoder to independently determine the appropriate section of cases permits automatic switching between vector and scalar operation and use of three separate variable length look-up coding tables. The alphabet for Cases 1 and 2 need only contain vector entries and the End-of-Vectors code. The scalar tables for the other two sections need only contain scalar entries. The table for Cases 3–7 can have code lengths assigned which are different lengths than for Cases 8–10 to take into account different probability distributions for the two sections. Thus, the coding tables are optimized for each situation and switching between them is accomplished without transmission of any mapping data for their selection.

The Decoder Full Feature Actions are shown in Table 4 and include the output of ZD6, 247, in FIG. 7 as an input in addition to other inputs of Table 2.

TABLE 4

Decoder Full Feature Actions

| Case # | ZD6 | ZD5 | Token Data | Switch Ctl 255 | Coefficient 265 |
|---|---|---|---|---|---|
| 1) (A) | 0 | 0 | — | 1 | — |
| 2) (B) | X | 0 | Run-length & Value | 2 | Decoded Value |
| 3) — | 0 | 1 | Erase Command | 3 | — |
| 4) — | 0 | 1 | Modify, No Change | 1 | — |
| 5) — | 0 | 1 | Modify, Change | 4 | Decoded Value |
| 6) (C) | 1 | 1 | Erase Command | 3 | — |
| 7) (D) | 1 | 1 | Modify, No Change | 1 | — |
| 8) (E) | 1 | 1 | Modify, Change | 4 | Decoded Value |

It can be seen in Table 4 that the actions for Cases 6, 7 and 8 are identical to those for Cases 3, 4 and 5. However, the ZD6 has the value of one for Cases 6, 7 and 8, and zero for Cases 3, 4 and 5. The only difference at the Decoder is that the Scalar 2 Look-up Table is used for Cases 6, 7 and 8 whereas the Scalar 1 Look-up Table is used for Cases 3, 4 and 5.

There are several other combinations of the binary values in the columns theoretically possible but these do not represent possible cases in practice. One reason is that a quantized coefficient value cannot be non-zero and the corresponding non-quantized coefficient value be zero since the Q value must be one or greater. These cases are thus omitted from Table 2.

A syntax for the communication of Interframe data transmitted from an Encoder to a Decoder containing transform coefficients and commands is now described. Additionally said commands are herein defined. This syntax is only for transform coefficients and related commands at the block layer and does not include side information such as motion vectors, and data at a higher layer of the data transmission hierarchy such as start codes etc.

There are three major types of vectors. The first is the Establish Vector which establishes a non-zero value coefficient at a Zig-Zag list location where the transform coefficient list for the previous image usually contains a zero value coefficient. The second is the Erase Vector which sets to zero the value at a specific point along the list or all of the values on a specific path, or a portion of the values on a specific path, where a path is defined in the next paragraph, and where the location of the point or path is transmitted to the Decoder. The Erase vector which sets one or more values to zero is used only in the non-precise calculation method and won't be used in the precise calculation method which is first described now. The third item is the End-of-Vectors (EoV) command which belongs to the Vector alphabet but is not strictly a vector entity.

The syntax of data for a block must contain at least one vector or one scalar item other than the EoV command or else it is indicated at a higher level of syntax that no data is sent for said particular block. The remainder of this syntax description presumes that block data transmission occurs. An EoV transmission message must be included in each block transmission. This message informs the Decoder that no vectors are to be transmitted for this block after the EoV message. Data for the block which is transmitted before the EoV occurs are on one or more paths, each path being defined as all the list locations after the previous path, or the start of the list if it is the first vector, and including the end point of the present vector. All of the list locations up to the point of the EoV must each be on a path. One path exists for each Establish type vector. Any data transmitted for a block after the EoV must be scalar in nature and is located on one single after-path which extends to the end of the block list. Paths do not overlap and all of the paths including the after-path as a group include all of the Zig-Zag list locations. All scalars are marked for transmission by a non-zero value coefficient on the list of the block for the previous image, or more generally the reference image. Identical lists representing the previous image are located at both Encoder and Decoder.

FIG. 8 shows by example an overall replenishment process containing the transmission of data from Encoder to Decoder. It is simplified in that the quantization process is not shown. Line 8a shows pictorially the transform coefficients from the present image located along the Zig-Zag list for some exemplary coefficient data. The list location appears along the horizontal axis and the coefficient amplitude is shown on the vertical axis. The start of the Zig-Zag list is shown at 280 and the end shown at 285. Line 8b shows exemplary coefficient data for the same block, which may or may not be motion compensated, for the previous image. The data in Line 8b is to be used as a prediction of the Line 8a data at both Encoder and Decoder. The transmitted data is shown in Line 8c which is used to modify the previous image data models, i.e., the Line 8b data held identically at both Encoder and Decoder to generate the new model which is then identical to Line 8a for the case of a Q Value equal to one which is the case for no quantization. For the Q value not equal to one the new model is an inexact replica of the present image of Line 8a. The transmitted data appearing in Line 8c is shown with a single arrow head for scalar data, a double arrow head for vector data and an arrow with an 'x' at the head for a scalar command. The EoV is not shown in Line 8c but its transmission occurs directly following transmission of the second vector.

In this particular example the previous image in Line 8b has a three non-zero value coefficients and the present image in Line 8a has four non-zero value coefficients. The first and third non-zero value coefficients, proceeding from the left to right in the present image of Line 8a, are at list locations occupied by non-zero value coefficients in Line 8a and Line 8b. Other non-zero value coefficients in lines 8a and 8b are not aligned. Additionally, the third non-zero value coefficient in Line 8a has the same value as the third non-zero value coefficient in Line 8b.

Five distinct data items are transmitted for the case of FIG. 8. The order of transmission of the items will be discussed after the five items are first described. Starting from the left at 280 the first item is a scalar numeric difference which, when added to the previous image value, yields the present image value. The second item is a scalar Erase, sometimes also called a Force Zero, which sets the second non-zero coefficient value in Line 8b to zero in the new model. The third item is an Establish vector. A scalar cannot be used here because the previous image list contained a zero value at this list location. The fourth item is a scalar numeric difference value of zero since the value at this location has not changed from the previous to the present image. The fifth item is the second Establish vector and defines the second path which commences one list location past the end of the first path and ends at the location point of the second vector.

The first path in the transmission list of Line 8c is defined as spanning all list locations from the start of the list 280 up to and including this first vector location on the list where the associated non-zero value coefficient is to be placed. The fourth item is a scalar numeric difference value of zero since the value at this location has not changed from the previous to the present image. The fifth item is the second Establish Vector and defines the second path which commences one list location past the end of the first path and ends at the location point of the second vector.

In all, five items are transmitted comprised of two vectors, two scalar numerics and one scalar Erase command. In the prior art signalling system four vectors are required to transmit these data changes. No vector is required for the case where the coefficient value does not change from the previous to present images; hence only four messages to transmit for the prior art system instead of five for the system of this invention. However, all four messages are vector in nature.

The order to transmission of vectors is in the order that they occur along the Zig.-Zag list from 280 to 285 in FIG. 8. The order of transmission of scalars is also in the order of their occurrence along the Zig-Zag list. However, the order of scalar transmissions relative to vector transmission may be one of multiple pre-defined orders. One order has all vectors transmitted first followed by transmission of all of the scalars. However, the order to be used in the present description will have the vector and scalar transmissions intermingled such that after an individual path becomes defined by the transmission of a vector all of the scalars which are located along that path are then transmitted. The next vector is then transmitted followed by the scalars along that next path defined by said next vector. This ordering method simplifies decoder implementation since the coefficients are used by the decoder in the order they are received.

In the example of FIG. 8, the order of transmission of the five data items is as follows. First transmitted is the first vector which is at the end of the first path in Line 8c. Second transmitted in the first scalar which is the scalar numeric on the first path. Third transmitted is the scalar Erase command on the first path. Fourth transmitted is the second vector located at the end of the second path in Line 8c. Last transmitted of the five data items is the scalar numeric with value equal to zero. In this example there are no further defined paths and hence the EoV is next transmitted. If scalars were to exist along the afterpath they would be transmitted after the EoV message. Since there are none in this case the transmission is complete for this block with the EoV message.

FIG. 9 shows a second example wherein the Path Erase command and the Path Skip commands are used. These commands can be sent to improve the transmission efficiency in some cases by causing an erase or a skip action relative to multiple non-zero value coefficients in the previous image. In the previous example of FIG. 8 the transmission of a scalar numeric difference with a value of zero constitutes a skip-over action since the coefficient value is unchanged by the transmission. The path type of command is a scalar action which commences at a marked non-zero value coefficient location in the Zig-Zag list for the previous image on a path defined by a vector transmission and ends at the end of said path. In particular for an Erase path command the action is to set to zero every coefficient on the list for the previous image starting with the marked location with which the command is associated and ending at the end of that path on which it started. For a Skip path command the action is to leave unmodified every coefficient on the list starting with the marked coefficient associated with the command and ending at the end of the path on which it started.

Figures 9A, 9B, 9C:
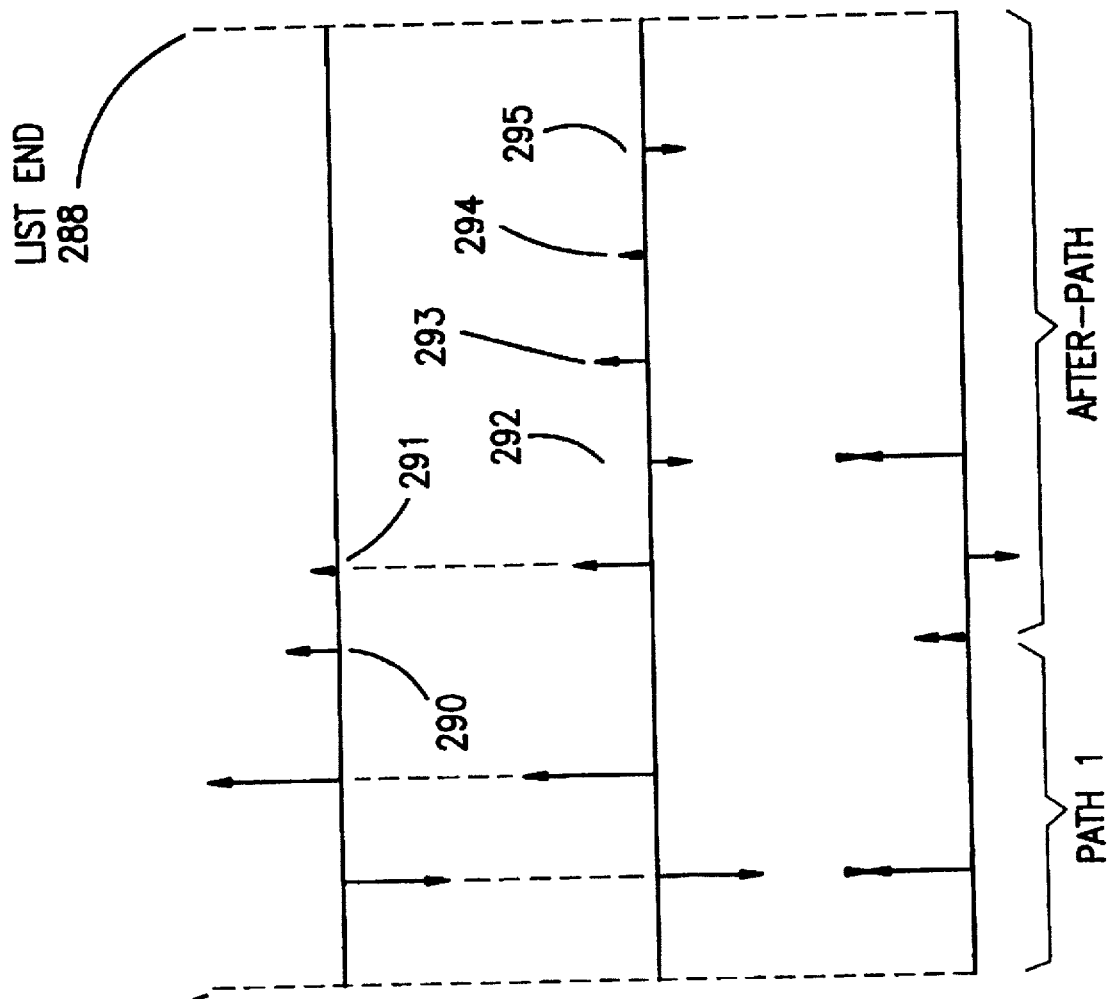
FIGS. 9a, 9b and 9c is an illustration of the replenishment process when implemented using path commands.

The exemplary coefficient values of the present image are shown in FIG. 9a while the values for the previous image are shown in FIG. 9b. In this case there is only one Establish vector to transmit since all other non-zero value coefficients in the present image are marked by non-zero coefficient values in the previous image. The first item transmitted in this first and only Establish vector. There are two coefficients on the path defined by the Establish vector which do not change value from previous to present image lists. At the marked location of the first a Skip Path command is transmitted which indicates that all coefficients up to the location of the first Establish vector are to be left unmodified from the previous image. The next transmission is the EoV message since there are no further Establish type vectors.

On the after-path there are five non-zero value coefficients for the previous image and one for the present image. The last four on the previous image list might be artifacts occurring due to a motion compensation process. The value of coefficient on the present image list has changed value from the previous list and the scalar numeric difference is next transmitted to effect this change at both decoder and encoder. The next marked location by the previous image list is the first of four non-zero value coefficients which in the present image list have a value of zero. A path Erase command is transmitted here which has the desired effect of forcing to zero all coefficients on the remainder of the after-path. This completes the transmission.

By way of comparison, this transmission is comprised of one vector, one scalar numeric and two commands. A prior art system would essentially require transmission of six vectors to accomplish equivalent signalling corresponding to coefficients 290, 291, 292, 293, 294 and 295 in FIG. 9, since vector transmissions are required for all changes including coefficient values which must be set to zero.

The Erase Path and Skip path commands cannot be used on the same path since once a path command is invoked it applies to all remaining coefficients on the path and the decoder does not expect any further scalar messages on said path; the next expected message is a vector message if the EoV has not yet occurred, or if it has occurred then no further data is expected.

Two further commands for the non-precise calculation case are the Global Erase and the Global Skip commands. These two commands produce similar actions to the previously described Path Erase and Path Skip commands except that once invoked their action does not end at the end of the current path but rather at the end of the list regardless of the number of further paths on the list. These commands, like the previous path commands, only apply to list locations in the previous image which are marked by the presence of non-zero value coefficients. Hence, there is no restriction to establishing new non-zero value coefficient values at non-marked list locations after the Global command has be initiated.

In the example in FIG. 9 a Global Erase command could have been used instead of a Path Erase command since the after-path on which the Path Erase occurred was the final path and the effect would be exactly the same for the Global Erase. However, the particular variable length code may be shorter for the Path Erase command than for the Global Erase command. If so, where there is a choice then the Path Erase command should be selected for use.

An example of use of the Global Path Skip command is shown in FIG. 10. The present image coefficient list contains all of the entries in the previous image coefficient list plus two additional entries shown as 295 and 296. This situation might arise wherein Fade Compensation is employed. The Fade Compensation process adjusts all coefficients in a block according to a single parameter transmitted for the block to compensate for a fade-in or a fade-out of a sequence of images. Since an image transform is usually a linear mathematical process a fade-in in the picture domain results in amplification of the transform domain coefficients many already in place in the previous image list; a fade-out results in reduction of the transform domain coefficient values. The location along the Zig-Zag list of the coefficients is not modified by the fade process. However, a fade-out eventually results in coefficients approaching a value of zero and a fade-in results in new non-zero value coefficients identified as the fade-in proceeds. Fade Compensation will be discussed further later on. In the example of FIG. 10 the two additional low amplitude non-zero value coefficients might occur as a result of a fade-in process.

The data which must be transmitted for the example of FIG. 10 is first an Establish vector for coefficient 295 in FIG. 10a. The second transmission is marked by the scalar 297 in FIG. 10b. Since this value and all subsequent scalar values are unchanged in the present image list relative to the previous image list a Global Skip command is transmitted to communicate this situation. This command applies to the present path and all remaining paths in this present block. The third command is a vector transmission in response to the coefficient 296 in FIG. 10a. Since this is the final vector an EoV message is next transmitted and is the final transmission. The final scalar marker occurring after the location of the final vector is skipped over due to the Global Skip command. Each skip-over results in the coefficient value from the previous image being used to create the new model image by the Decoder or Encoder.

At least two distinct alphabets are used for the Interframe transmission signalling of transform coefficients and commands. The first is the Vector alphabet. For the precise calculation case the alphabet includes variable length codes for all of the vector combinations of run-length and value which can occur, similar to the H.261 Standard alphabet, and the End-of-Vectors (EoV) message. Whenever a Vector message is to be transmitted, this alphabet is used. The vector alphabet look-up table responds to a particular input, either the run-length and value combination or the EoV message, and generates the corresponding pre-determined variable length code for transmission.

The second alphabet is the Scalar 1 alphabet which includes all of the scalar numeric values which can occur and the four commands which are, 1) Path Skip Command,
2) Path Erase Command,
3) Global Skip Command,
4) Global Erase Command, and
5) Point Erase Command.

The Point Skip operation is taken care of by a numeric zero transmitted as a difference value. The alphabet look-up table responds to a particular input token which is a scalar value or one of the commands and generates for its output a pre-determined variable length code for that particular input.

A third alphabet which can be used is the Scalar 2 alphabet used only for the Full Feature coefficient encoding case and when selected as previously discussed by the external Block commands and certain conditions of the quantized and non-quantized previous coefficients. This third alphabet has the same set of inputs as the other scalar alphabet. However, the variable length output codes provided by this alphabet are determined on the basis of different probabilities and can thus be different codes than those of the Scalar 1 alphabet.

The signalling of a block always starts with transmission of a vector, even though it may be the EoV message. After a vector has been transmitted any scalars along the path created by said command are transmitted unless precluded by a scalar path or global command. As soon as all of the scalar signalling along a path is completed then the next item expected is a vector transmission unless the EoV has already been sent in which case the transmission for that block is complete.

In the Vector/Scalar signalling system of this invention several of the transform coefficient changes which must be made to produce a subsequent image at the decoder using the previous image coefficient mode as a starting prediction can be made using the more efficient scalar signalling. However, it is also possible in this invention to improve the vector signalling efficiency by a new technique which generally compresses the range of run-lengths calculated for the Establish vector coefficients in the Zig-Zag list. This is an integral part of the Vector/Scalar signalling system and is next described.

The prior art employs a run-length determination by calculating the difference between the location of the current vector position on the Zig-Zag list and the location of the prior vector on the same list and then subtracting one. The location of the first coefficient, not including the d.c. coefficient which is the average value of all 64 pixel elements in the block, is at an index value of one. If the first coefficient to be considered for run-length determination has an index of one its run-length is zero in that the d.c. coefficient prior to it had an index of zero. Thus, the run-length can be from zero as a minimum to 62 as a maximum, the latter occurring for the case where the first non-zero value coefficient after the d.c. term has an index of 63 corresponding to the last location on the list.

Run-lengths tend to be short, however, and the probability density for values of run-length peaks at zero and decreases continuously for higher values. Given the same coefficient value in either case, a shorter run-length will be given a shorter variable length code and a longer run length will be given a longer variable length code due to their relative probabilities of occurrence. The efficiency of the variable length coding process is improved when the likelihood of some specific events in a set of events becomes higher and the likelihood of other events becomes lower.

To further enhance the higher likelihood of shorter run-lengths occurring, the Vector/Scalar system omits counting for reckoning the run-length of the Establish vector those locations on the Zig-Zag list for the previous image where non-zero value coefficients occur. This method is feasible for two reasons. First, an Establish vector is never generated so as to be located at the list location of a non-zero value coefficient in the previous image Zig-Zag list. If a modification in said coefficient is required it is implemented by the more efficient scalar modification process. Second, the previous image Zig-Zag list has been stipulated to have non-zero value coefficients at the same locations at the Decoder as at the Encoder. This latter reason guarantees the same counting process at both Encoder and Decoder and can, therefore be used without counting errors.

Figure 11:
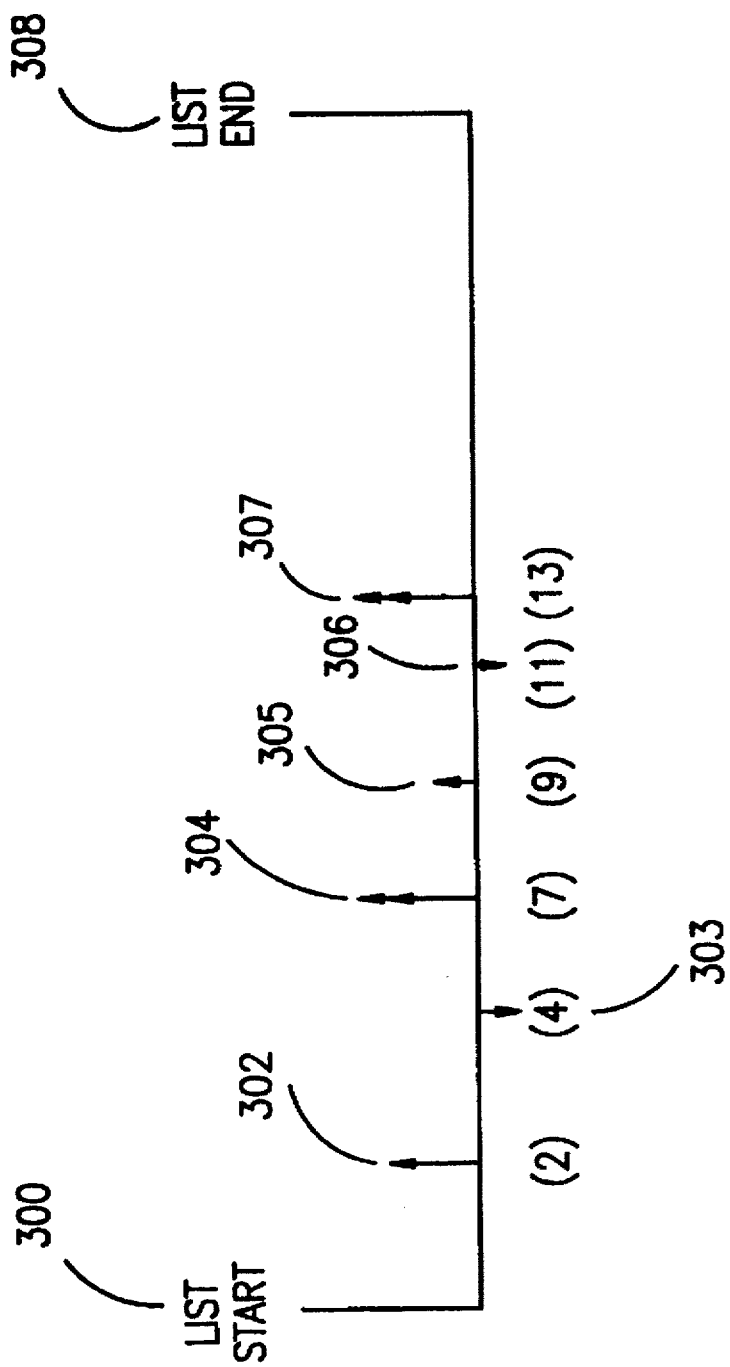
FIG. 11 is an illustration of how run length is calculated under certain conditions.

FIG. 11 shows a Zig-Zag list where two vectors at 304 and 307, located at indexes seven and 13 respectively, are to be transmitted. Two non-zero value coefficients 302 and 303, located at indexes two and four respectively, are in the list corresponding to the previous image. The first vector 304 is located at index seven. In the prior art system a run length is calculated as seven minus zero minus one, or the value six. In the Vector/Scalar system the run-length is reduced by two due to the two non-zero value coefficients in the previous image list at index locations of two and four which are not counted. Thus, the run-length is four rather than six for the first vector in the Vector/Scalar system.

For the second vector in FIG. 11, the prior art run-length is calculated as 13 minus seven minus one which results in a value of five. The two intervening non-zero value coefficients in the previous image list between the first and second vectors are to be erased by a single Path Erase command. This latter facet is not directly visible in FIG. 11 but is stated as being the case for illustration purposes. The items to be erased by a Path Erase command, 305 and 306, are both shown in FIG. 11. Thus the run-length determination for the Vector/Scalar system in the presence of a Path or Global command is the same as the case for non-Path or non-Global cases. The run-length value in this case is reckoned as 13 minus seven minus one minus two, the last substraction being for the two non-zero values on the previous image list. The result is three, a reduction of two from the prior art reckoning. It will be seen later, however, this counting procedure is sometimes restricted for some locations for the non-precise calculation case.

Next described for the precise calculation case is the method of creating a transmission list given the previous and present image Zig-Zag lists in quantized and non-quantized form as shown in FIG. 6a and the outputs from zero detectors as shown in FIG. 7. Also described is the method for using the transmission list received at a decoder and with the previous image Zig-Zag list saved at said decoder regenerating a list identical to the present image list at the Encoder, subject to the aforementioned limitation that the Q Value equal one.

The method for generating the transmission list uses two sequential mechanized passes through the Zig-Zag lists. Each pass is mechanized such as to require a fixed number of processing steps wherein each processing step takes one clock cycle when implemented in a dedicated hardware configuration. Thus, two passes through a block of 64 coefficients requires 128 processing steps. One stage of buffering of data to be transmitted can be required at the point the EoV message is sent if a scalar transmission occurs at the list location following the final vector location on the list. Not included in this clock cycle count is any evaluation of the coefficient data prior to the Pass 1 process which could include a Fade Compensation estimation. A single mechanized pass through the transmission list at the decoder is required. The fixed number of clock cycles aids a real-time video compression system to keep up with high speed input video data by design.

A consequence of monotonicly proceeding through the Zig-Zag transform coefficient list and hence observing the data at each location only once in each of the two passes is that certain notetaking must be done which is then carried forward as one proceeds through said list. This includes not only times which must be signalled by the encoder to the decoder but various flags, counts and parameters which affect signalling over entire paths and groups of paths. A portion of this data carried forward during Pass 1 is used further along in Pass 1 and some issued to the Pass 2 process to allow it to efficiently devise the list of transmission tokens.

The methods for developing the transmission list at the encoder and reconstructing the coefficients at the decoder are described through use of flow charts which describe each step or process in sequence. In these flow charts diamond shaped blocks are used to denote selection of processing flow which is dependent upon some index, parameter or piece of data. Rectangular blocks denote some form of arithmetic processing, setting of parameter(s), incrementing or decrementing an index, etc.

The first pass through the present and previous coefficient data identifies the Establish vector messages and associated run-lengths and creates a temporary list of them to issue to the processing of the second pass through the data. This first pass also takes notes which aid the later determination of path and global signalling.

The second pass operations at the encoder generate the transmission list which is given to the appropriate vector or scalar variable length look-up table which in turn issues that variable length message to be transmitted.

The flow charts show the generation of the transmission list as the output from the encoder but not the particular variable length codes. The variable length code generation and decoding processes, as previously mentioned, are well known processes to those familiar with this art. As the invention does not change this variable length coding process and inclusion of it would unduly complicate the description of the invention it is not included here. Thus, the transmission list generated by the encoder in this description is simply supplied to the Decoder in list format without showing the details of the variable length encoding and decoding processes. In an actual video compression system, the variable length encoding and decoding is a lossless process, given errorless transmission, and hence the same transmission list is transparently generated by the variable length decoder and supplied to the Decoder as was generated at the Encoder.

FIG. 12 shows the Pass 1 overall flow structure for the precise calculation case and is applicable to either the Minimum Feature or the Full Feature method.

The operation of the flow chart in FIG. 12 depends on items in FIG. 7 including the Mode, 235, the present quantized data, 219, and the differential quantized data, 224.

The Pass 1 Processing structure of FIG. 12 commences with the initialization of parameters and indexes in block 310 and then proceeds to block 312 wherein a Code Number ICN, which is the Mode 235 in FIG. 7, is determined by calling a subroutine which analyzes the coefficient data for the present value of N.

Sixty-three iterations of the processing occur starting with the decision block at 315 in FIG. 12. The processing flow continues via one path or another down to block 335 which determines whether all list locations have been treated in which case the iterative processing of Pass 1 is done and the Skip and Erase Global Processing, 340, is performed, or whether further iterations are necessary. When done block 340 is executed wherein final values for the path numbers to prevent Global skipping and Global erasure are determined.

Block 315 in FIG. 12 determines whether a scalar operation is to be performed or not at the particular list location with index N by determining whether or not the previous image coefficient IR(N) value was non-zero or not. Block 325 further branches the processing flow by determining whether or not the code Number, ICN, is greater than two. For ICN greater than two the Modify Processing in block 328 occurs whereas otherwise the Force Zero Processing occurs.

If at index N in block 315 ICN is not greater than one then an examination in block 320 is performed to determine if ICN is greater than zero or not. If non-zero then the Establish Vector Process of block 323 is performed; if zero then the Null process of block 322 is performed.

The five processes at 322, 323, 327, 328 and 340 are further defined in FIG. 13. After one of these four processes 322, 323, 327 or 328 has been performed then N is incremented in block 330 and the already described operation of block 335 performed. Post processing for the Global commands of block 340 is also described.

A data array, IL(4,64) is created in the Pass 1 operation. There is space allotted for 64 groups each with four entries. One group of entries is recorded for each path, except for the after-path. Each group has four entries and LP is the index used to designate each path. The first entry in the group is the Establish vector coefficient value. The second entry is the run-length of said vector. The run-length is counted by LR1 in Pass 1 and passed to IL(2,LP) at the end of each path. The third entry is the list location number where the last prevention of a Skip command can occur. The fourth entry is the list location number where the last prevention of a Force Zero command can occur. After completion of the Pass 1 operation the data array IL(4,*), the Global Skip path number SP% and the Global Force Zero path number EG% are issued to the Pass 2 operation. The other flags, counters, etc. generated during Pass 1 including FSKP, FSKG, FZQTY, FZQTYG, FMOD, FEEN and LR1 are no longer required. The indexes N and LP are re-initialized and used in Pass 2.

There is one flag, FMOD, two counters, FSKP and FSKG, and the IL(3,LP) location which are used for taking notes during Pass 1 concerning possible Skip path and global commands. Similarly one flag FEEN, two counters FZQTY and FZQTYG, and the IL(4,LP) location are used for taking notes during Pass 1 concerning possible Force Zero path and Global commands. These are described in conjunction with the four processes at 322, 323, 327 and 328 in FIG. 12.

Figure 13A:
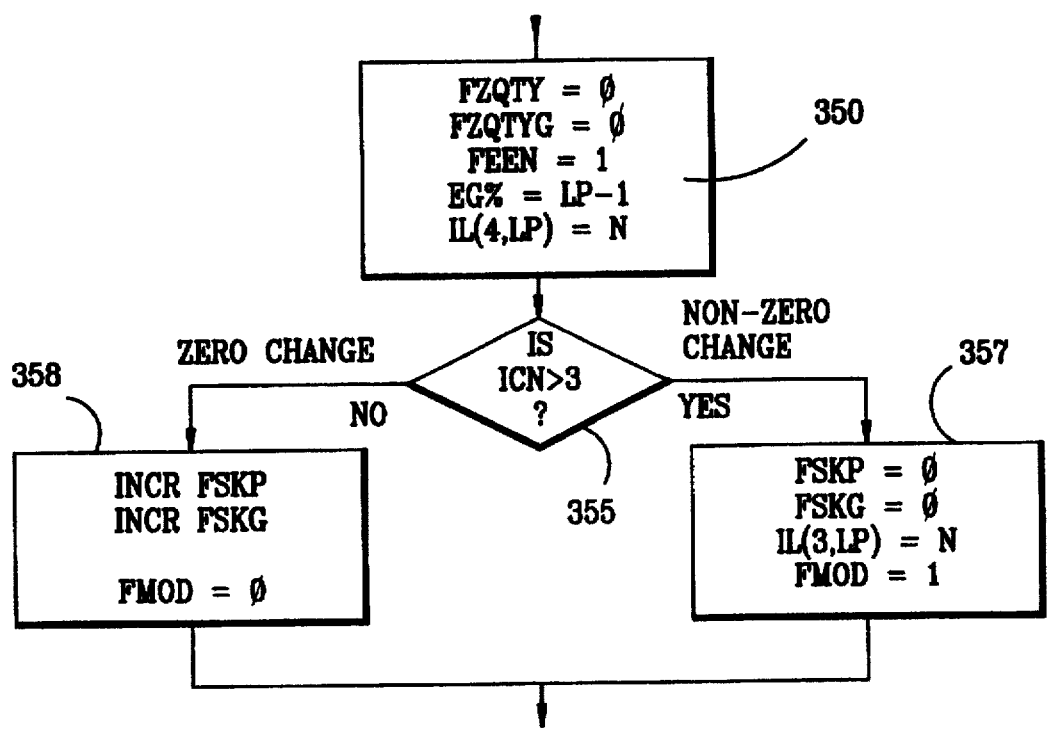
FIGS. 13a, 13b, 13c, 13d and 13e describe details of the processing in the precise calculation mode.

The Modify Process, 328 of FIG. 12 is detailed in FIG. 13a and is now described. In 350 of FIG. 13a processing for Force Zero commands are first performed. The counter FZQTY is reset to zero. This temporary counter records the number of consecutive erasures on a path which ends with an Establish vector or the end of the block and which is not followed by a Modify scalar action, whether of zero value or non-zero value. The counter FZQTYG is also reset to zero. This temporary counter records the number of consecutive erasures which ends with the end of the block and which is not followed by any Modify scalar action. Since this processing path involves a Modify scalar action both counters which count erasures are reset.

FEEN in block 350 of FIG. 13a is a flag which when set to one indicates that a command Force Zero is not possible along the present path, at least up to the present value of N.

FEEN may, however, be subsequently reset to zero along the same path if a Force Zero action is encountered. FEEN, if equal to one at the end of an Establish Vector path, is used to force EG% equal to the current path number. EG% is the path with the highest number on which a Global Force Zero is prevented from occurring. In block 350, however, EG% is set equal to the quantity LP-1, which is the number of the path preceding the present path. Since a Modify process is presently being implemented a Global Force Zero can not be caused to commence on the preceding path regardless of the value of the flag FEEN at the end of the previous path.

Finally in 350 the list location number N is placed into the file at IL(4,LP) to record that a Force Zero command can't start at this location, or at any preceding location on the same path. This completes processing of Force Zero related items in the Modify Process section of Pass 1.

The remaining processing in FIG. 13a concern the Skip actions which are different dependent upon whether ICN is greater than three or not, as determined in 355. If ICN is greater than three then processing flow passes to block 357. Herein the counters FSKP and FSKG are reset to zero. FSKP counts the number of consecutive skips, defined as scalar modifications wherein the coefficient value is unchanged, which have occurred along the present path without subsequently being followed by a scalar Force Zero or a scalar Modify whose value did change between previous and present images. FSKP is also reset to zero at the end of the present path. It is intended to count the number of skips a Path Skip command would cover on a single path. FSKG counts the number of consecutive skips which have occurred without subsequently being followed by a scalar Force Zero or a scalar Modify whose value has changed between previous and present images. FSKG is not reset at the end of a path and is intended for determining the number of skips a Global Skip command would cover.

IL(3,LP) is set equal to the list location value, N in block 357 to mark the highest value in the path where a skip command is prevented. Also, the flag FMOD is set to one to record that the last list location processed prevents a skip command from starting on the path. This flag may be subsequently reset along the same path if a Modify Process occurs wherein the coefficient value is unchanged. At the end of the path the FMOD flag value is inspected. If it equals one then the Global Skip prevent flag SP% is set equal to the current path, LP. This action is shown in the Establish Vector Process later.

If ICN is not greater than three in block 355 of FIG. 13a then the processing flow passes to block 358. The aforementioned counters FSKP and. FSKG are both incremented to record the skip action. The flag FMOD is made equal to zero independent of its previous value indicating that the last item to be encountered on the list on the present path permits a skip command action. This completes the actions of FIG. 13a.

Figure 13B:
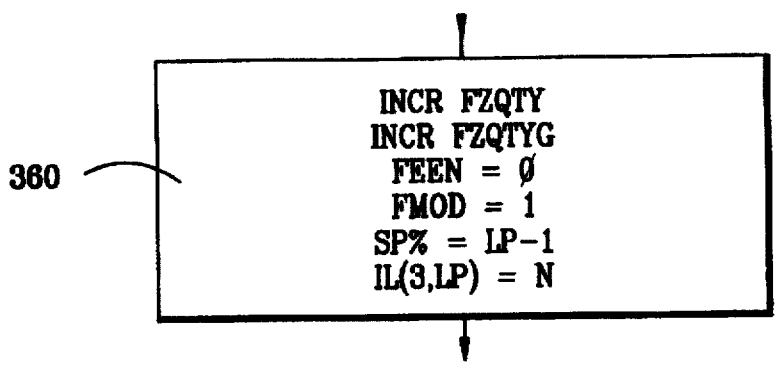

The actions of the Force Zero Process of block 327 in FIG. 12 are detailed in FIG. 13b. Aforementioned counters FZQTY and FZQTYG are incremented in block 360 to record that a Force Zero action has been encountered along the list at the present value of N. The aforementioned FEEN flag is reset to zero to indicate at the end of the path the possibility of a command Force Zero along the present path. The aforementioned FMOD flag is set to one indicating that at this point along the current path a skip command cannot commence.

The path value of SP% is updated to the value of the previous path number at this point indicating that a Global Skip command cannot be initiated in the previous path, due to the presence of a Force Zero action on the present path. Finally, the value of the present list location is written into the file IL(3,LP) to indicate that a skip command cannot occur at this or a previous location on the present path. This completes the actions of FIG. 13b.

Figure 13C:
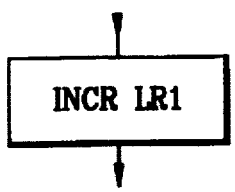

The Null Process, 322 in FIG. 12 is shown in FIG. 13c as simply incrementing the run-length counter LR1. Notice that this run-length counter was not incremented in either of the scalar processing actions of FIG. 13a or FIG. 13b reflecting the process of not counting list locations wherein the previous coefficient value is non-zero.

Figure 13D:
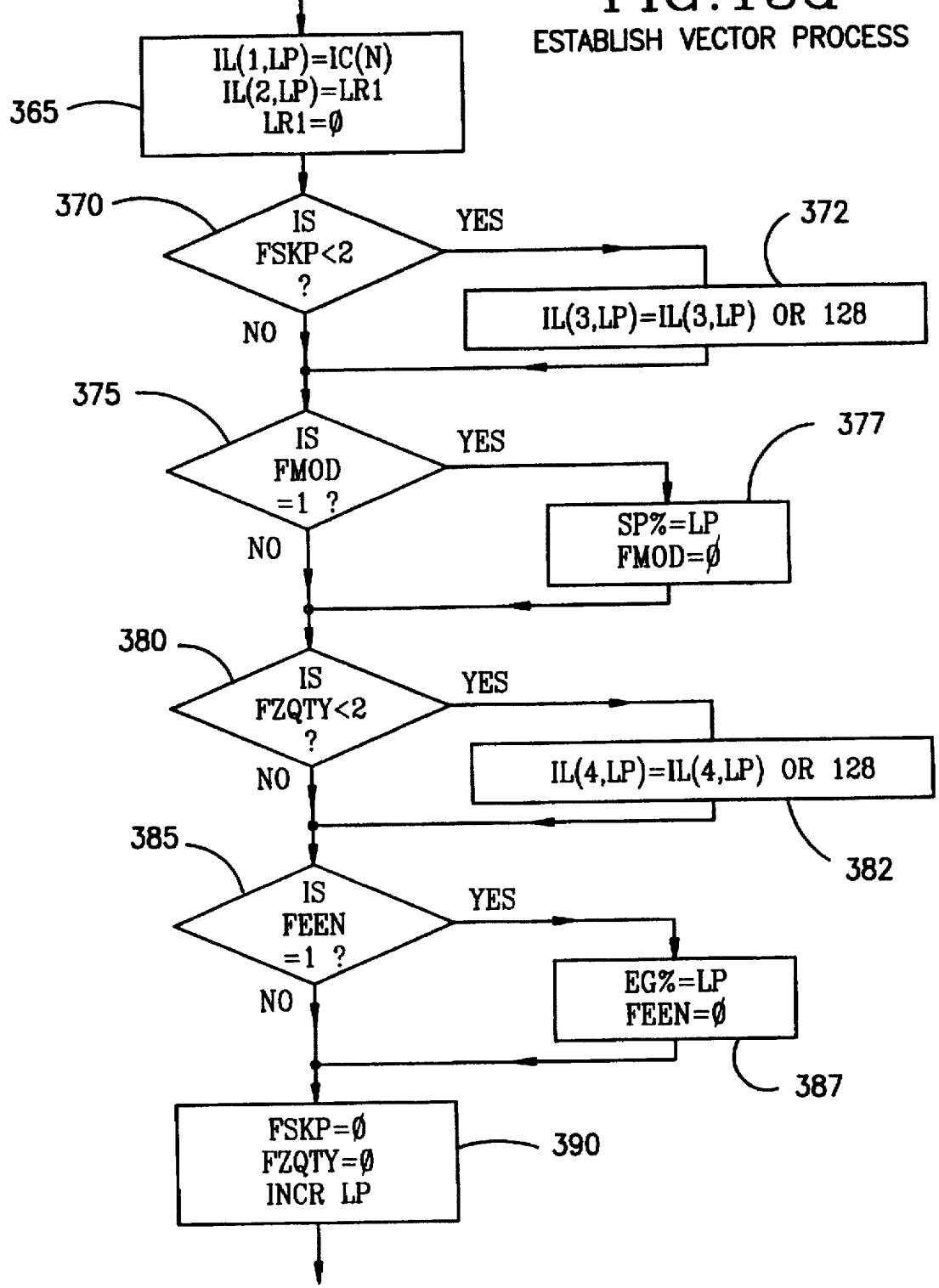

The Establish Vector Process, 323 in FIG. 12 is now detailed with a reference to FIG. 13d. This process occurs where a non-zero coefficient value for the present image and a zero valued coefficient for the previous image occurs. The end of a path is defined by this action and the value of the present image coefficient is entered into IL(1, LP) and the run-length LR1 entered into IL(2, LP). LR1 is then reset ready for counting on a subsequent path. These are performed in block 365.

The actions in block 370, 372, 375 and 377 in FIG. 13d concern skip command processing. The FSKP counter is compared with the threshold value two in block 370 to determine if there were fewer than two qualifying skip occurrences along the path just ended. If so the seventh bit of the file (IL(3, LP) is set to one indicating too few occurrences to invoke a Skip Path command. Since a processing block contains only 63 locations, which in turn can be expressed in only five binary bits, the file IL(3, LP) will never have the seventh bit set to one due to a list location. The seventh bit is therefore free to use for the purpose of indicating too few items for a Skip Path. If the counter FSKP has a value of two or more then the action of block 372 is not taken. In either case processing flow passes to block 375.

In block 375 of FIG. 13d the processing flow is determined by the value of the FMOD flag. If this flag is set to one the meaning is that no skip command is possible in the presently concluded path. As a result the Skip prevent value of SP% is made equal to the current path number and the flag FMOD reset to zero for the next path. If the flag is equal to zero in block 375 the meaning is that a skip command may be possible along the path but must await investigation of further list locations. The value of SP% is left unchanged. Processing flow then passes to block 380 of FIG. 13d.

In block 380 the counter FZGTY which counts the number of Force Zero events is compared against the threshold value of two to determine processing flow, similar to the action in block 370. If FZGTY is less than two then the seventh bit of IL(4, LP) is set to one to register the fact that too few Force Zero events have occurred to use a Path Force Zero. Processing flow then proceeds to block 385 wherein the value of the flag FEEN is determined. If it is one then it is known that a force Zero Global Erase cannot start of the path just concluded and as a result EG% is made equal to the present path number LP in block 387. FEEN is also reset to be ready for the next path.

Processing next occurs in block 390 wherein the two path counters FSKP and FZQTY are reset to zero. Note that the global counters are not reset. The path number LP is also incremented to be ready for operations of the next path.

Figure 13E:
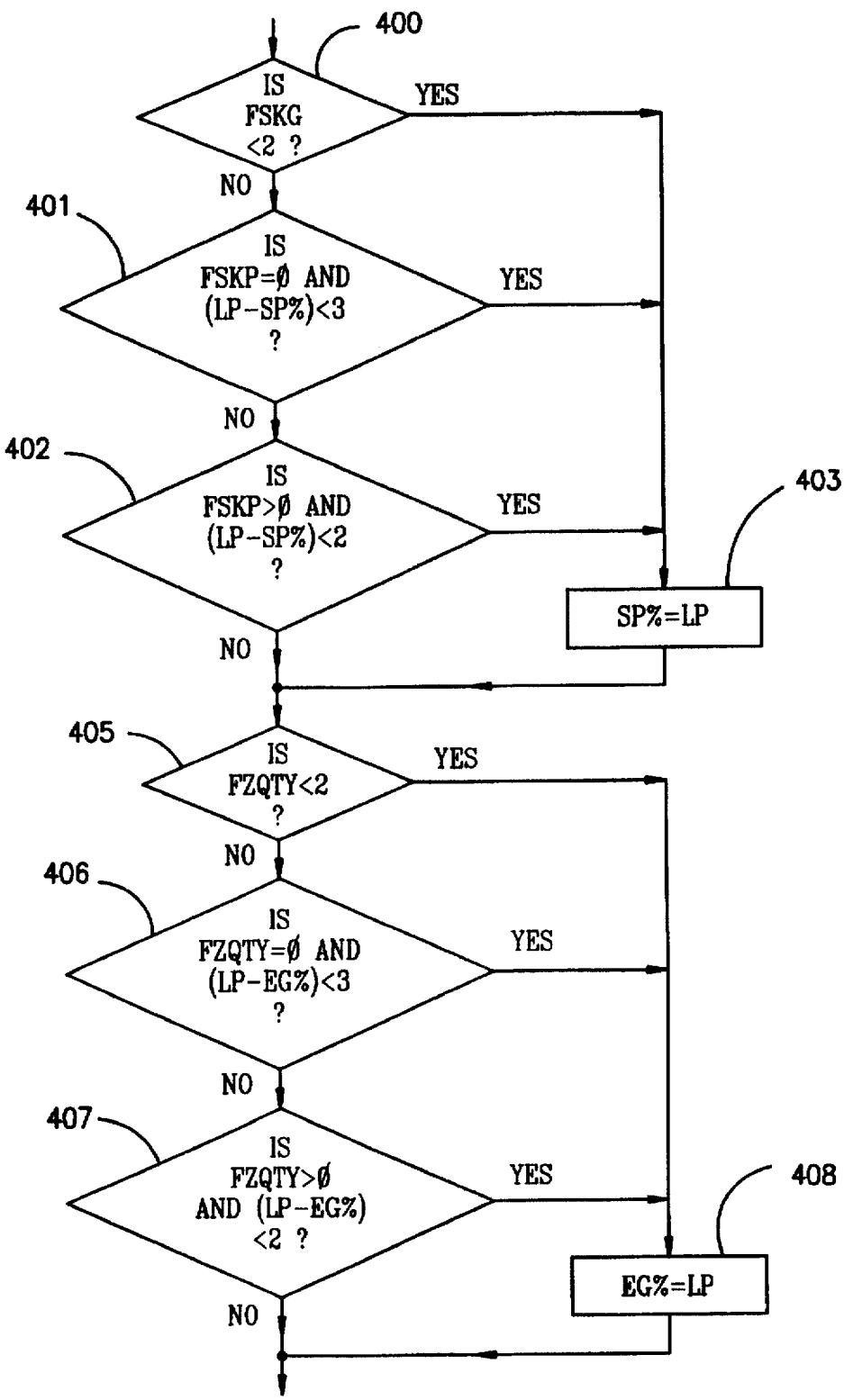

The Skip, Erase Global Processing in block 340 of FIG. 12 is now detailed in FIG. 13e. The purpose of this processing is to determine final values for the Global Skip prevent path value SP% and the Global Force Zero prevent path value EG%. Preliminary values for these two items have already been determined in the iterative processing of FIG. 13 prior to block 340. Adjustment of the preliminary value is to be made if there are too few skips or too few erasures to warrant a global command. The idea here is that a single skip or erasure, although it may be correct to use a global command, is more efficiently signalled not using a command. This infers that the variable length code for a command will be longer than for a single force zero or a modify with zero value change. Adjustment is also made if a single path command can be used instead of a global command. The idea again is that the variable length code for a path command will be shorter than for a global command.

In FIG. 13e the value of the global skip counter FSKG is compared with the threshold value of two to determine if few than two skips will be effected by use of a global Skip command. Since FSKG is not automatically reset to zero at the end of each path it represents the total number of skips eligible to be executed by a Global Skip command. If FSKG is less than two then SP% is set equal to the final path number in block 403 which is usually an after-path although it technically could be an active path. This action prevents a global Skip command from starting at all since it can't start on the last path or any path before the last path.

Block 401 in FIG. 13e determines if a Path Skip command could be used instead of a Global Skip command for the case where a Skip command is allowed on the last active path and on the after-path but where there are no Force Zero events on the after-path to be erased. The test first determines if FSKP is equal to zero. Since FSKP is automatically reset to zero at the end of each active path, FSKP includes at the end of the block only the number of skip events along the after-path. The second test in block 401 determines if LP-SP% is less than three which is to determine if there are less than two paths with skip events on it. Recall that SP% is the last path on which any skip Path is prevented; SP% plus one is then the first path along which a Skip Path is allowed. If the two criteria are met in block 401 then SP% is set equal to LP in block 403 such that a Global Skip command, will not occur.

Block 402 concerns the situation where at least one skip event occurs along the final path as registered by the FSKP counter. In this case the quantity LP-SP% is tested for being less than two. This means that although skip events occurred along the final path a Skip Path was prevented along the path prior to the final path. In this case a single Path Skip command can effect the desired skipping along the final path and a Global Skip command is not necessary. In this case SP% is also set equal to LP in block 403 to prevent the Global Skip command usage.

Blocks 405, 406, 407 and 408 in FIG. 13e select a final value the Global Erase path prevent value, EG%, in precisely the way that Blocks 400, 401, 402 and 403 in FIG. 13e operated to select the final value of the Skip path prevent value SP%. The counter value of FZQTY is used for the Global Erase calculation of EG% rather than the counter value FSKG used for Global Skip calculation of SP%.

This completes discussion of the processing of Pass 1 for the precise calculation case. Saved as a result of this processing for use in Pass 2 are the data array IL(4, LP) and the two Global command prevention values SP% and EG%. The two coefficient lists IR(N) and IC(N) will also be used in Pass 2.

Figure 14:
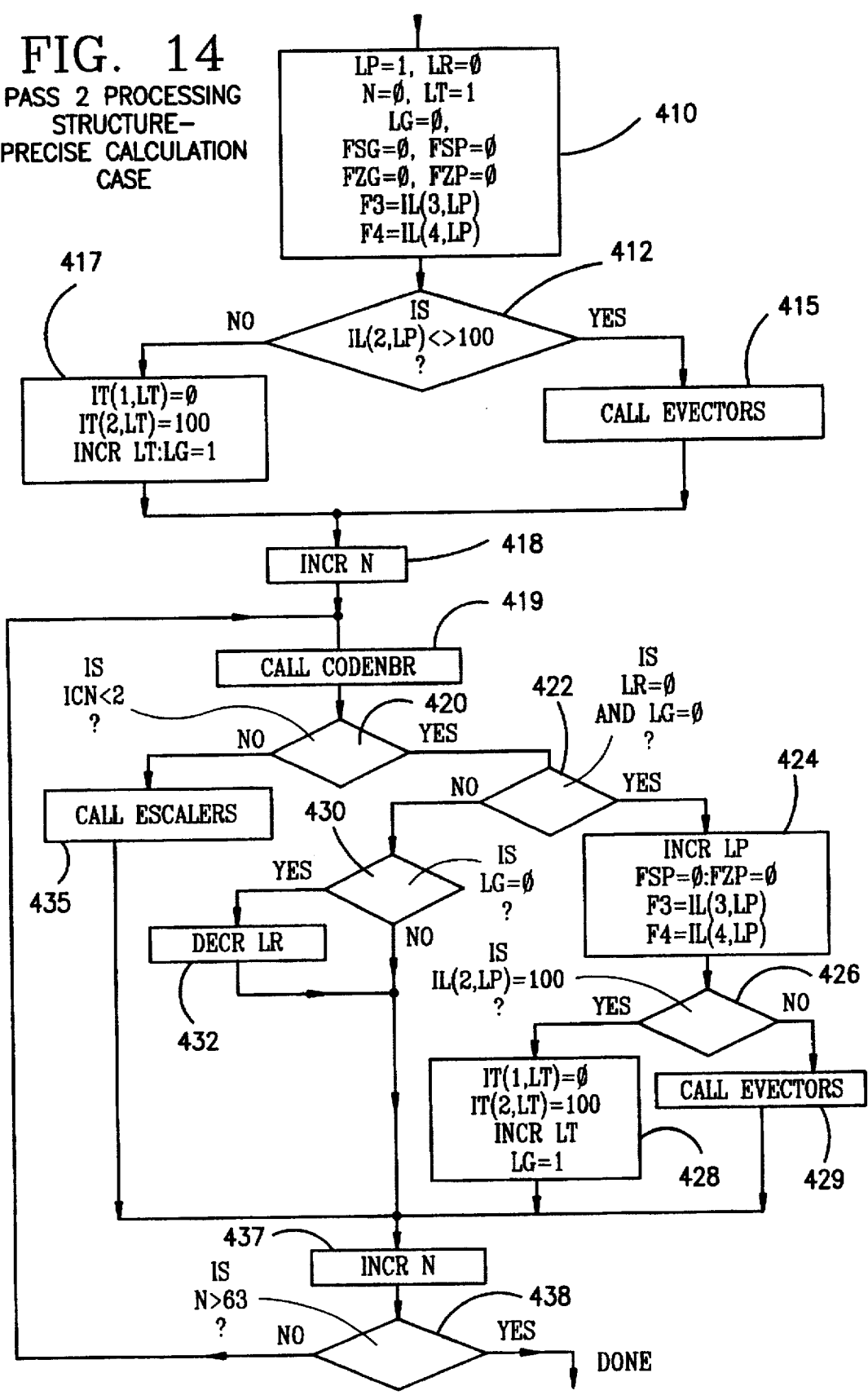
FIG. 14 is a flow chart showing the processing structure of the second pass in the precise calculation mode.

The processing flow for Pass 2 at the Encoder is shown in FIG. 14. The data used by the Pass 2 Token Generator 225 in FIG. 7 is the IR(N) Zig-Zag list of previous image transform coefficients, the IC(N) Zig-Zag list of present image transform coefficients, the IL(4, LP) list generated in Pass 1, the SP% and EG% also generated in Pass 1. The output from the Pass 2 process is the list of transmission tokens, (IT(2,LT). Said tokens are issued to a Variable Length Encoder 230 in FIG. 7 and transmitted to the Decoder. At the Decoder the tokens are recovered exactly by the Variable Length Decoder 240 in FIG. 7, and a list of tokens regenerated identical to those output from the Pass 2 Token Generator 225 at the Encoder. In this description the variable length coding and decoding are not described as stated before; instead the list of Encoder-generated tokens are issued directly to the Decoder Processor 245 in FIG. 7.

Each token is expressed in vector form for convenience having a first part IL(1,LT) and a second part IL(2,LT) even though some are scalar quantities. For actual vector items IL(1,LT) is a coefficient value and IL(2,LT) is the run-length. The run-length value is always between zero and 62. Scalar coefficient difference values are placed in IL(1,LT) and the unique code 105 placed in IL(2,LT). Other scalar commands have unique values in IL(2,LT) and zero in IL(1,LT). The complete list is given as follows:

| Item | IL (1, LT) | IL (2, LT) | Event |
|---|---|---|---|
| 1 | Coeff. Value | Range, 0 to 62 | Vector Coefficient |
| 2 | Coeff. Diff. Value | 105 | Scaler Coefficient |
| 3 | 0 | 100 | End-of-Vectors Command |
| 4 | 0 | 106 | Force Zero Command |
| 5 | 0 | 107 | Global Force Zero Cmd. |
| 6 | 0 | 108 | Path Force Zero Cmd. |
| 7 | 0 | 109 | Path Skip Cmd. |
| 8 | 0 | 110 | Global Skip Cmd. |

There is no significance to the specific numbers used for items two through 8 in the IL(2,LT) column although they must be correctly recognized for the event meaning by the variable length encoder, or in the case of this description the Decoder, which will be described after the Pass 2 description.

Pass 2 processing proceeds monotonicly with index N through the transform coefficient arrays IR(N) and IC(N) starting at zero. A second index LP is used for IL(4,LP) and progresses from one and increments at a later location based upon run-length counting. LT is the index used for the token list which generates IT(*,LT). Other parameters are explained as the description proceeds.

The Pass 2 processing flow of FIG. 14 uses two subsidiary processing systems called EVECTORS and ESCALARS respectively which will be described with reference to FIG. 15 after the description of FIG. 14 is complete. The processing of FIG. 14 and FIG. 15, in conjunction with the Pass 1 processing of FIG. 12 and FIG. 13, accomplishes for the precise calculation method of this invention the blocks 225 and 230 of FIG. 7.

Initialization of indexes and parameters is first performed in block 410 of FIG. 14. The path number LP is set to one, the list location index N is set to zero, the transmission token index LT is set to 1 and the run-length LR is set to zero. The flag LG is used to distinguish whether processing of paths is still active for which LG equals zero or processing has reached the after-path for which LG=1. This flag is initialized to zero. F3 and F4 are used to temporarily hold copies of IL(3,LP) and IL(4,LP) respectively for processing use.

Four flags FSG, FSP, FZG and FZP are used to indicate the status of the two Skip commands and two Force Zero Commands. When these flags are zero at a particular value of N along the Zig-Zag list no commands are in effect. They are initialized to zero at the start of a block. Commands are invoked in the ESCALARS processing to be described later.

After initialization in block 410 of FIG. 14 subsequent processing flow is directed in block 412 where IL(2,LP) is compared with the value 100, the code used for End-of-Vectors. If IL(2,LP) is not the End-of-Vectors code then the EVECTORS processing of block 415 is next performed. This is detailed in FIG. 15a to be discussed later. If the End-of-Vectors code does appear then processing is directed to block 417 wherein the first token, the End-of-Vectors, is generated. IT(1,LT) is set equal to zero and IL(2,LT) is set equal to 100. The index for the tokens, LT, is then incremented. The flag LG is set equal to one indicating for subsequent processing that the list index is now on the after-path.

After either the processing of block 415 or 417 is completed the value of N is incremented in block 418. It should be noted that N was initialized to zero at 410 and not used in the processing for blocks 412, 415 or 417 and then incremented in 418. Therefore, N instead could have been initialized to the value one in block 410 and the block 418 omitted, causing the same result.

Processing next passes to block 419 which calls the subroutine which identifies the Code Number, ICN, to be used in subsequent processing, based upon the input data for the particular value of N in arrays IR(N) and IC(N).

Processing next passes to block 420 where it is determined if ICN is less than two. If ICN is less than two then the action is either to be a Null or a Vector Establish operation and the processing flow is directed to block 422. However, if ICN is two or greater then the action is to be scalar and the processing flow is directed to block 435 where ESCALARS processing is performed. This latter processing is later detailed in FIG. 15b. Block 422 determines if both the run-length LR and the flag LG are equal to zero, in which case the actions in block 424 are taken. Specifically, in block 424 the path number is incremented, both scalar path commands, FSP and FZP are reset to zero, and F3 and F4 are loaded with IL(3,LP) and IL(4,LP) respectively. Processing flow is then passed to block 426.

The value of IL(2,LP) is tested in block 426 for being equal to 100 in which case an End-of-Vectors token is generated by the action of block 428. Specifically, this action is to set IT(1,LT) equal to zero and IT(2,LT) equal to 100. The index LT is then incremented and the flag LG set equal to one to indicate the afterpath status. The processing in block 428 is identical to the processing in block 417. Only one of these would be implemented, however, since the IL(2,LT) file from Pass 1 would have only a single 100 command entry indicating the End-of-Vectors condition. If block 417 is executed then the LT index is incremented and the single End-of-Vectors entry on the IL(2,LT) list would not appear at block 426.

If an End-of-Vectors entry is not encountered in block 426 then the processing flow is directed to block 429 where the EVECTORS processing is performed, to be later described.

Finally, the flag LG is rested in block 430 to determine if it is equal to zero which indicates an active path. If equal to zero the run-length is decremented in block 432; if not equal to zero an after-path exists and the run-length is not further used and is not decremented.

All processing paths next converge to block 437 where the index N is incremented. In block 438 the value of N is tested to determine if it exceeds 63 in which case all values for the index have been used and the Pass 2 process is complete. If the value of N does not exceed 63 further iterations are required and the processing flow is returned to block 419.

Figure 15A:
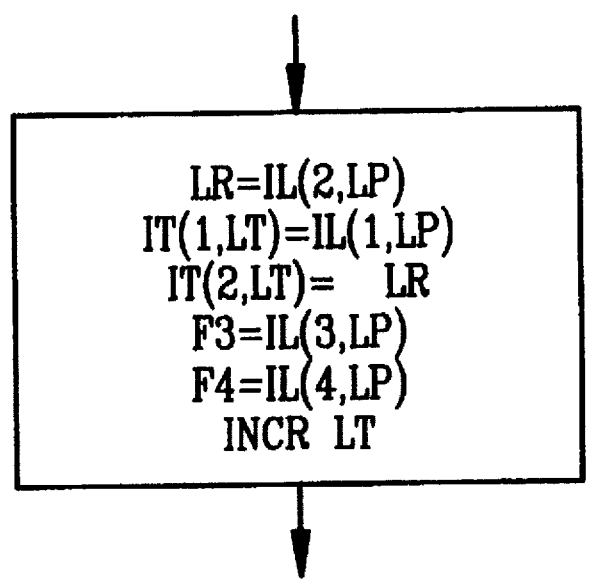
FIGS. 15a and 15b show additional details of the processing of the second pass in the precise calculation mode.

Upon completion of Pass 2 processing IT(*,LT) contains the complete list of transmission tokens which can be used by the Decoder for the reconstruction process. The details of the EVECTORS and ESCALARS processing is next described. FIG. 15a shows the flow of processing for EVECTORS. The variable LR is loaded from IL(2,LP). Next the transmission token is formed by placing the value from IL(1,LP) into IT(1,LT) and the newly given LR into IT(2,LT). Temporary variables F3 and F4 are loaded from IL(3,LP) and IL(4,LP) respectively. After loading the token index LT is incremented.

Figure 15B:
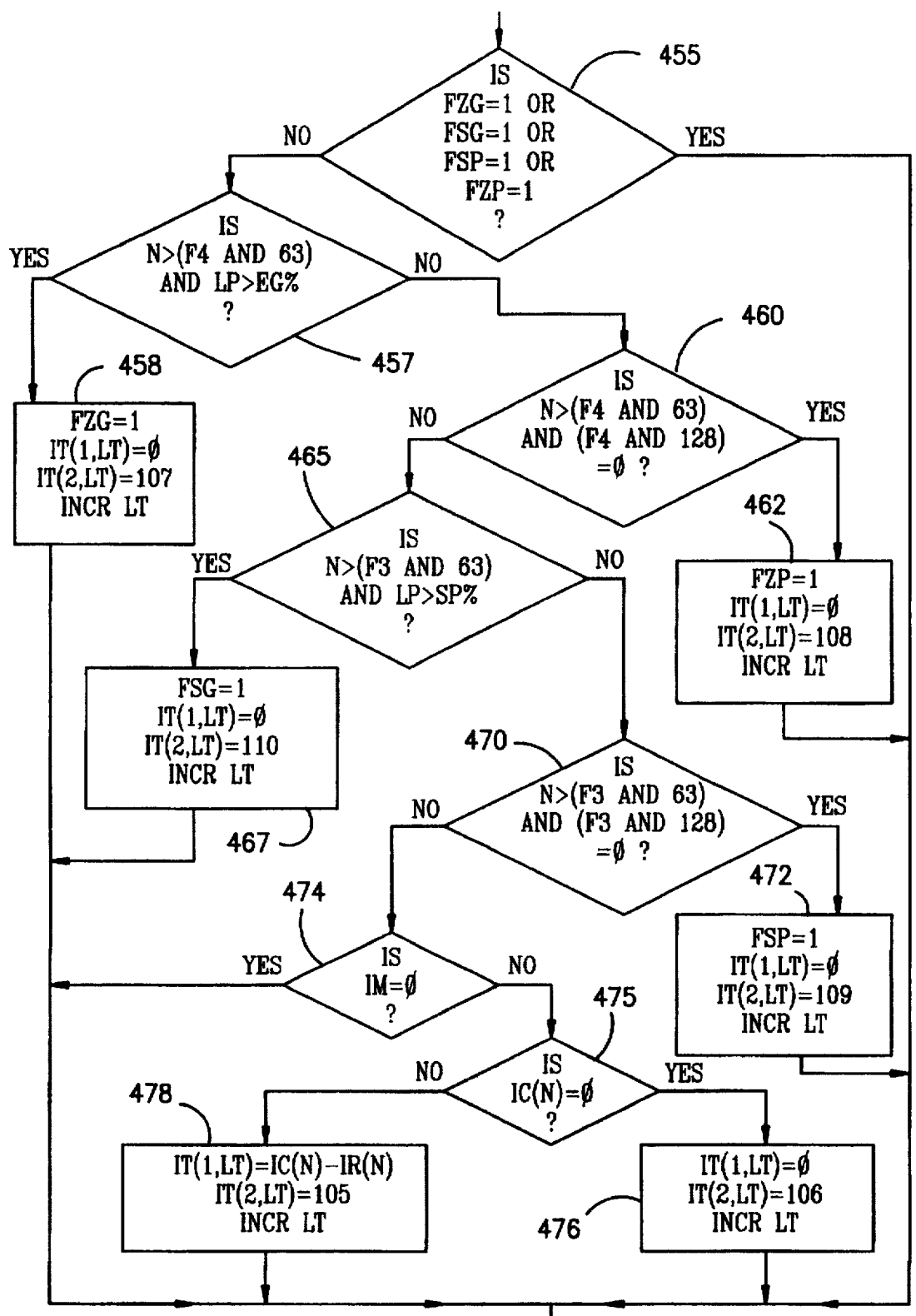

The details of the ESCALARS are shown in FIG. 15B. At block 455 the four flags FZG, FSG, FSP and FZP are investigated to determine if any is equal to one. If so this indicates that all the scalars are affected by a pre-existing scalar command before reaching this list location and further that no additional scalar transmission tokens need be generated along the present path. If the test of block 455 passes then ESCALARS is complete for the current value of N. Reliance here is on correct scalar command signalling having been determined by the end of Pass 1.

If the test at block 455 fails processing flow is passed to block 457 where a test is made for initiating a Global Force Zero command. If the list location index N exceeds the value of the first six bits in F4 as partitioned by the binary mask using the value 63 and the current path number LP exceeds the Force Zero prevention path number EG%, then processing flow proceeds to block 458 wherein the flag FZG is set to one to inhibit further scalar action in the block, a transmission token is generated wherein IT(1,LT) is set equal to zero, IT(2,LT) is set equal to 107 and the token index, LT, is incremented. Thus, a Global Force zero is commenced and a transmission command formed to signal the event to the Decoder. If the test in block 457 fails the processing flow is passed on to block 460.

The test at block 460 determines if a Path Erase should be initiated by first determining if the list index N is greater than the binary value of the first six bits of F4, which represent the list location part of F4, and also if the seventh bit of F4 is zero. If both tests are passed then processing flow is directed to block 462 where the Path Force Zero command is activated by generating the token where IT(1,LT)=0, IT(2,LT)=108 and the token list index, LT, incremented. The flag FZP is set to one which indicates at further positions along the same path that the Path Force Zero action is in effect. If either of the tests at 460 fail then the processing flow instead proceeds to block 465. Any Force Zero command initiation in Pass 2 is now complete for the current index, N.

The Skip command initiation tests are next performed. The first is located in block 465 and the second, performed only if the first one fails is located in block 470. The test in block 465 determines if a Global Skip command should be generated by testing for the index N being greater than the binary value of the first six bits of F3 and simultaneously, the current path number LP being greater than the Skip Path prevent value SP%. If both of these conditions are satisfied then processing flow is directed to block 467 where a transmission token is generated with IT(1,LT)=0 and IT(2,LT)=110, the token index, LT, is incremented and the Global Skip command flag, FSG, is set to one. If block 457 is executed then the ESCALARS processing is complete for this index value of N.

If the test in block 465 fails then processing flow passes to block 470 where a test for initiation of a Path Skip command is made. This test is comprised of determining if the index value N, is larger than the binary value of the first six bits of F3 and simultaneously the seventh bit of F3 is equal to zero. If this test passes then the processing flow is directed to block 472 wherein the Path Skip command is generated by setting IT(1,LT)=0 and IT(2,LT)=109, incrementing the token index, LT, and setting the Path Skip flag, FSP, equal to one. If bloc 472 is executed then the processing for the current index, N, of ESCALARS is done. If either test in block 470 fails then the processing flow passes to block 474.

The block parameter IM is tested in Block 474 to determine processing flow. If IM is equal to zero then no further scalar processing is performed, which specifically means that no modification of individual coefficients which were non-zero in the previous image transform coefficient list is performed. IM can be used to advantage in certain circumstances especially in low bit-rate compression systems. When a new image is being transmitted, such as after a scene change, it may take a time period of several video frames to communicate all of the transform coefficients necessary to represent the new image. The encoder can elect to send a very small number of coefficients for each image block during the first video frame, another small number during the second frame, and so forth in a progressive manner. In this way the new image is promptly started at the receiver during the first frame, but with distortion due to not-yet-transmitted non-zero value coefficients. Said coefficients yet to be transmitted are temporarily represented with zero value coefficients at the receiver. If the new image is fairly stationary then it can be expected that during the second and following frames of this example the coefficients already transmitted for the new image need not be modified, or modified less frequently, such that transmission of scalar changes is not necessary or can be postponed. This is most efficiently accomplished by sending the IM block global command which indicates that only vectors will be transmitted for the block during this video frame. In some cases the IM block command can refer to multiple blocks so as to minimize the total number of signalling bits dedicated to the IM command. Various methods, not shown herein, can be used by an encoder to test the circumstances under which use of the vector-only transmission is preferable. If IM is not equal to zero then processing flow is further directed to block 475 for either individual Force Zero or coefficient modifications.

If IC(N) as tested in block 475 is equal to zero then processing flow is directed to block 476 for Force Zero action. In block 476 a transmission token is formed by setting IT(1,LT)=0 and IT(2,LT)=106 and incrementing the token index LT. If in block 475 IC(N) is found not equal to zero then a scalar modification is performed in block 478. To effect this IT(1,LT) is set equal to IC(N) minus IR(N), IT(2,LT) equal to 105 and the token index, LT, incremented. This completes all processing of ESCALARS.

The Pass 2 encoder processing is now complete after the list index reaches the value 64 after processing block 330 in FIG. 12. Only the transmission tokens each consisting of IT(1,LT) and IT(2,LT) are saved from Pass 2. The last token on the list can be recognized as such because the value of each part of the subsequent IT(1,LT) and IT(2,LT) pair is zero, a case which can not exist for a token to be transmitted. The IT(*,LT) array must be initialized to zero before Pass 2 commences to force all array values to be zero and all unused array locations to still have a value of zero after Pass 2 processing is complete.

Figure 16:
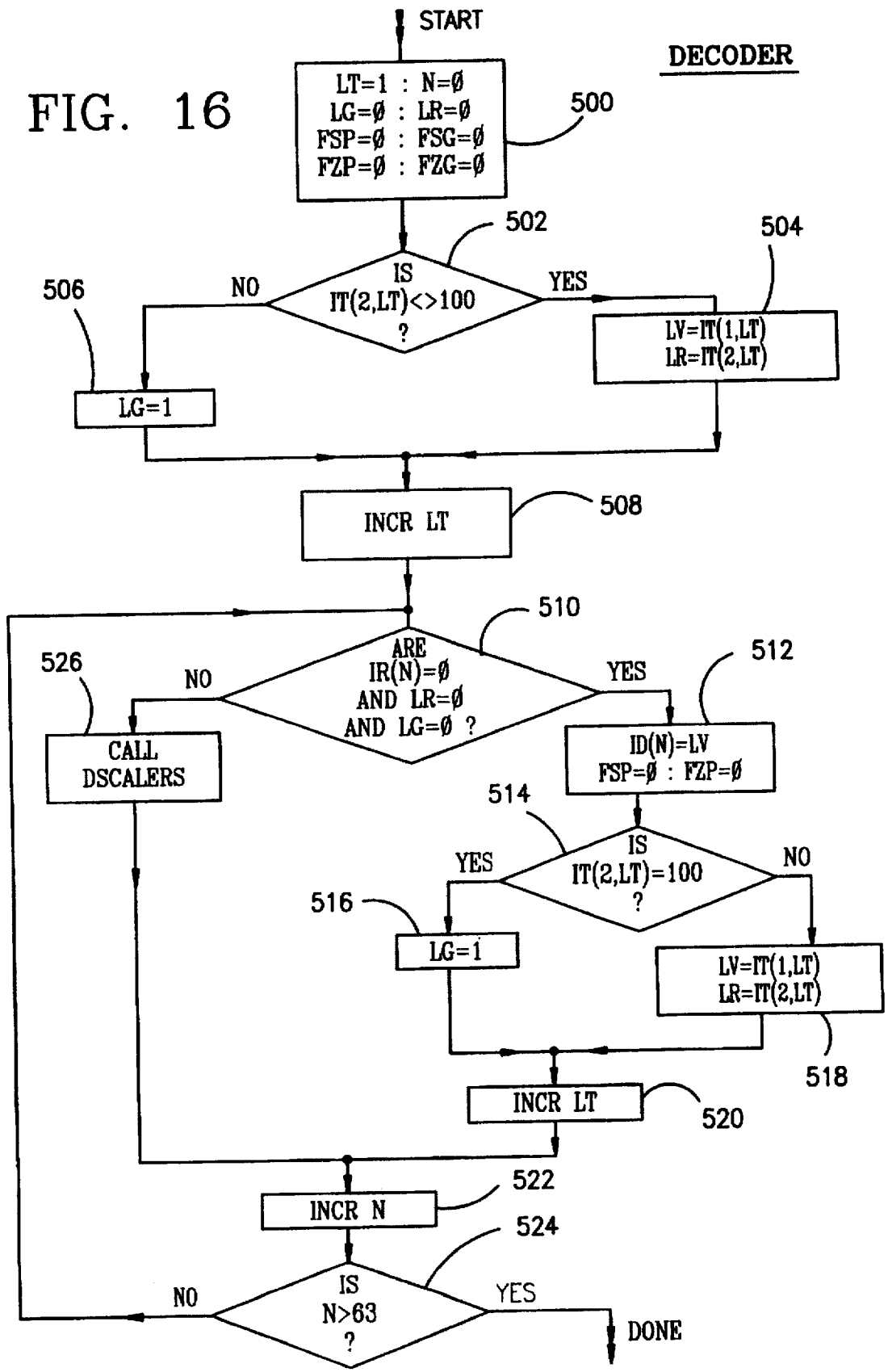
FIG. 16 is a flow chart of the decoder processing in the precise calculation case.

Next described is the Decoder for the precise calculation case with reference to FIG. 16. FIG. 16 shows the flow of processing used to reconstruct a Zig-Zag list of transform coefficients to exactly match those in the list IC(N) at the Encoder and shown in the descriptions of Pass 1 and Pass 2. For the exact match the coefficient quantization is again assumed to be equal to one. The list generated at the Decoder in FIG. 16 is an array ID(N) and can be directly compared with IC(N) for any arbitrary input data. The Decoder operates using the IT(*,LT) data passed to it from the Encoder and from the previous image Zig-Zag list of transform coefficients, IR(N). The generated output ID(N) can then be inverse transformed to provide the output image, and will become the next previous image list, assuming another interframe compression sequence is to be performed.

The Decoder of FIG. 16 is initialized in block 500 by setting the token list pointer, LT, equal to one, the Zig-Zag list index, N, equal to zero, the active/after-path flag, LG, equal to zero, the run-length, LR, equal to zero, F3 and F4 which are the copies made of IL(3,LP) and IL(4,LP) respectively, equal to zero and the four scalar command flags FSP, FSG, FZP and FZG each equal to zero.

The processing is next directed to block 502 wherein the value of IT(2,LT) is compared with the value of 100 to determine whether the first token is not an End-of-Vectors message. If not, then the processing is directed to block 504 where action is taken on the first Establish Vector in the block. In block 504 IT(1,LT) is assigned to the variable, LV, and IT(2,LT) is assigned to the run-length variable, LR. However, if the value of IT(2,LT) is 100 in block 502 the processing is directed to block 506 where the flag, LG, is set to one indicating that all further actions on the list are on the after-path and there are no Establish Vectors in the block. After the processing of either block 504 or block 506 processing of block 508 is performed which increments the token index, LT.

Processing is next directed to the loop starting at block 510. The decision is made at block 510 whether to perform a vector operation or a scalar operation. If the value of the coefficient at IR(N) is zero and the run-length value, LR, is zero and the flag, LG, is zero then processing is directed to block 512 for a Vector operation; otherwise a scalar operation is performed at block 526.

Operation at block 512 copies the coefficient value, LV, into ID(N). Also, since this vector operation is at the end of a path the Skip Path flag, FSP, and the Force Zero Path flag, FZP, are set to zero since these commands extend only to the end of a path.

After block 512, processing flow is next directed to decision block 514. Since the value of the index LT was incremented after the previous contents of IT(1,LT) and IT(2,LT) were assigned to LV and LR respectively the next value of IT(2,LT) is now showing for the current value of index LT and is tested in block 514. If said value is 100 then processing flow is directed to block 516 where the flag, LG, is set to one indicating that the new path is the after-path. If said value is not 100 then processing flow is directed to block 518 and IT(1,LT) is assigned to variable LV and IT(2,LT) is assigned to variable LR.

After the processing of either block 516 or block 518 the processing flow is directed to block 520 wherein the token index, LT, is incremented. Processing is next directed to block 522.

Figure 17A:
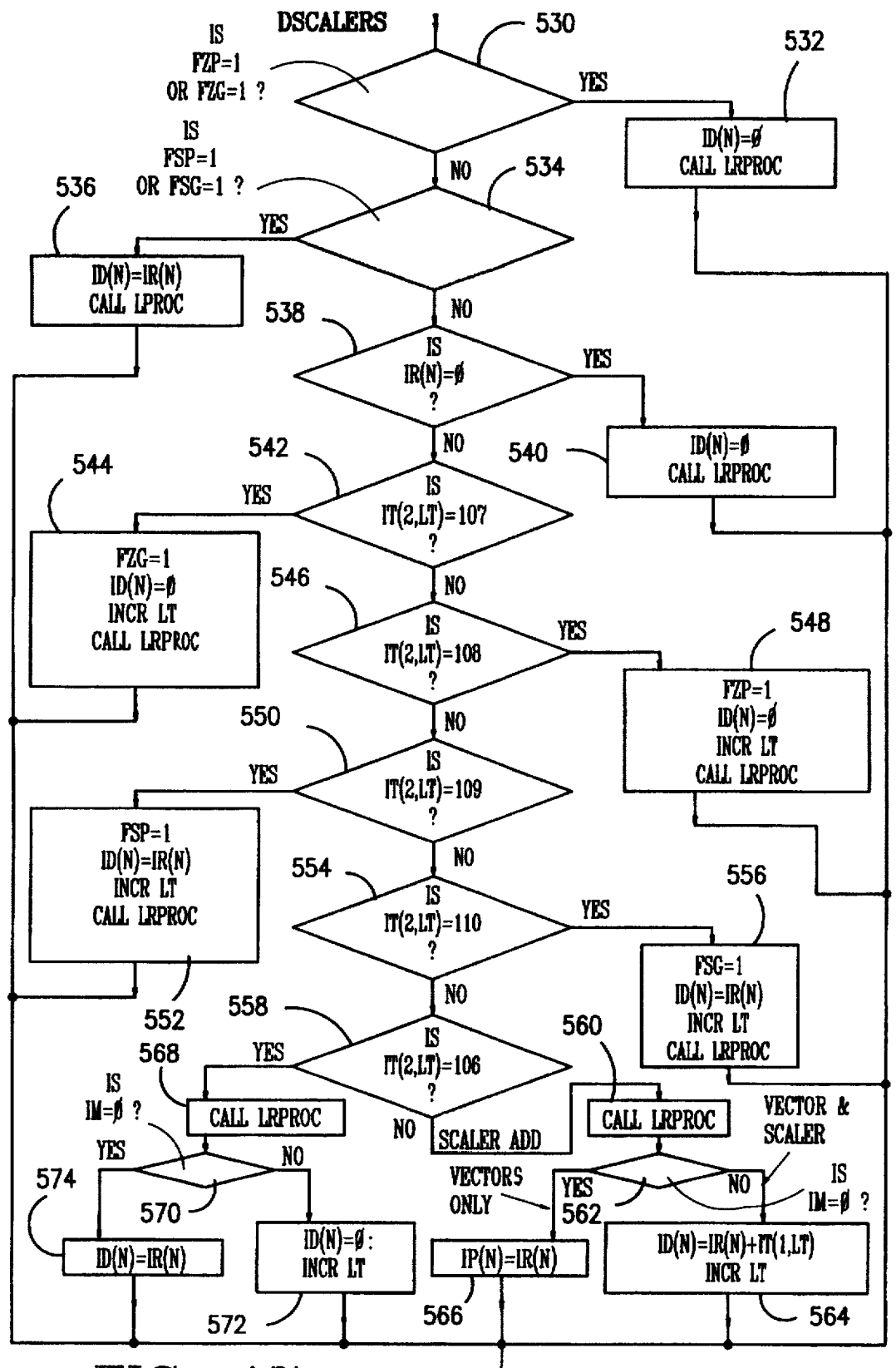
FIGS. 17a and 17b show additional details of decoder processing in the precise calculation case.

If any of the three tests in decision block 510 fails then processing is directed to block 526 and DSCALARS, which is detailed in FIG. 17a, is performed. At the conclusion of the DSCALARS processing the flow is directed to block 522 where the Zig-Zag list index, N, is incremented. Processing is next directed to block 524 where a test is done to determine if all the list locations, N, have been processed. If N is greater than 63 then the processing is complete, otherwise the processing flow is directed back to block 510 for the next list index, N.

The details of the DSCALARS processing shown in FIG. 17a is next described. The purpose of said processing is to assign the correct value to coefficient ID(N), to adjust run-length, LR, as required, to implement any path or global commands and to increment the token list index, LT, as required. Adjustment of LR is performed as detailed in FIG. 17b.

DSCALARS processing in FIG. 17a begins in block 530 where the Path Force Zero flag, FZP, and the Global Force Zero flag, FZG, are tested for the value of one. If either of said flags is one then the processing is directed to block 532. In block 532 the coefficient value ID(N) is set to zero and the LRPROC processing of FIG. 17b performed. Processing along this path is now complete. If, however, both tests in block 530 fail then the processing flow is directed to block 534.

Figure 17B:
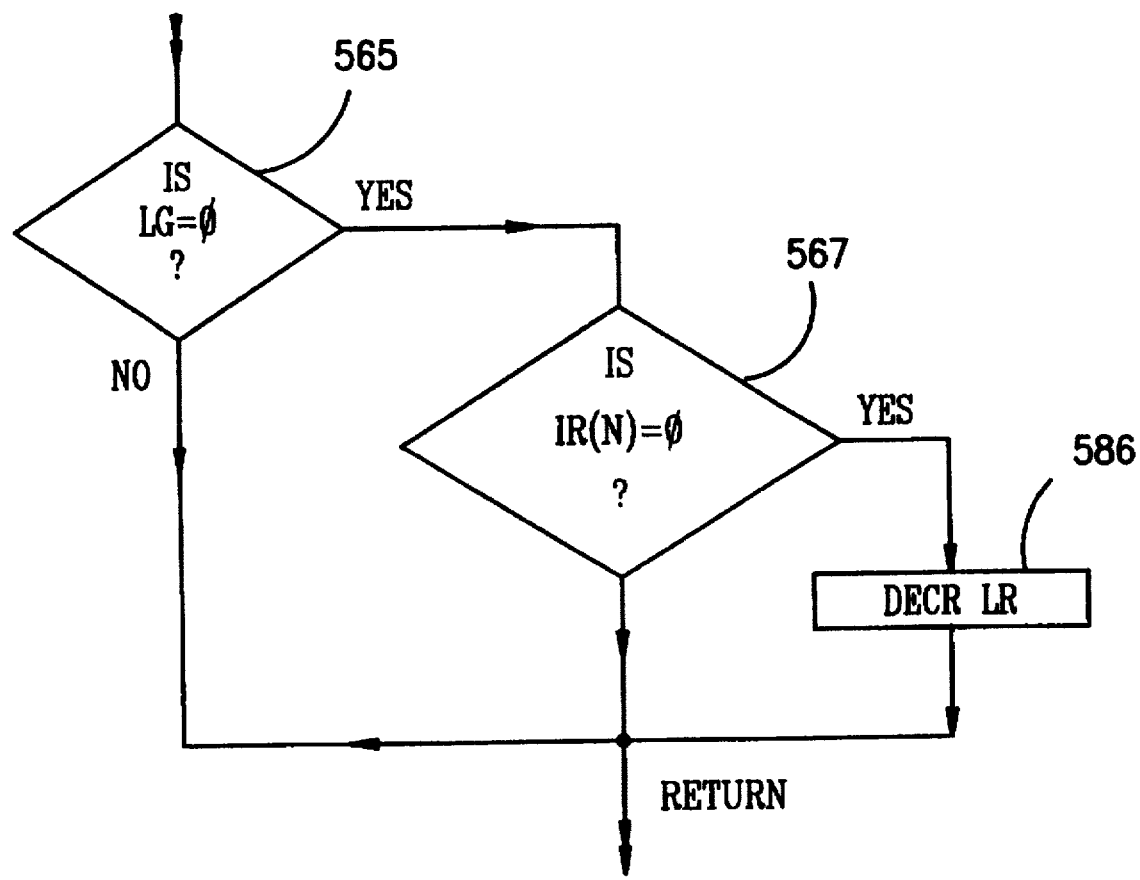

Skip commands are tested in block 534. If either the Path Skip command, FSP, is equal to one or the Global Skip command, FSG, is equal to one then the processing flow is directed to block 536. The Skip processing in block 536 sets the coefficient ID(N) equal to the value of the previous image coefficient IR(N) thus maintaining the same value. The processing of LRPROC in FIG. 17b is then performed and the DSCALARS action for the present index, N, is complete.

If both Skip tests in block 534 fail then processing flow is directed to block 538 in FIG. 17a. If the previous image coefficient value IR(N) is equal to zero then the processing flow is directed to block 540 where the Decoder present image coefficient value, ID(N) is set to zero. The processing of LRPROC in FIG. 17b is then performed and the DSCALARS action for the present index, N, is complete.

If IR(N) is not equal to zero in block 538 then processing flow is directed to block 542. A test is made here to determine if IT(2,LT) is equal to 107 which is the command to initiate a Global Force Zero. If the test passes processing flow is directed to block 544 wherein the coefficient, ID(N), is set to zero, the Global Force Zero flag, FZG, is set to one, the token list index, LT, is incremented and the LRPROC processing of FIG. 17b performed. After block 544 the DSCALARS processing is done.

If, however, the test in block 542 fails, which means IT(2,LT) is not equal to 107, then processing flow passes to block 546. Here a test is performed to determine if IT(2,LT) is equal to 108, which is the command to initiate a Path Force Zero. If this test passes then processing flow is directed to block 548 wherein the coefficient ID(N) is set to zero, the Path Force Zero flag, FZP, is set to one, the token list index, LT, is incremented and the LRPROC processing of FIG. 17b is performed. After the block 548 processing the DSCALARS processing is done.

If, however, the test in block 546 fails, which means IT(2,LT) is not equal to 108, then the processing flow is directed to block 550. Here a test is performed to determine if IT(2,LT) is equal to 109, which is the command for a Path Skip. If this test passes then processing flow is directed to block 552 wherein coefficient ID(N) is set equal to IR(N), the Path Skip flag, FSP, is st to one, the token list index, LT, incremented and the LRPROC processing of FIG. 17b is performed. After the block 552 processing the DSCALARS processing is done.

If, however, the test in block 550 fails, which means IT(2,LT) is not equal to 109, then the processing flow is directed to block 554. Here a test is performed to determine if IT(2,LT) is equal to 110, which is the command for a Global Skip. If this test passes then the processing flow is directed to block 556 wherein coefficient ID(N) is set equal to IR(N), the Global Skip flag, FSG, is set to one, the token list index, LT, incremented and the LRPROC processing of FIG. 17b performed. After the block 556 processing the DSCALARS processing is done.

If, however, the test in block 554 fails, which means IT(2,LT) is not equal to 110, then the processing flow is directed to block 558. Here a test is performed to determine if IT(2,LT) is equal to 106, which is the command for a single point Force Zero. If this test passes then processing flow is directed to block 568 wherein the LRPROC processing of FIG. 17b is performed. Subsequently processing flow is directed to block 570 where a test is performed to see if the global command, IM, is equal to zero. If this test passes then processing flow is directed to block 574 wherein ID(N) is set equal to IR(N). In this case the point Force Zero is superseded by the global command, IM, which, when zero, avoids modification of scalar coefficient values. If the test in block 570 fails, however, then the processing flow is directed to block 572 wherein coefficient ID(N) is set equal to zero and the token index, LT, incremented. This completes the flow of processing for DSCALARS along this path.

If, however, the test in block 558 fails then processing flow is directed to block 560 wherein the LRPROC processing of FIG. 17b is next performed whereafter processing flow is directed to block 562. A test is performed in block 562 to determine if the global command, IM, is equal to zero. If this test passes then processing flow is directed to block 566 wherein the coefficient, ID(N), is set equal to the coefficient, IR(N). If the test in block 562 fails then processing flow is directed to block 564 wherein the coefficient ID(N) is set equal to the coefficient IR(N) plus the coefficient value of IT(1,LT). This completes the operation of the DSCALARS processing.

The processing of LRPROC is shown in FIG. 17b. The value of the flag, LG, is first tested in block 565 to determine if it is zero in which case processing flow proceeds to block 567. If the test fails then no action is taken in LRPROC and the operation is complete.

Listing 1 provides a computer program to perform the processing for Pass 1 and Pass 2 at the Encoder and the single pass processing at the Decoder which has just been described. The program provides visibility for each pass individually to aid in understanding the operation of the Vector/Scalar signalling system of this invention. This visibility occurs in two levels of print outs, the first with summary results which is provided by causing the parameter PD to be zero in the fifth line of listing 1. Detailed results are displayed by setting PD equal to one. Sample data is provided to the program via the two Data statements in the 13th and 14th lines of Listing 1. In general the display routines are contained in subroutines which are numbered and accessed by "GOSUB" statements, as opposed to processing subroutines which are called by name, such as EVECTORS. The character, %, is used with the integer variables SP% and EG% to indicate they are integers. Other integer variables are globally defined in the 3rd line by the DEFINT statement. The program is written with Borland compiled BASIC, although the code should operate with other forms of BASIC with little conversion.

The non-precise calculation embodiment of this invention for Interframe video coding are next described. Scalar signalling again replaces a portion of the vector signalling. The methods used for the non-precise calculation case include all of the methods of the precise calculation case plus new ones specifically to solve the problem created by calculation differences between encoder and decoder. The objective of the additional methods for the non-precise calculation case is to cause the coefficient-based model at the decoder for the previous frame to be identical to the corresponding model at the encoder despite the calculation differences between encoder and decoder. The accomplishment of this objective permits the previously described scalar signalling of the precise calculation case to then be realized. An additional objective is to perform the task as efficiently as possible with as few additional signalling bits as possible.

By way of comparison, the previously mentioned H.261 prior art video compression method does not require precise calculation methods to be performed between encoder and decoder, although it places strict limits on the calculation imprecision for the inverse discrete cosine transformer calculations. The effects of the imprecision result in a gradual divergence between the image model maintained at the encoder and the image model maintained at the decoder. The divergence is compounded by the imprecision of calculation of each frame so that after many frames a considerable difference can result. This divergence is removed periodically by transmission of an intraframe compressed image such that both models differ by the calculation results of only a single frame.

A straight forward method for operation in the non-precise calculation mode would be to first perform the required calculations at encoder and decoder to form the previous image model taking into account motion compensation. These calculations involve first an inverse transformation to regenerate a block of imagery, next the motion compensation itself, and finally the forward transformation to obtain the transform coefficients of the motion compensated block. Second, the encoder would generate and transmit to the decoder a Forward Error Correction pattern of syndrome bits applicable to the 64 list locations of the block calculated at the encoder. The encoder prediction data itself is not transmitted since the decoder calculates that data just as the encoder does. The decoder's prediction data is then corrected by use of the syndrome bits so that its model is identical to the model at the encoder. Finally, the video Interframe coefficient data is transmitted to up-date the model to the present image using the precise calculation methods of the invention.

A difficulty of this method can be the amount of forward error correction data which is required to be transmitted and the attendant decrease in coding efficiency which results. The calculation imprecision between encoder and decoder for transmission of each image in a motion sequence should be kept small relative to the integer values to which coefficients are finally rounded. Also, the majority of coefficients for most imagery will have the rounded value of zero. As a result certain methods can be used such that all coefficients calculated at the decoder need not be corrected by additional data sent from the encoder.

First a method of this embodiment is to determine at the encoder from the set of encoder coefficients rounded to zero those coefficients which will definitely be rounded to zero at the decoder. This set includes those coefficients whose un-rounded magnitude is sufficiently small such that the addition or subtraction of the largest possible imprecision error will not cause a decoder coefficient to be rounded to plus or minus one. It is therefore not necessary to include this coefficient set in a forward error correction process. The remaining coefficients which must receive corrective action are divided into two categories each of which is treated by a different error correction method.

The first error type to be treated occurs where the encoder calculates a rounded non-zero value transform coefficient and the decoder calculates a different rounded non-zero value transform coefficient. The second type of error treated is where a rounded non-zero value coefficient is calculated at either the encoder or decoder and a rounded zero value coefficient is calculated at the other location.

The first type of error can often be briefly tolerated, say for a few video frames, but can lead to the second error type which cannot in general be tolerated with scalar signalling. The first type of error introduces degradation into the reconstructed image but not loss of synchronous decoding of scalar coefficients. The second type of error can cause a loss of decoding synchronization because the number of non-zero value coefficients in the previous image coefficient model can differ between the encoder and decoder due to the calculation differences. It can also cause misplacement of a vector coefficient in the Zig Zag List since the run-length can be incorrectly reckoned between encoder and decoder. This loss of synchronization leads to an incorrect modification of coefficient values at the decoder and subsequently a distorted image in the effected block. The general methods of correction of these two types of errors in the invention are next explained prior to showing the detailed implementation of the methods in an actual system.

For coefficients in the scalar "Modify" category a differential coefficient is transmitted. This category corresponds to the category of the first above stated error type. In this case the forward error correction data is appended to the end of the transmitted variable length scalar difference coefficient. This data is extra and hence an overhead to the coefficient data itself. To minimize the amount of overhead data required the coefficient calculation at the encoder and decoder is first performed to a precision greater than a single integer. The maximum difference in value calculated at encoder and decoder must be known for the system such that error correction performance can be designed for the worst case. If the un-rounded difference between the calculated result at the encoder and decoder can be held to less than one integer value then a single bit can be used to provide the error correction of each coefficient in this category. The encoder appends a binary zero if the encoder rounded value is an even number and a binary one if the encoder rounded value is an odd number. The unrounded calculated value at the decoder is rounded to the nearest even integer if the FEC bit which is appended to the transmitted transform coefficient difference is zero, or is rounded to the nearest odd integer if the FEC bit is a binary one. Thus a decoder calculated value of 3.25 at the decoder is rounded to four if the FEC bit is zero and to three if it is one.

The second kind of error is treated by a vector transmission, either an Establish vector or by a new kind of vector called an Erase Vector. For this error condition the encoder is unsure whether the decoder rounds a calculated coefficient to zero or to a non-zero value. It is not appropriate to treat the error with any scalar transmission since the calculated value at the decoder may be rounded to zero in which case the decoder would not know where to locate the correction. The Establish vector is used for the case where the present image has a non-zero value coefficient and the coefficient is to be replaced with a transmitted value. The Erase Vector is used for the case where the new image has a coefficient value of zero and the encoder has deduced the possibility of a calculated previous image decoder value of either zero or plus or minus one.

The Erase Vector is a combination of a command and a run length and has the action of producing a zero value at the decoder regardless of the decoder's calculated value. This is done at a Zig-Zag list location calculated by the transmitted run-length plus the previous vector location minus one.

Figure 18A:
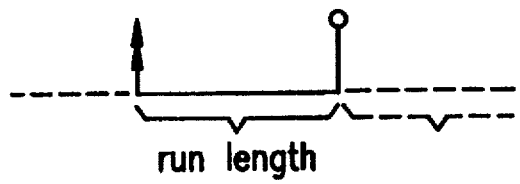
FIGS. 18a, 18b and 18c illustrate the use of erase vectors.
Figure 18B:
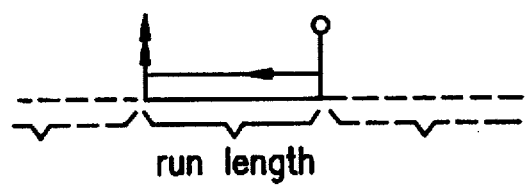
Figure 18C:
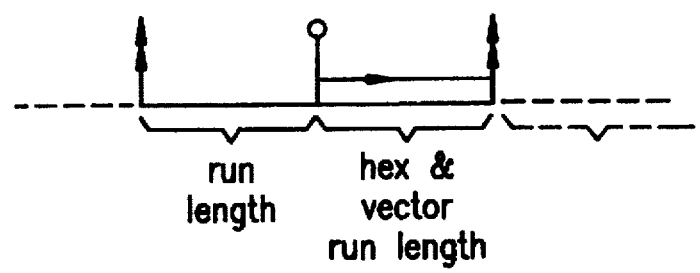

In practice, three kinds of Erase vectors are defined and used in the description of the non-precise method as shown in FIG. 18. The first of the three is a point erase vector which erases the value at the decoder's list at a single point as shown in FIG. 18a. The vertical line with a circle at the top signifies an Erase Vector while a vertical with the double arrowhead signifies an Establish Vector. The second kind of Erase Vector erases all of the points along a path from and including the Erase vector point backward to, but not including the previous vector point. This is shown in FIG. 18b, and is called the Backward Erase Vector. The horizontal line between the Erase Vector and the previous Establish vector indicates the path over which the erase action is active. The arrow points away from the vector causing the path action. The third kind is the Forward Erase Vector shown in FIG. 18c which erases all path locations from the Forward Erase vector up to, but not including, the point of the subsequent vector, or the end of the list, whichever comes first. Erase and Establish Vectors can occur in any transmission sequence along the Zig-Zag list.

Relative to the precise calculation case the non-precise calculation case includes the three Erase vector types in the Vector coding alphabet. A variable length code is required for each run-length to be accommodated by each of the three types of Erase Vector. The Erase vectors form paths in the same way as do Establish vectors. The result for the non-precise case is any combination of intermingled Erase and Establish vectors and an optional following after-path covering the entire Zig Zag list of the block. The after-path is optional because an Establish vector may occur at the final list location. No two paths overlap each other; if an Erase Vector point is located in between two Establish vector points then the path length of the second Establish vector is reduced in length to accommodate the path formed by the Erase Vector. The switching between vector and scalar transmission is still self-signalling for the non-precise case and the End-of-Vectors is still used as in the precise calculation case.

Tokens for the Vector alphabet for the non-precise case now include:

| Item | Vector Type | 1st Component | 2nd Component |
|---|---|---|---|
| 1) | The Establish Vector | Value | Run-length |
| 2) | Point Erase Vector | Run-length | Code = 115 |
| 3) | Backward Erase Vector | Run-length | Code = 117 |
| 4) | Forward Erase Vector | Run-length | Code = 118 |
| 5) | End-of-Vectors | 0 | Code = 100 |

The tokens for the scalar quantities remain the same as in the precise calculation case.

The Backward Erase Vector and the Forward Erase Vector provide erasure over multiple Zig Zag list locations as do the scalar path erase and scalar global erase commands. There is partial overlapping capability of the erase vectors and scalar erase commands. A scalar path or global erase command will perform erasure of list locations otherwise requiring an Erase Vector if the scalar erase can commence at a scalar marked location prior to the points to be erased. Likewise a Backward or Forward Erase Vector can perform erasure of a scalar value which otherwise would require a separate scalar erase command. Also, a Point Erase Vector can be combined with a Backward Erase Vector to erase a group of list locations not adjacent to the end point of an Establish Vector.

Several examples are next given to demonstrate signalling from encoder to decoder used for the non-precise calculation case. Afterward the implementation method is shown in detail. Each example shows three lists corresponding to the previous image coefficient list, the present image coefficient list and the resulting transmission list. At the decoder the transmission list and the previous image coefficient list are used together to regenerate the present image coefficient list. In these examples the horizontal axis corresponds to list locations starting at the left side. Corresponding list locations on the three lists are vertically aligned. In the "Previous" and "Present" lists a vertical line with an arrow represents a non-zero coefficient value. On the "Previous" list the x's on the horizontal axis represent locations where erasures are needed due to calculation imprecision. In said transmission list a vertical line with a single arrow represents a scalar modification (with either a zero value or a non-zero value), a vertical line with a double arrow represents an Establish Vector, a vertical line with a small circle at the end represents a Vector Erase, an upward vertical line with an "x" at the end represents a Scalar Erase and a downward line with an "x" at the end represents a Scalar Skip. A single horizontal line through a scalar erase or skip command indicates a path type command. A double horizontal line through a scalar erase or skip command indicates a global type command. An arrowhead on a horizontal line points away from the command which has produced the path or global command.

Figure 19A:
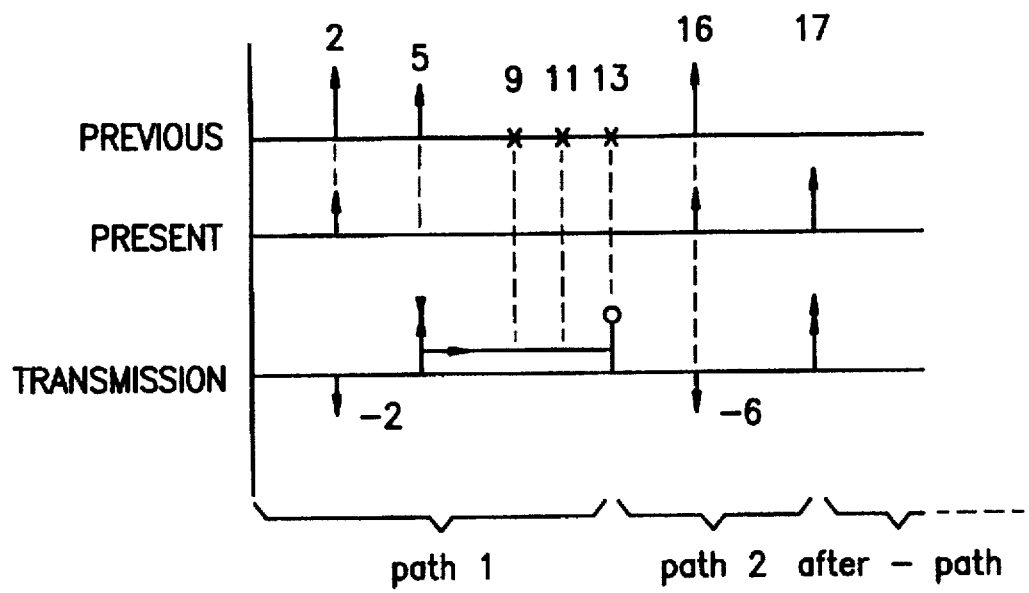

Example 1 illustrating the Erase Vector in the presence of other coefficients is shown in FIG. 19a. The "Previous" list shows the presence of three non-zero coefficients and three Erase Vectors. The "Present" list shows the presence of three non-zero coefficients, two of them aligned with coefficients in the "Previous" list. The transmission list must contain all of the actions necessary to convert the "Previous" list held at the decoder into the "Present" list not yet held at the decoder. The numeric values above the "Previous" list designate list locations. A list of tokens issued by the transmitter is as follows where IT(1,LT) and IT(2,LT) are the two components of the token and LT is the item number in the transmission list.

| LT | IT (1, LT) | IT (2, LT) | Action |
|---|---|---|---|
| 1 | 12 | 115 | Point Erase Vector; run-length = 12 |
| 2 | -2 | 105 | Scaler Modify; Difference Value = -2 |
| 3 | 0 | 108 | Scaler Path Erase |
| 4 | 17 | 2 | Establish Vector; run-length = 2; Value = 17 |
| 5 | -6 | 105 | Scaler Modify; Difference Value = -6 |
| 6 | 0 | 100 | End-of-Vectors message |

The first item on the transmission list is an Erase Vector having a run-length which starts at the beginning of the list and ends at the right side member of the three Vector Erase points shown on the "Previous" list. This run-length designates Path 1. The run-length count along an Erase Vector path is determined without reduction due to any scalar actions along the path. Similarly the run-length count along any part of a path affected by a Scalar Path or Global Erase is not reduced due to any scalar actions along said path. The reason for not reducing the count in these cases is that the encoder and decoder may not have the same number of scalar markers along the path due to calculation imprecision and hence not count in the same manner. Finally, a global command provides for the eventuality that there are no Erase Vector points in the block, such as might be expected when motion compensation is not performed even in the non-precise calculation case wherein the run-length count reduction due to the presence of point scalar actions is performed. This command, MEP, is discussed subsequently during description of the flow charts for the non-precise calculation case.

There are two scalar actions along this first path. The first is at list location two which requires modification relative to the "Previous" list with the value of −2. The second is a Scalar Erase command at location five which erases the first two of the three vector erase points in addition to the coefficient at list location five.

The next action is the Establish Vector at list location 17 which defines the second path. Note that the run-length count here is two rather than three to take into account the one reduction due to the Scalar Modify action along the second path at location 16. The next action is the scalar modification itself and the final action is the End-of-Vectors message.

Note that the erasures could have been signalled differently such that each of the four items to be erased could have been erased separately. However, this would have required two more items on the transmission list. One of the tasks of the implementation of the non-precise calculation case of the invention is to optimize the signalling to achieve the lowest number of bits used for transmission.

Figure 19B:
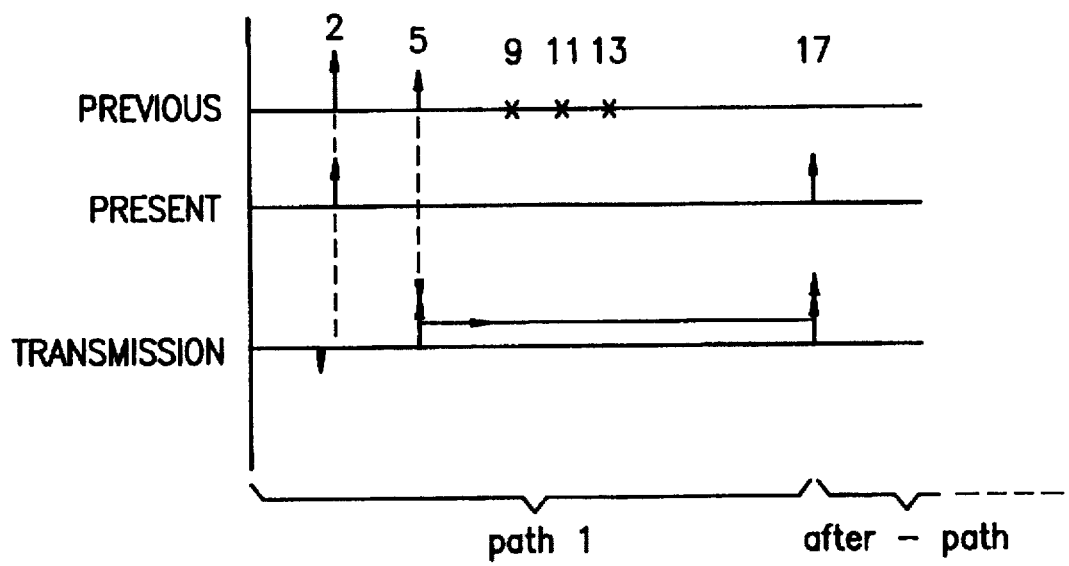

Example 2 of FIG. 19b shows the same set of data as Example 1 except the coefficient at list location 16 in both "Previous" and "Present" lists is now zero. The resulting transmission list is now,

| LT | IT(1,LT) | IT(2,LT) | Action |
|---|---|---|---|
| 1 | 19 | 14 | Establish Vector; run-length = 14 |
| 2 | −2 | 105 | Scaler Modify; Difference Value = −2 |
| 3 | 0 | 108 | Scaler Path Erase |
| 4 | 0 | 100 | End-of-Vectors |

The first item on the list is now the Establish Vector at location 17. Note that the run-length count is reckoned at 14. The count has been reduced first by the Scalar Modify action at location two and second by the Scaler Erase action at location five. No count reductions are permitted after the Scalar Erase since there are Erase Vectors which can be miscounted.

The second item on the transmission list is the Scalar Modify action at location two and the third item the Scalar Erase at location five. The fourth and final item is the End-of-Vectors message.

Example 3 of FIG. 19c demonstrates the Backward Erase Vector action. Here there is a previous coefficient at location four to be erased and vector erases at 9, 11 and 13. A previous coefficient is to modified at location 15 and an Establish Vector appears at location 17. The backward Vector Erase is herein used effectively to erase all four items. Alternatively, a Scalar Erase could have been used at location four followed by a point Vector Erase at 13, but this would have required two actions. The Establish Vector is required at location 17. A Scalar Modify action occurs at location 15. The transmission list is shown as,

| LT | IT(1,LT) | IT(2,LT) | Action |
|---|---|---|---|
| 1 | 12 | 117 | Backward Vector Erase |
| 2 | 19 | 2 | Establish Vector |
| 3 | −5 | 105 | Scaler Modify; Difference = −5 |
| 4 | 0 | 100 | End-of-Vectors |

Example 4 of FIG. 19d demonstrates the Forward Erase Vector action. Here a Backward Vector Erase is blocked by the presence of the Scalar Modify action at location four. However, a Forward Vector Erase action at location nine erases all three erase vector points and a subsequent scalar erase point. The transmission list is shown as,

| LT | IT(1,LT) | IT(2,LT) | Action |
|---|---|---|---|
| 1 | 8 | 118 | Forward Vector Erase |
| 2 | 0 | 106 | Point Scaler Erase |
| 3 | −2 | 105 | Scaler Modify; Difference = −2 |
| 4 | 19 | 7 | Establish Vector; Run-length = 7 |
| 5 | 0 | 100 | End-of-Vectors Message |

The run-length count is shown here not to be reduced for the Forward Erase Vector from the location of the vector to the next Establish Vector in addition to the path leading up to the point of the Erase Vector.

Example 5 of FIG. 19e shows a situation wherein vector erase and scalar erase actions cannot be combined since no scaler erase conditions exist. The first transmission is a point Erase Vector at location nine. Along this path is the scalar modify transmission for location two. The second vector is a Backward Erase Vector at location 13. The third vector is an Establish vector located at 17 whose run-length is reduced by the scalar modify action at location 15. The transmission list is therefore,

| LT | IT(1,LT) | IT(2,LT) | Action |
|---|---|---|---|
| 1 | 8 | 115 | Point Erase Vector; run-length = 8 |
| 2 | 6 | 105 | Scaler Modify; Difference Value = 6 |
| 3 | 3 | 117 | Backward Erase Vector; run-length = 3 |
| 4 | 19 | 2 | Establish Vector; run-length = 2; |
| 5 | −3 | 105 | Scaler Modify; Difference = −3 |
| 6 | 0 | 100 | End-of-Vectors Message |

Figure 20:
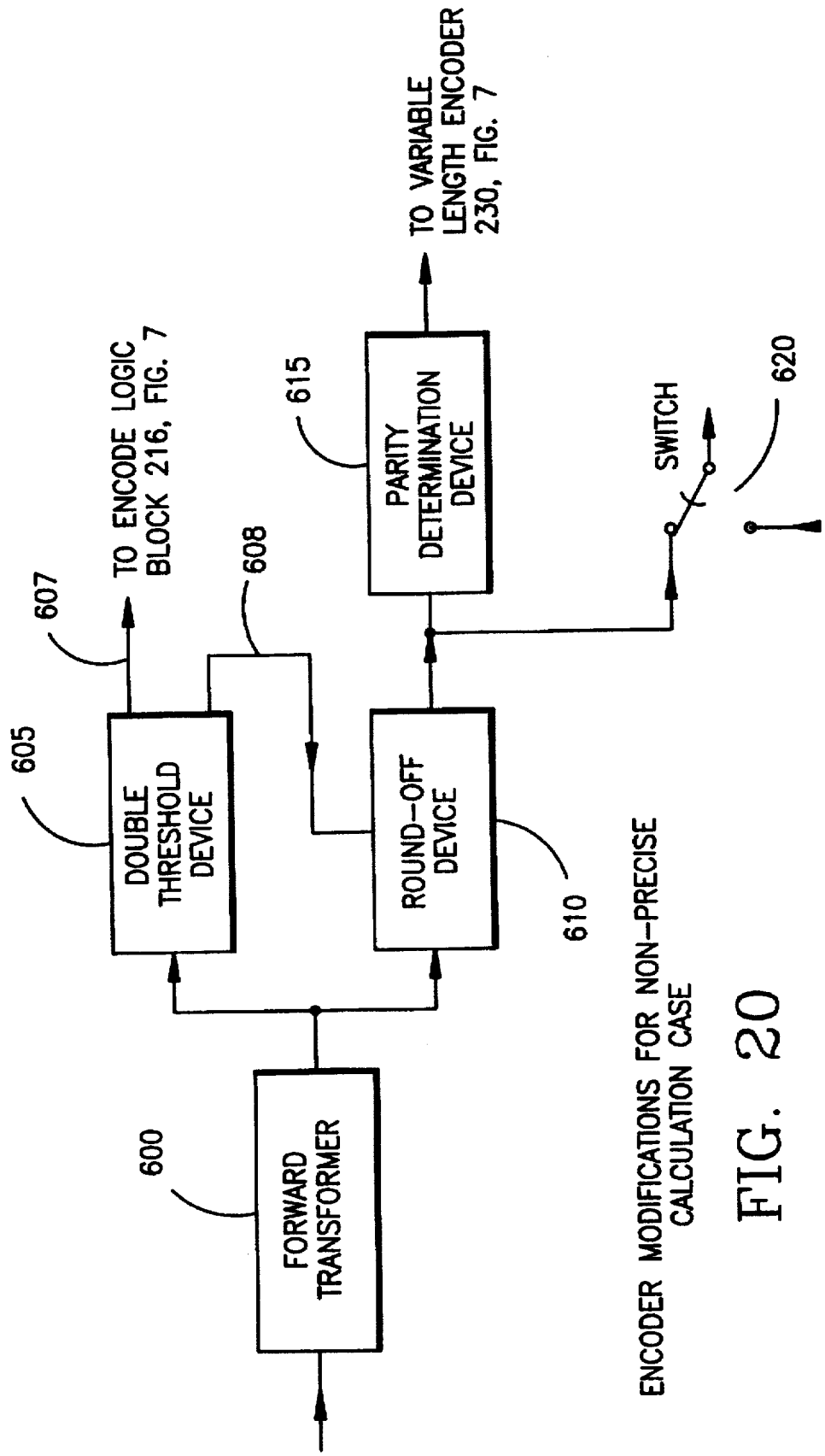
FIG. 20 illustrates modifications to an encoder for the non-precise calculation case.

The methods of implementation to perform the Vector/Scalar signalling for the non-precise case wherein Vector Erase points must be taken into account are next described. The Encoder as shown in FIG. 6a must be modified such that Forward Transformer 108 is augmented with a Round-off Device, a Parity Determination Device and with a Double Threshold Device as shown in FIG. 20. The Forward Transformer, 600 in FIG. 20, provides the same function as provided by Forward Transformer 108 in FIG. 6a. Its output, however, is now issued to the Threshold Device 605, and to the Round-Off Device, 610. The output of the Round-Off Device is sent to both the switch, 620, which is the same switch, 103, shown in FIG. 6a, which selects either the output from 610 or the direct output from the Coefficient Model Memory, and to the Parity Determination Device, 615 in FIG. 20.

The Parity Determination Device issues at its output a value of zero if the rounded value from Round-off Device 615, is an even number, and issues a binary one if the rounded value is an odd number. This output is sent to the Variable Length Encoder 230 of FIG. 7 to append to the end of the variable length code for each scalar value in the scalar modification category.

The Threshold Device, 605, in FIG. 20 provides a binary output, 607, which signals a potential need for a vector erase action. This need may be subsequently subsumed because an Establish Vector needs to be transmitted instead but that action occurs further on in the Encoder Logic Block. 216 in FIG. 7, and is not considered in the Threshold Device. This device is designed to signal a vector erase action under worst case error conditions. Device 605 has a second output, 608, which is sent to Round-off Device, 610, which, when equal to binary one, forces its output to zero. The theory and operation are described with reference to FIG. 21.

The particular category of errors that the Double Threshold Device is designed to cover are the calculations by the reconstruction and forward transformers which generate output coefficients close in value to zero. In particular are the values at the decoder which could be either zero, plus one or minus one and which the encoder cannot accurately predict due to the calculation differences between encoder and decoder. The encoder can determine, however, by measurement of those corresponding values calculated at the encoder and a knowledge of the worst case difference of calculated results between encoder and decoder, those encoder values which should signal a vector erase action to the decoder to insure that no error conditions result.

Figure 21A:
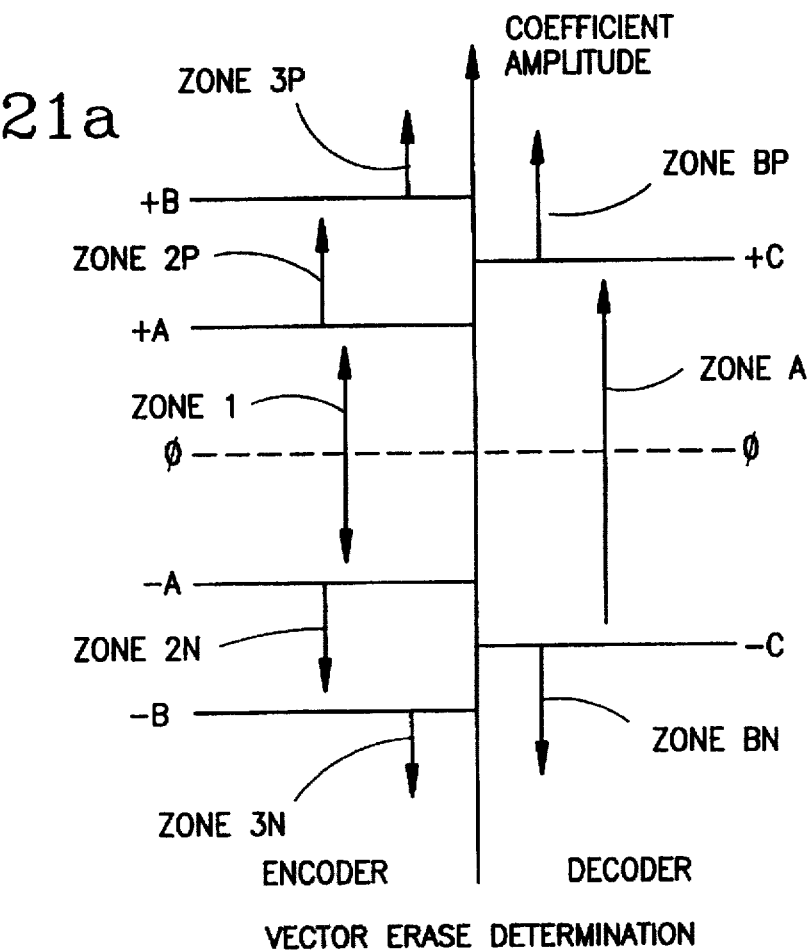
FIG. 21a illustrates vector erase determination.

In FIG. 21a the range of calculated results for transform coefficient amplitudes at the encoder before rounding is shown on the left side, and calculated results for the decoder shown on the right Aide. The areas for encoder and decoder around zero amplitude are divided into zones. Zones 2, 3 and B are each shown in two separate parts, those for positive values, 2P, 3P and BP and those for negative values, 2N, 3N and BN. Zone 1 is a region at the encoder between but not including values −A and +A. Zone 2N is a region between −A and −B including −A but not including −B; Zone 2P a region between +A and +B including +A but not including +B. Zone 3P extends from and including +B to the greatest positive coefficient amplitude used; Zone 3N extends from and including -B to the greatest negative amplitude used.

At the decoder, Zone A is a region between but not including +C and −C. Zone BN extends from and including −C to the greatest negative coefficient amplitude used; Zone BP extends from and including +C to the greatest positive coefficient amplitude used.

It shall be assumed here that the maximum difference in calculated result between the output of the Forward Transformer at both the encoder and the decoder is a value of plus or minus D, where D is a positive fraction less than one. Thus if the encoder calculates a coefficient value of X, then it can be assumed that the decoder will calculate a corresponding value in the range of and including X plus D to X minus D.

In FIG. 21a the difference between +B and +A shall be set equal to the value of twice the value of D. Furthermore, +B will be set to the value of +C plus D. The decoder is specified by design to round its calculated result for values in Zone A to zero. For calculated values in the Zone B the decoder is designed to round the values from +C to +1 to the integer value one, and the values from −C to −1 to the integer value of −1. The value of C is normally taken to be at or near the value of one-half. For calculated values with amplitudes greater than plus or minus one rounding to the next higher amplitude occurs for fractional portions one-half or greater.

Under the condition that the encoder calculates a value in Zone 3 then it can be concluded that the decoder will calculate a value in its Zone B since the known maximum error, D, was used to determine the separation between B and C. Furthermore, if the encoder calculates a value in Zone 3 it is certain that the decoder will calculate a non-zero value in Zone B. This last situation does not require the Erase Vector transmission but is processed by the scalar modify action already discussed.

Similarly, if the encoder calculates a value in its Zone 1 then the decoder must calculate a value in its Zone A which it will subsequently round to the value zero. The situation where both encoder and decoder round their calculated values to zero does not require corrective treatment of any kind. However, if the encoder calculates a value in its Zone 2 then it is unknown at the encoder whether the decoder will round its calculated value to zero or to one. For this case the encoder generates the Erase Vector to definitely set both encoder and decoder rounded values to zero.

Figure 21B:
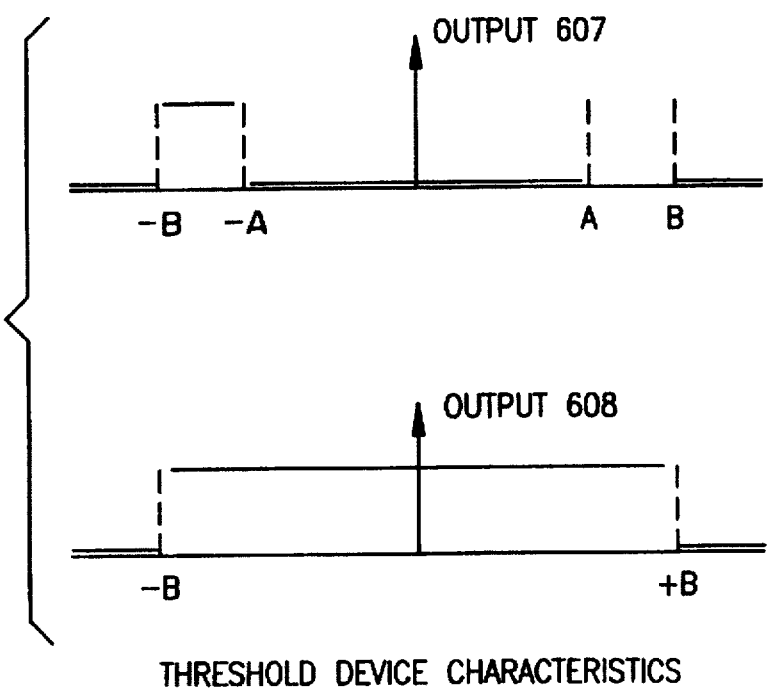
FIG. 21b illustrates threshold device characteristics.

The Round-off Device, 610 in FIG. 20, at the encoder is designed to round to the next higher amplitude for calculated values with fractional portions of one-half or greater when the input, 608, from the Double Threshold Device, 605 in FIG. 20, has a binary value of zero; when said input is a binary one then the output of Round-off Device, 610, is forced to the value zero. The output, 607, of the Double Threshold Device, 605, as shown in FIG. 21b, is designed to produce at its output the binary value zero for all inputs of value +B or higher, or −B or lower corresponding to Zone 3 in FIG. 21a, and for all inputs greater than −A but less than +A, corresponding to Zone 1. This provides the Vector Erase command for calculated results in Zone 2 to be passed to the Encode Logic Block, 216 in FIG. 7. The second output, 608, of Double Threshold Device, 605, is a binary one for Zones A and B, and a binary zero for Zone 3. This condition forces the output, 608, of Round-off Device, 610, to zero for Zones 1 and 2, but allows it to provide normal rounding for Zone 3 without being forced to produce the output value zero.

The determination of the transmitted tokens is now described for the non-precise calculation case. The methods are a super-set of those used for the precise calculation case and have several similarities. The departures accommodate the additional signalling of the vector erasures. The organization one the methods is mechanized in two passes of the data at the Encoder and a single pass at the Decoder. The data for the non-precise calculation case consists first of the two data sources IR(N) and IC(N) also used in the precise calculation case at the Encoder, and a third array, JE(N) at the Encoder which is the output, 607, of the aforementioned Double Threshold Device, 605, in FIG. 20 which signals the vector error cases. The JE(N) data is a binary one to signal the potential vector erase case and zero to indicate no potential erase. Output 607 of the binary Double Threshold Device is sent to the Encoder Logic Block 216 of FIG. 7 as an input to determine the Mode 235, called the Code Number in the flow charts and computer simulation, and the Switch Control 226 and the Table Select 243. The inputs and outputs are shown as,

| CASE | IR(N) | IC(N) | JE(N) | CODE NUMBER | ACTION |
| --- | --- | --- | --- | --- | --- |
| 1 | 0 | 0 | 0 | 0 | Null |
| 2 | 0 | 0 | 1 | 4 | Vector Erase |
| 3 | 0 | 1 | 0 | 1 | Vector Establish |
| 4 | 0 | 1 | 1 | 1 | Vector Establish |
| 5 | 1 | 0 | 0 | 2 | Scaler Erase |
| 6 | 1 | 0 | 1 | — | Not Possible |
| 7 | 1 | 1 | 0 | 3 or 7 | Scaler Modify |

In this table the binary values in the IR(N) and IC(N) columns are the result of detection whether or not the values of the quantities IR(N) and IC(N) respectively are non-zero or not. In the seventh case, the Code Number is three if the previous and present image coefficients values are equal at the same list location: the Code Number is seven if they are not equal.

The non-precise calculation case of the Vector/Scalar signalling is next described in terms of flow charts and the computer simulation of Listing 2. The description follows the format given for the precise calculation case and includes the operations for that case plus additional methods to implement the Vector Erase. Items used in the figures for the non-precise case but not in the precise calculation case are generally marked with an asterisk in FIGS. 22 through 27.

Figure 22:
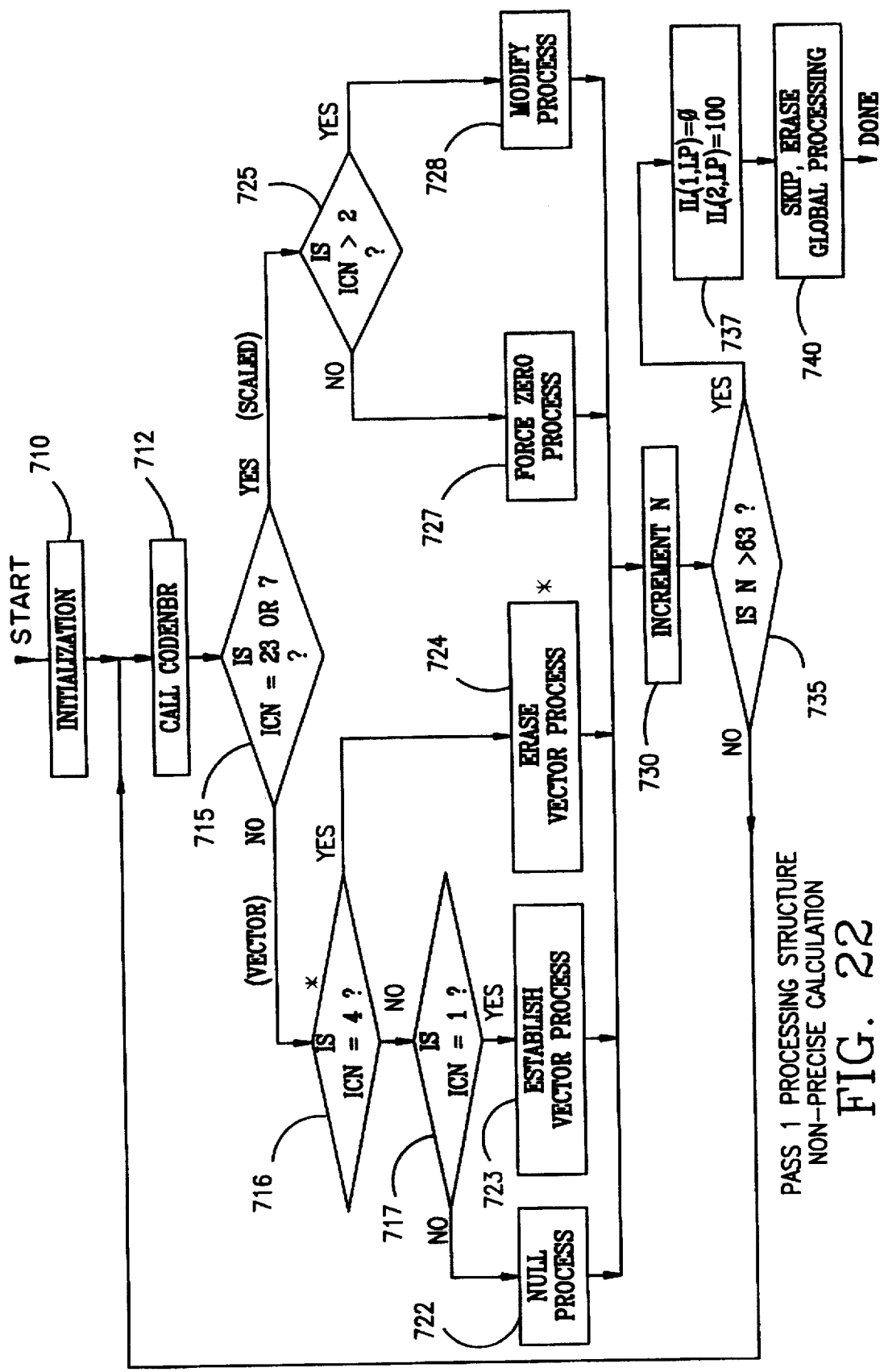
FIG. 22 is a flow of the processing utilized during pass 1 of the non-precise calculation case.

FIG. 22 shows the processing structure for Pass 1 of the non-precise calculation case in the manner that FIG. 12 showed the processing structure of Pass 1 for the precise calculation case. The following description will focus primarily on the new aspects to explain the Erase Vector aspects.

All of the arrays and variables used in the precise calculation case are used again here. A new array, JL(5,64), is formed and used in Pass 1 which is saved over and given to Pass 2. New variables LR2, LR3, FPA, FTSEC, FSTRT and FLR are all initialized to zero in the Initialization block, 710, in FIG. 22. Index pointer JP for Erase Vector List JL(5,64) is set to 1. All elements of the list array itself are set to zero.

After block 710 the processing passes to block 712 wherein a code number, ICN, is assigned for the particular Zig-Zag list location number, N. The number 4 corresponding to the Erase Vector process is new to the non-precise calculation case. As before the scalar blocks 725, 727 and 728 correspond in general to operations in FIG. 12 of blocks 325, 327 and 328. Also blocks 730, 735, 737 and 740 in FIG. 22 correspond generally to blocks 330, 335, 337 and 340 in FIG. 12. The processes within corresponding blocks will have elements which take into account the Vector Erase processing aspects, however.

If the outcome of block 715 in FIG. 22 is that ICN is not equal to cases 2, 3 or 7 then processing passes to block 716. If ICN is determined to be 4 then processing passes to the Erase Vector Process, block 724. If ICN is not 4 in block 716 then processing passes to block 717. Here it is determined if ICN is equal to 1 in which case processing passes to the Establish Vector Process, block 723. If ICN is not 1 then processing passes to the Null Process in block 722. The processing in block 740 is identical to the processing in block 340 of FIG. 12. This completes the discussion of FIG. 22.

FIG. 23 shows the details of the five processes in FIG. 22, blocks 722, 723, 724, 727 and 728.

Figure 23A:
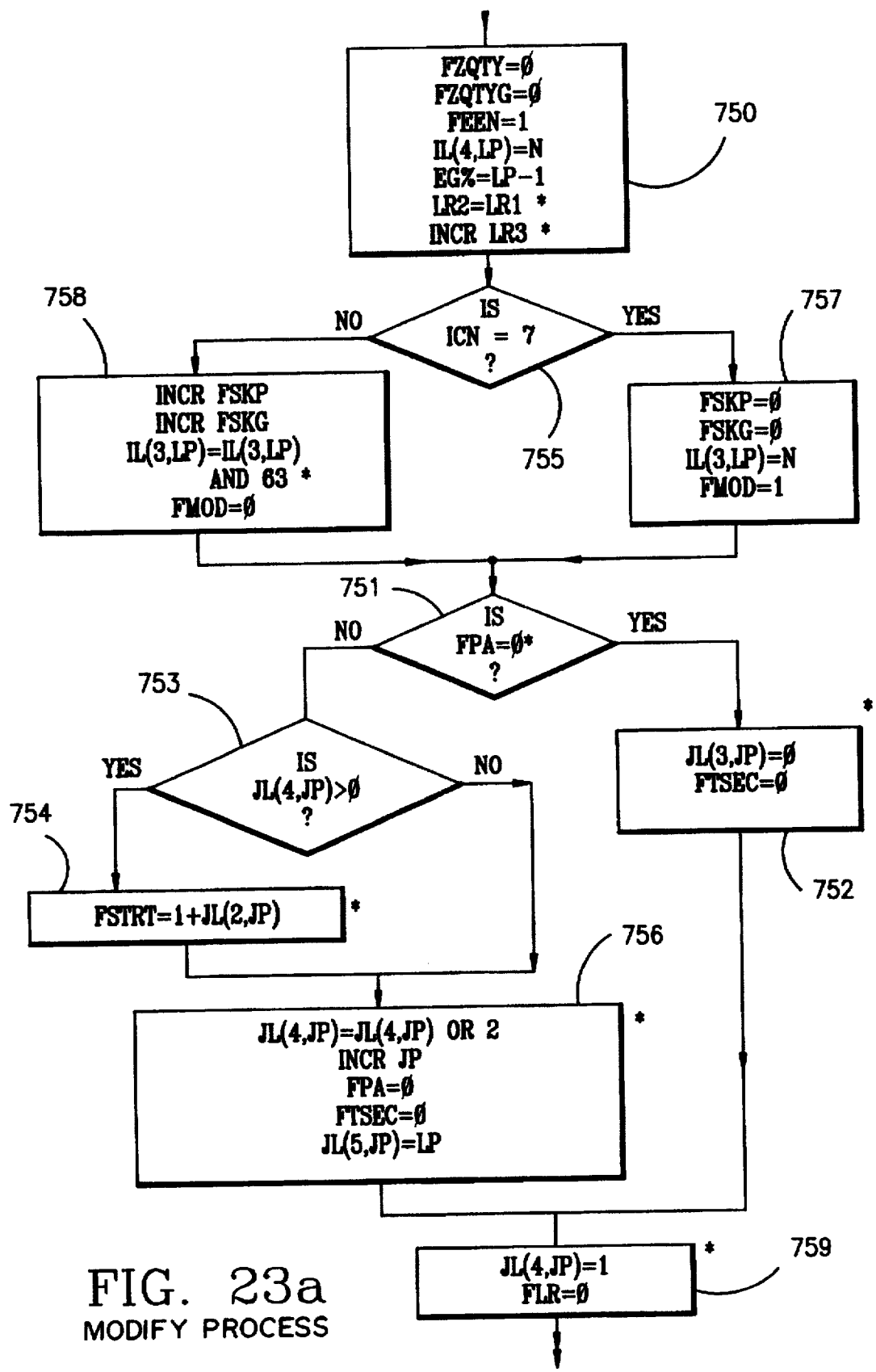

FIG. 23a shows the details of the Modify Process for the non-precise calculation case and can be seen as a super-set of FIG. 13a which accomplishes the Modify Process for the precise calculation case. Block 750 performs the function of block 350 in FIG. 13a. In addition it sets the value of LR2 equal to LR1 and it also increments the value of LR3. The parameter LR2 is used as the trial run-length for a Vector Erase case; LR3 is a parameter for trial Global |Erase case. At a particular point later in the Establish Vector process the LR2 and LR3 parameters are saved in the IL(5,LP) and IL(6,LP) locations respectively of the IL array to be saved and subsequently used in Pass 2 of the Encoding process.

Processing flow next passes to block 755 wherein it is determined whether ICN=7 which represents a non-zero value modification. If ICN=7 then the operations of block 757 are performed the same as those for block 357 in FIG. 13a. If ICN is not equal to 7 in block 755 it must be equal to 3 and the operations of block 758 are next performed for the zero value modification case. In addition to the operations which are performed in block 358 in FIG. 13a, block 758 in FIG. 23a also AND IL(3,LP) with the value of 63. This has the result of saving the first six least significant bits of the array value of IL(3,LP) but setting to zero the path flags in the 2^6 and 2^7 bits.

After the processing of either block 757 or block 758 processing flow passes to block 751 where the test is performed to determine if the flag FPA is equal to zero. The FPA flag, if equal to 1, indicates that an active erase vector group has previously been started and that transmission may be required due to the need to erase a value at the decoder. The need for an Erase Vector transmission is finally determined later if the erase action cannot otherwise be handled with a scaler erase signal. If FPA is equal to zero in block 751 then the population counter for the quantity of vector erases and the trailing scaler erase counter are both initialized to zero. If the value of FPA flag is not equal to zero then it must equal one and the processing flow passes to block 753. In block 753 the three status bits of JL(4,JP) are tested to determine if any are one (i.e. the value of JL(4,JP) is greater than zero.) Bit zero, which is the least significant bit of JL(4,JP), is set to one to prevent a Backward Erase Vector from later being formed. This is necessary if a scaler modification occurs earlier along the present path than does an Erase Vector. Bit one is the next least significant bit and is set to one to prevent a Forward Vector Erase later in the path due to a later occurring scaler modification. The decision as to formation of a Vector Erase and what kind of a Vector Erase is made later on and these status bits are used to assist in making the decision. Bit 3 of JL(4,JP) is set to one when a force zero action is covered by a previous scaler erase action. If the test in block 753 passes then the processing flow passes to block 754 wherein the value of FSTRT is set equal to one plus the value in JL(2,JP). FSTRT is the starting point along the ZIG-ZAG path for counting an Erase Vector run-length. If the value of JL(4,JP) is zero then processing flow passes directly to block 756.

In block 756 the status in JL(4,JP) is forced to make bit one equal to one by the OR operation of JL(4,JP) with the value of two. This then may later prevent a forward vector erase. Since FPA was found to equal one in block 751 and the process in FIG. 23a is the scaler modify process it can be concluded that the Vector Erase path formed to force a zero value at the decoder can proceed no further. Thus JP is incremented, FPA is reset to zero, FTSEC is reset to zero and the value of JL(5,JP), which keeps track of the Establish Path number where Vector Erase actions occur, is set to the value of the Establish Path number, LP.

IF FPA was found to equal zero in block 751 then the action in block 752 is performed. The population counter JL(3,JP) is set to zero and the Trailing Scaler Erase counter FTSEC is set to zero. Processing flow then passes to block 759 where the status JL(4,JP) is set to one to preclude a Backward Erase Vector from later being formed on the path of the Erase Vector, if it is formed. This is necessary since the scalar Modify Process which is herein described in FIG. 23a will cause a scalar to be transmitted in Pass 2 which must not be erased by subsequently forming a Backward Erase Vector. Note that this does not counteract the action in block 756 relative to JL(4,JP) since JP was incremented in between blocks 756 and 759. Also in block 759 the flag FLR is reset to zero which directs the nature of the trial counting of LR2.

FIG. 23b describes in detail the Force Zero Process. This is an expansion of that shown in FIG. 13b for the precise calculation case. The first five entries in block 760 are the same as those shown in block 360 in FIG. 13b. In FIG. 23b the trial run-length counter LR3 is incremented. Also, the 2^6 bit from the previous value of IL(3,LP) is saved over for use as the 2^6 bit of the new value of IL(3,LP). The first least significant bits of IL(3,LP) are set to indicate the present value of the index N.

Processing next flows to block 741 wherein the flag FLR is tested for being equal to one. If equal to one the trial run-length counter LR2 is incremented; if not equal to one LR2 is unchanged. Either way the processing next flows to block 743 wherein the flag MEP is tested for being equal to one. The significance of this flag relates to precise calculation. If MEP is equal to zero the calculations are deemed precise since no operations of transformation or motion estimation have occurred relative to the coefficient data. If MEP is equal to one said operations have occurred and non-precise calculations are deemed to have occurred. Thus, for MEP equal to one the run-length counting mode flag FLR is set equal to one in block 744; otherwise it remains unchanged.

Processing next passes to block 745 where the flag FPA is tested for being equal to zero. If equal to zero there has not been a previous Erase Vector group started on this path and processing flows to block 746 where the 2^2 bit, tested by AND-ing with the mask, is tested for being equal to zero. The test is to determine whether the presently needed Force Zero action can be executed by a previously occurring scalar erase action or requires a separate Force Zero action. If the 2^2 bit is equal to zero then processing flow passes to block 748 where the 2^2 bit of JL(4,JP) is set to one showing that subsequent erase actions could be accomplished by this earlier path or global force zero action. Otherwise in block 747 the population counter JL(3,JP) is incremented to indicate an additional item which could be erased by a previous path or global erasure. If in block 745 the flag FPA is not equal to zero then a possible Erase Vector group has been previously established. In this case the FTSEC counter which counts the number of scalar force zero actions trailing a Vector Erase action is incremented. This completes the description of FIG. 23b.

FIG. 23c shows the Null Process in detail and is an expansion of FIG. 13c. Wherein FIG. 13c shows only that the single run-length counter LR1 is incremented, FIG. 23c shows that additionally the other two counters necessary for the non-precise calculation case, LR2 and LR3, are also incremented.

Figure 23D:
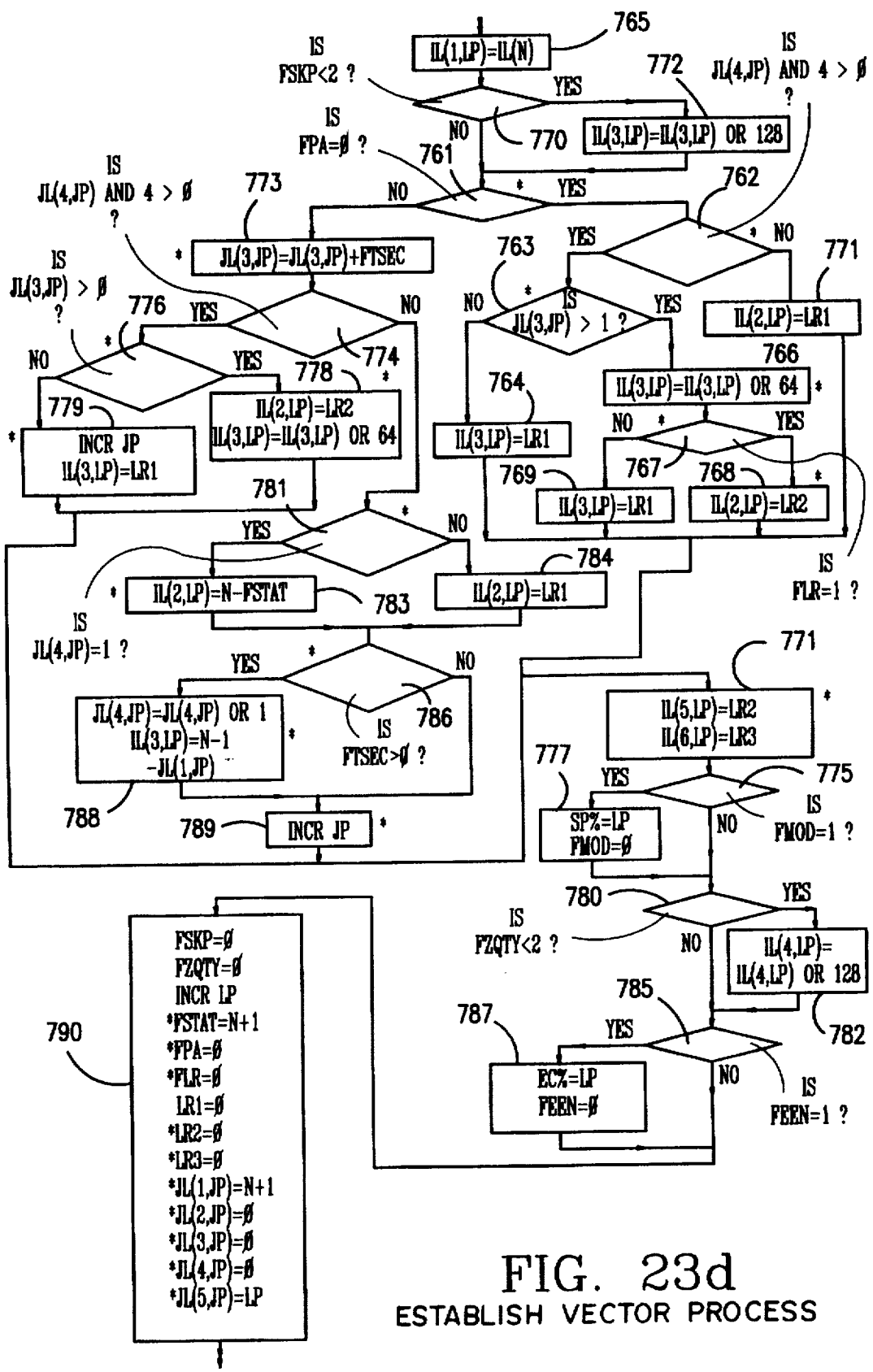

FIG. 23d shows the details of the Establish Vector Process which is an expanded set of those shown in FIG. 13d for the precise calculation case. The first operation of setting IL(1, LP) equal to IC(N) in block 365 of FIG. 13d is also performed in block 765 of FIG. 23d. The other two items of block 365 are conditionally performed later other than in block 765 of FIG. 23d. The functions of blocks 770 and 772 are performed as in block 370 and 372.

The processing in FIG. 23d next passes to block 761 wherein the flag FPA is tested for being equal to zero. If FPA is equal to a zero then no Erase Vector group need be signalled and processing passes to block 762. If FPA is equal to one then an Erase Vector List item in the JL(*,*) array must be filled with data and saved for Pass 2 commencing with processing in block 773.

The processing in block 762 commences with a test for bit 2^2 in JL(4,JP) being non-zero. If it is non-zero then processing passes to block 763 which tests the population, JL(3,JP) for being greater than one. If the population is greater than one then processing passes to block 766 wherein the 2^6 bit of Establish Vector List item IL(3,LP) is set to one to indicate a scalar path erase is needed in Pass 2. After block 766 the FLR flag is next tested in block 767. If said flag is equal to one then the run-length IL(2,LP) is assigned equal to the trial run-length LR2 in block 768; if FLR is zero then IL(2,LP) is set equal to the trial run-length LR1 in block 769.

If in block 763 the population counter JL(3,JP) is not greater than one then processing proceeds to block 764 not setting the 2^6 bit of IL(3,LP) to command a scalar erase path but to set the run-length equal to the trial length of LR1. Also, if in block 762 the 2^2 status bit is zero then processing proceeds to block 771 where the run-length IL(2,LP) is set equal to LR1.

In the processing path starting with block 773 the population counter JL(3,JP) is first augmented by the count of trailing scalar erases from FTSEC after which processing proceeds to block 774. In block 744 a first test is performed on the 2^2 bit of JL(4,JP) to determine if the Vector Erase items are potentially covered by a preceding scalar erase. If so processing passes to block 776 where a test is made on the population of the erases. If the population is zero then processing passes to block 779 wherein the Array item for the present value of the index JP is saved by incrementing JP. For this case, the run-length IL(2,LP) is set equal to LR1. If the population in block 776 is greater than zero then processing passes to block 778 wherein the trial run-length of LR2 is selected for IL(2,LP) and the 2^6 bit of IL(3,LP) is set to one by OR-ing IL(3,LP) with 64 to indicate to Pass 2 that a scalar path erase is needed. After block 778 or 779 processing next passes to block 791.

If the test performed in block 774 did not pass then processing passes to block 781 wherein a test is performed to determine if a Backward Vector Erase is prevented but a Forward Erase is not prevented and that a scaler erase cannot cover the Vector Erase actions. If this test passes then processing flows to block 783 where the run-length of the Establish Vector is set equal to N-FSTRT. If the test in block 781 fails then processing passes to block 784 wherein the run-length is set equal to LR1.

After the processing in either block 783 or block 784 the flow passes to block 786 wherein the trailing scaler erase counter FTSEC is tested for being greater than zero. If greater than zero then JL(4,JP) is adjusted by setting the 2^0 bit of the status to one to prevent a Backward Vector Erase action in Pass 2. Also, the run-length is set equal to the value of N–1–JL(1,JP) where JL(1,JP) is the first bin of the Erase Vector List for the present value of JP. If the test in block 786 fails then the processing flow passes directly to block 789 wherein the index JP is incremented, saving the array items in the JL(*,*) array for Pass 2.

The processing commencing at block 791 saves the trial run-lengths LR2 and LR3 in the IL(5,LP) and IL(6,LP) array slots respectively for possible further use in Pass 2, after which processing passes to block 775. The processing in blocks 775, 777, 780, 782, 785 and 787 is the same as performed in FIG. 13d for blocks 375, 377, 380, 382, 385 and 387 respectively. Processing then passes to block 790 in FIG. 23d.

The processing of block 790 in FIG. 23d includes that of block 390 in FIG. 13d plus the setting of LR1 equal to zero in block 365 of FIG. 13d. Additional processing in FIG. 23d adjusts the new value of FSTRT to N plus one, FPA to zero, FLR to zero, LR2 to zero and LR3 to zero. Also, the next items in the JL(*,*) array are set up, whether or not JP was incremented earlier in the Establish Vector Process of FIG. 23d. Specifically, JL(1,JP) is set to N plus one, JL(5,JP) to LP and JL(2,JP), JL(3,JP) and JL(4,JP) to zero. This completes the Establish Vector Process operations.

The processes in block 740 of FIG. 22 are identical to those in FIG. 13e and hence are not shown in a separate Figure.

Figure 23E:
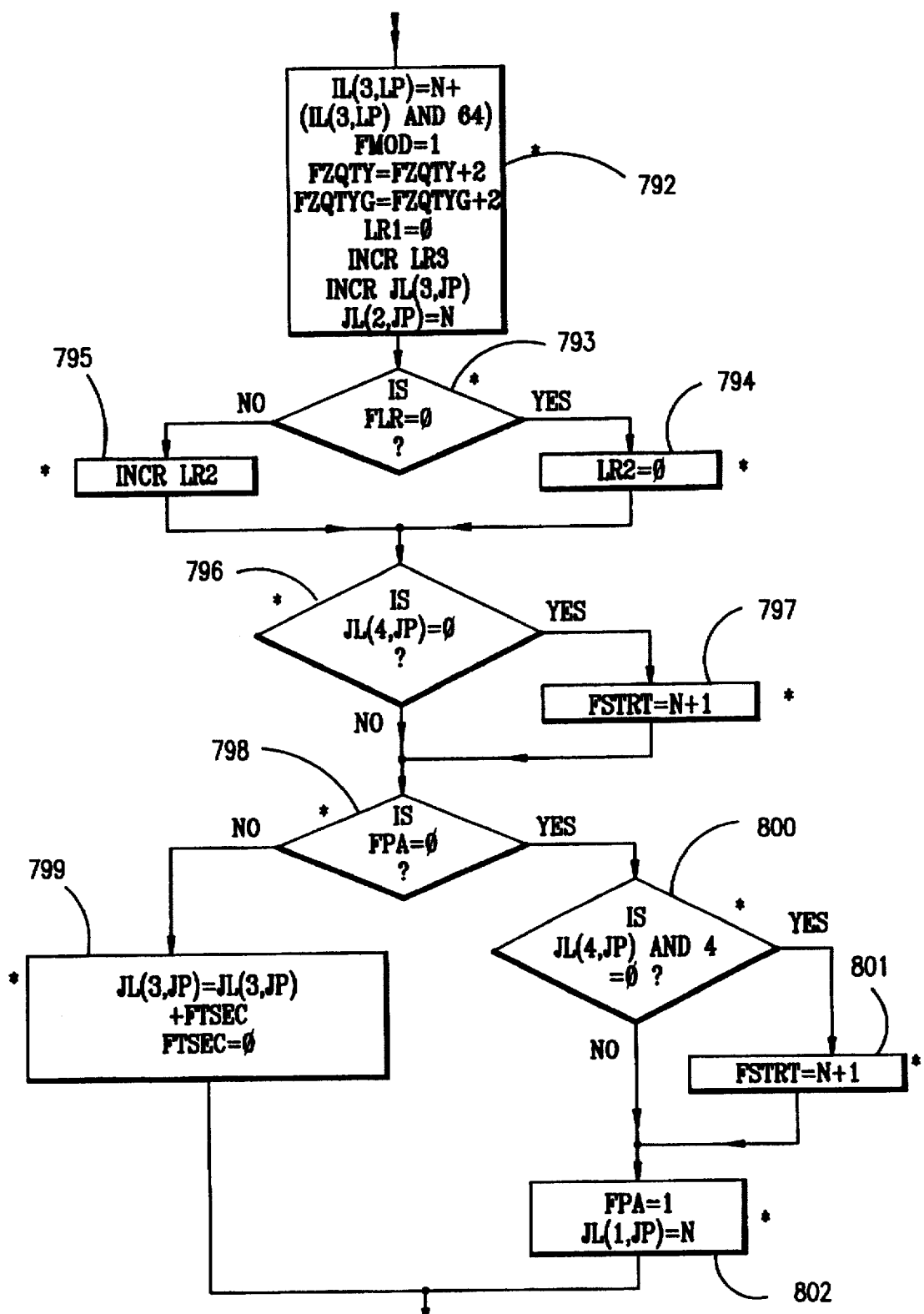

FIG. 23e shows the details of the Erase Vector Process block 724 in FIG. 22. There is no parallel with a process in FIG. 12 or 13 since the precise calculation case does not use Erase Vectors. In block 792 of FIG. 23e first the Skip Prevent address held in IL(3,LP) is advanced to the present value of N while also saving the previous flag bit at the 2^6 bit location of IL(3,LP). Also, the FMOD flag is set to one. The FZQTY and FZQTYG counters are each advanced by two. Although these could have been advanced by only one, it can be desirable to give the Erase Vector double weight in later deciding whether a path or individual erasures should be used. This occurs since variable length code words for vector erases will be moderately long and it is desirable to use as few of them as possible. The trial run-length LR1 is reset to zero, the population counter JL(3,JP) is incremented and the trial end point bin number for the vector erase, JL(2,JP), is set at the present value of N.

Processing next passes to block 793 wherein FLR is tested for being equal to zero. If equal to zero, LR2 is re-initialized to zero in block 794, otherwise LR2 is incremented in block 795.

Processing next passes to block 796 wherein JL(4,JP) is tested for being equal to zero, meaning the three status bits are all zero. If equal to zero then the temporary Start Address Register for an Erase Vector, FSTRT, is made equal to one plus the present value of the index, N, in block 797. If JL(4,JP) is not equal to zero then FSTRT is not altered.

Processing next passes to block 798 wherein the FPA flag is tested for being equal to zero. If equal to zero, meaning that the present Force Zero action is the first for this index, JP, then processing proceeds to block 800. In block 800 the value of the status word in JL(4,JP) is tested for the 2^2 bit being zero, which is performed by AND-ing JL(4,JP) with the mask, 4, and testing the result for being zero. If equal to zero the start address, FSTRT, is set equal to one plus N in block 801. If not, FSTRT is not altered. Processing then passes to block 802 where the FPA flag is set to one to record that a Vector Erase group is established on the path, and JL(1,JP) is set equal to N to record the location of the first Vector Erase action on the path.

If FPA was not equal to zero in block 798 then processing passes to block 799 wherein the population counter JL(3,JP) is augmented by the number of trailing scalar erases since the last Vector Erase action held in FTSEC. It is known that a Vector Erase group was established on this path since FPA is not zero at this value of N. FTSEC is then rest to zero ready to count additional scalar erase actions and the Erase Vector processing is complete for the present value of N.

This completes the description of processing for Pass 1 of the non-precise calculation case. The arrays IL(*,*) and JL(*,*) and the parameters SP% and EF% are saved over for use in Pass 2 to aid in forming the mixture of Establish and Erase Vectors and the scalars in the transmitted signal to the decoder.

Figure 24:
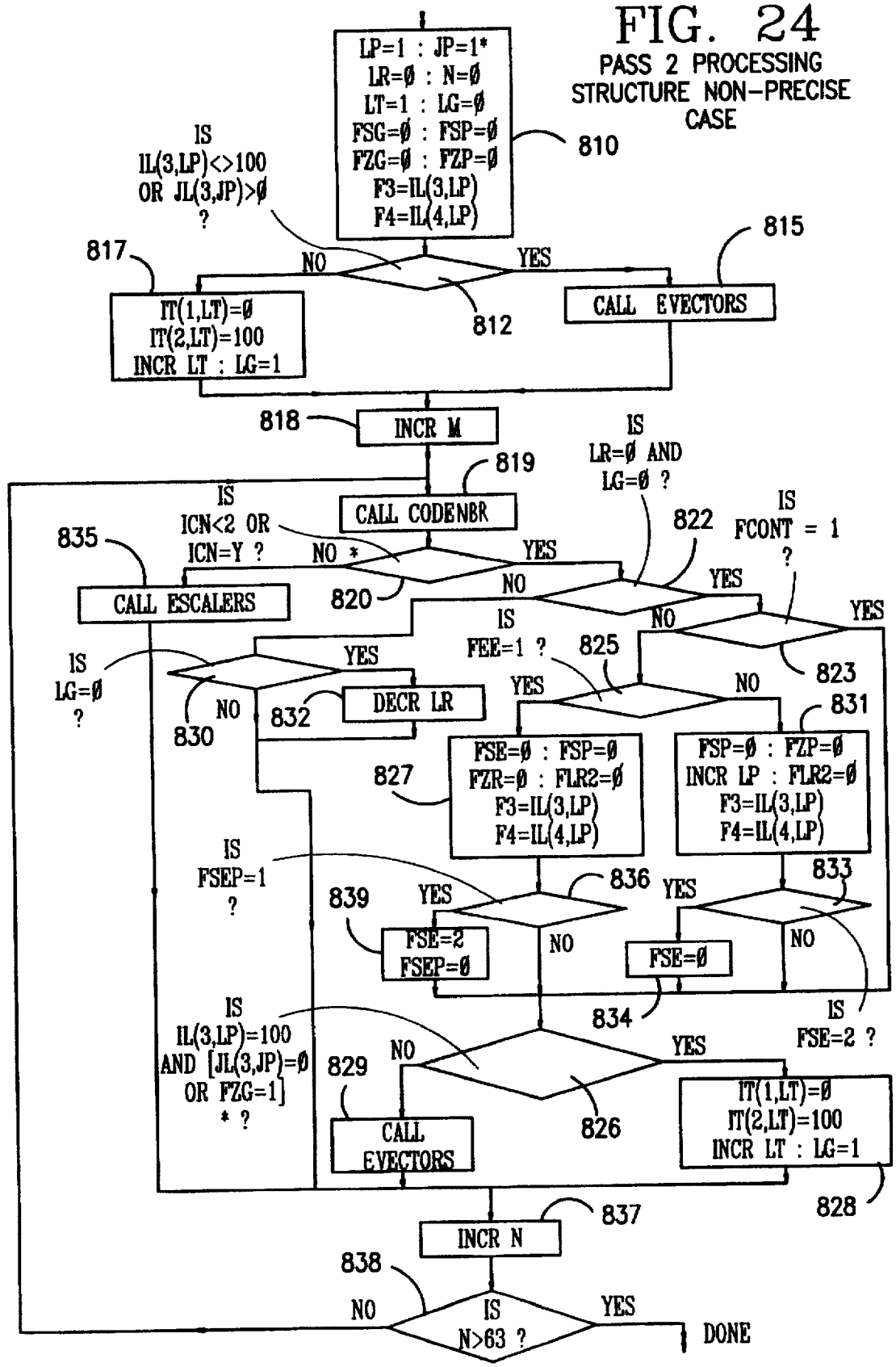
FIG. 24 is a flow chart of the processing utilized during pass 2 of the non-precise calculation case.

Pass 2 of the non-precise calculation case is described first with reference to the Processing Structure flow chart in FIG. 24. FIG. 24 can be seen as an expansion of the precise calculation Pass 2 Processing Structure of FIG. 14. The blocks in FIG. 24 or operations within a block which do not appear in FIG. 14 are again generally marked with an asterisk in FIG. 24. The same code numbering method for cases of the zero versus non-zero nature of the previous and present value of quantized and non-quantized coefficients is used in Pass 2 without re-explanation resulting in the parameter ICN. Three additional flow charts, EVECTORS, EVECTORS part 2 and ESCALARS for the non-precise calculation case will subsequently be described with reference to FIG. 25a–25c.

Pass 2 initialization occurs in block 810 which contains all the initialization of block 410 of FIG. 14 with the addition of initializing the index, JP, to one. Processing then passes to block 812 in FIG. 24 which, although similar to block 412 in FIG. 14, also includes testing of JL(3,JP) for a value greater than zero. This test of the population count shows whether the JL(*,*) array has data for the present value of JP or whether there are no further active values for the present and higher values of JP. If the test in block 812 passes then processing proceeds to block 815 wherein the routine EVECTORS is called and executed. If not then there are no vectors to process and processing passes to block 817. In block 817 the End-of-Vectors token is formed by setting IT(1,LT) equal to zero and IT(2,LT) equal to 100. The index LT is incremented to point to the after-path and the flag LG is set to one as an indicator to subsequent processing that the after-path has been reached. Processing next proceeds to block 818 wherein the index N is incremented.

Block 819 calls CODENBR to obtain the value of ICN to be used for the current value of the index, N. Processing next flows to block 820 wherein ICN is tested for less than two or equal to four. If the test passes then either Vector or Null action is to occur and processing passes to block 822. If the test fails processing passes to block 835 wherein a call is made to the routine ESCALARS.

In block 822 a test for the run-length parameter LR being equal to zero concurrently with the active Vectors flag, LG, being zero. If both are zero then a vector is to be processed and the action flows to block 823; if the test fails then a null action is indicated and processing flows to block 830.

The vector processing is more extensive due to the presence of the Erase Vector in the non-precise calculation case and hence additional steps are present in FIG. 24 past those in FIG. 14. At block 823 the flag FCONT is tested for the value of one. This flag indicates that a second Erase process for a previously started group is required and that FCONT had previously been set to one to effect this second stage. If this test in block 823 passes the processing flows to block 826; otherwise processing flows to block 825.

In block 825 the flag FEE is tested for the value of one. A value of one indicates an Erase Vector to be processed whereas a value of zero indicates an Establish Vector. If FEE is equal to one then processing passes to 827 wherein the path flags FSP and FZP are rest to zero, the count mode flag FLR2 is set to zero and the mode flag FSE is set equal to zero. The present values of IL(3,LP) and IL(4,LP) are copied into temporary registers F3 and F4 respectively. Processing then passes to block 836 wherein the flag FSEP is tested for being equal to one. If the test passes then the parameter FSE is set equal to two and FSEP is reset to zero. FSEP is a flag which is set up earlier in processing which in blocks 836 and 839 is used to properly assign a value to FSE. FSE itself cannot be set up directly earlier in that its previous value is still needed for an additional length afterward.

If FEE is not equal to one in block 825 then processing passes to block 831 wherein the path flags FSP and FZP are set to zero, the run-length mode flag FLR2 is reset to zero, the index LP is incremented and the new values of IL(3,LP) and IL(4,LP) are copied into F3 and F4 respectively. In block 833 the parameter FSE is next tested for the value two and reset to zero in block 834 if the test passes.

Processing next flows from any of blocks 833, 834, 836 or 839 to block 826 where a test determines if there are no further vectors to be processed. For this to be the case the array value of IL(2,LP) must equal 100 and either the population value of JL(3,JP) must be zero of the Global Force Zero must equal one. If this test passes then processing flows to block 828 which establishes the End-of-Vectors token. If the test fails then an additional vector is available to process and the EVECTORS routine is called in block 829. This completes the vector processing in FIG. 24.

In block 830 a test is performed to determine whether the Null action is on an active path for which LG is zero or whether the action is on an after-path. If the test passes then the Null is on an active path whereon the LR counter is counting the nulls and must be decremented which is then done in block 832. Otherwise LR is not altered.

In block 837 the value of the index N is incremented and processing flows to block 838 wherein a test is made to see if all values of the index N have been used. If the test passes then Pass 2 is finished; otherwise another iteration of processing is done starting with block 819.

Figure 25A:
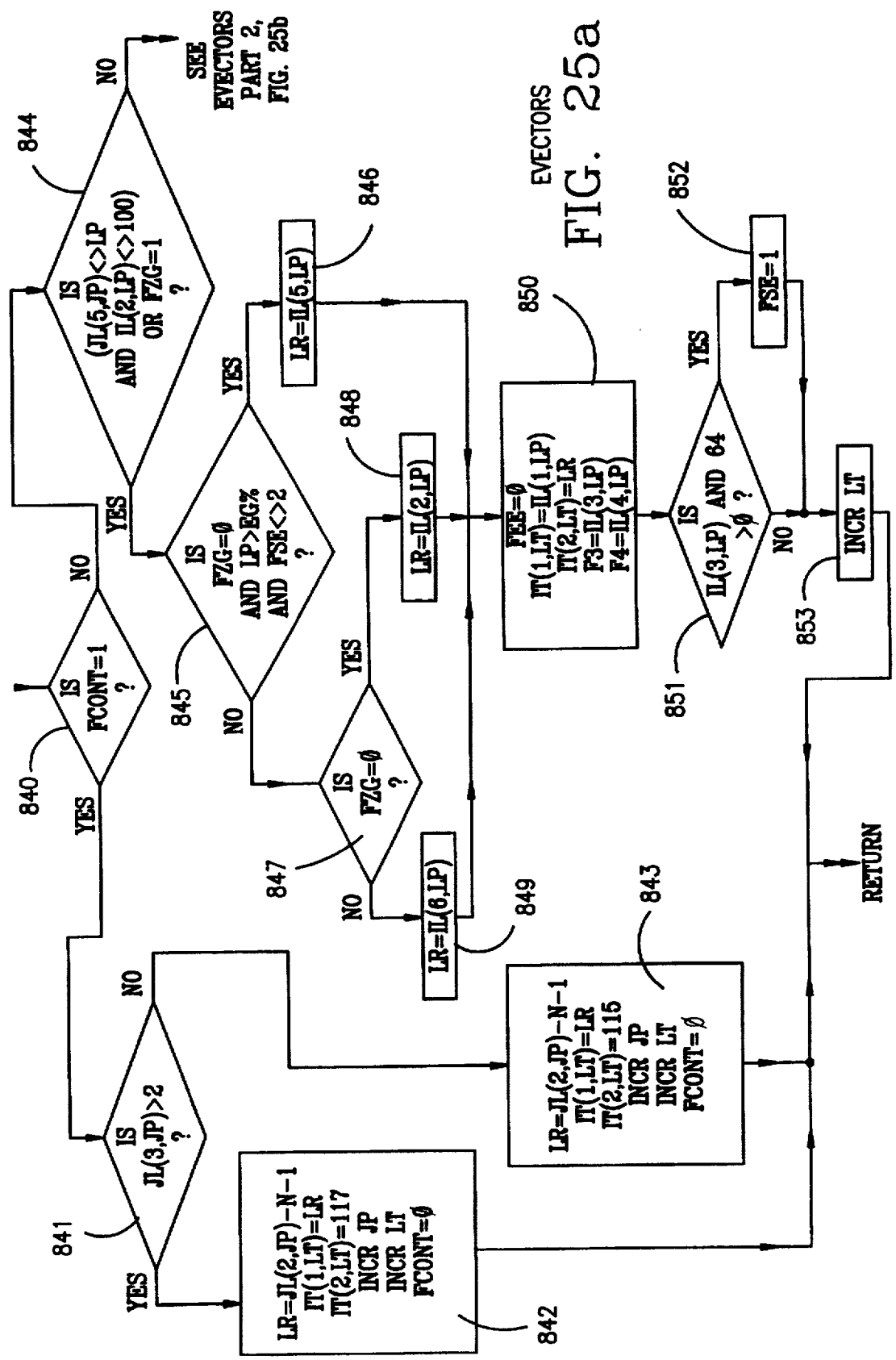
FIGS. 25a, 25b and 25c are flow charts of additional details of processing in the non-precise calculation case.
Figure 25B:
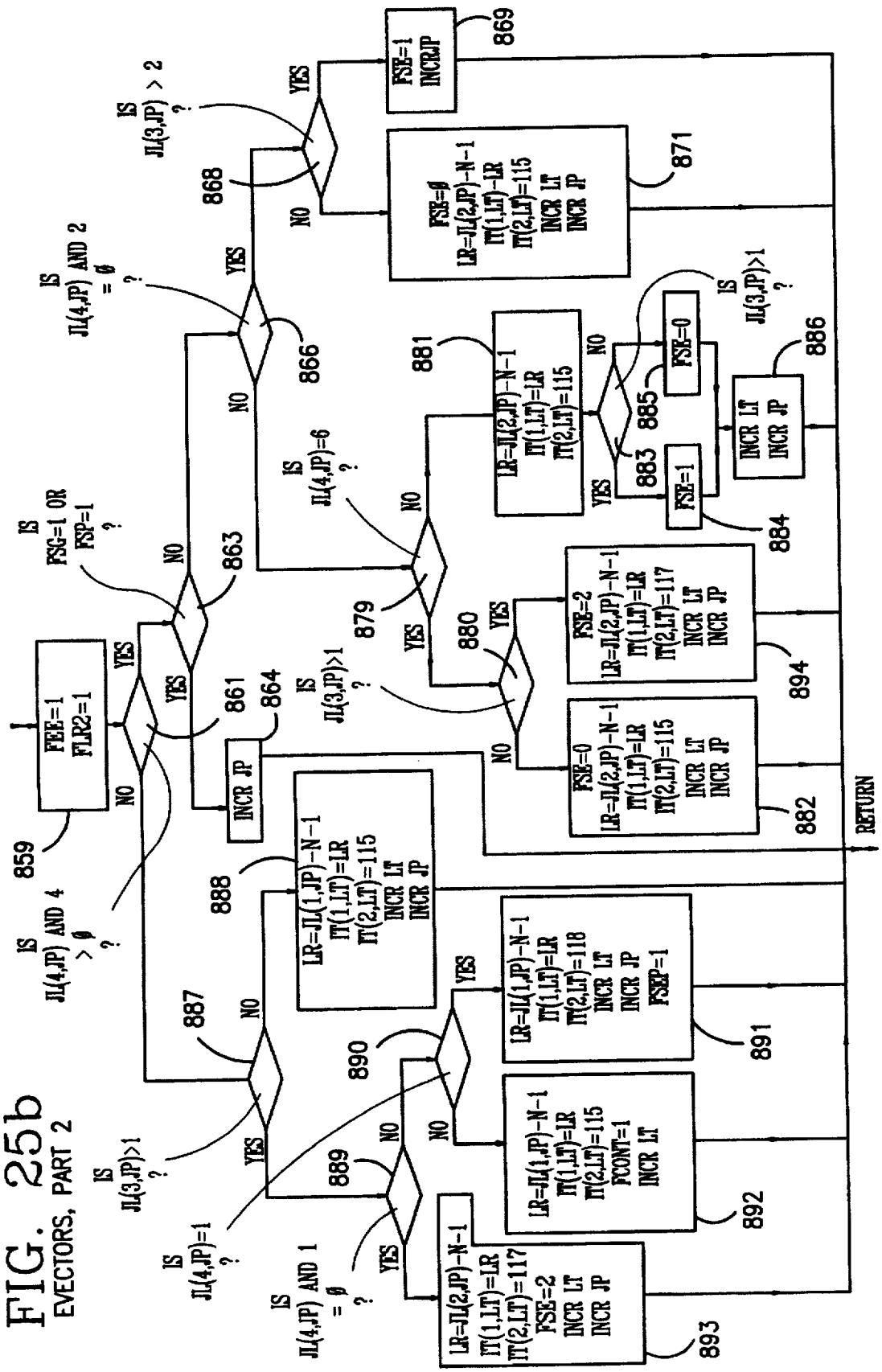

The flow chart for the EVECTORS routine is shown in FIG. 25a with a part 2 of EVECTORS shown in FIG. 25b. This is contrasted with the single block appearing in FIG. 15a for the precise calculation case. EVECTORS processing is first divided in FIG. 25a by a test of FCONT being equal to one in block 840. If equal to one this indicates that a concluding Erase Vector for a group of erasures must be transmitted and the processing is passed to block 841. Block 841 tests the population count in JL(3,JP) to determine if there are sufficient erasures to warrant a Backward Erase Vector or whether an individual Erase Vector should be transmitted. This threshold count is herein set at two such that a value greater than two for JL(3,JP) directs the flow to block 842. The run-length, LR, is set equal to the final bin number of the group of vector erasures JL(2,JP) which was determined in Pass 1, minus the present value of the index N, minus 1. The transmission token parts are set with IT(1,LT) equal to LR and IT(2,LT) equal to 117 to indicate Backward Vector Erase. The indexes JP and LT are incremented and the FCONT flag reset to zero to indicate conclusion of the multiple part Erase Vector transmission.

If the population count in block 841 is not greater than two then processing flow passes to block 843. The processing in block 843 is identical to that of block 842 expect that a single Erase Vector is indicated in the token by setting IT(2,LT) equal to 115.

If the flag FCONT is not equal to one in block 840 then processing flows to block 844 wherein JL(5,JP), which indicates what Establish Vector path the Erase Vector was located on in Pass 1, is tested to determine if it lies off the presently being treated Establish Vector path, LP; also whether the value of IL(2,LP) presently pointed to by index LP is active or on the after-path, the latter condition indicated by the value of 100. The value of the global erase flag, FZG, is also tested for the value of one. If the combination indicated in block 844 is true then Establish Vector processing is to be done and processing flows to block 845 which sets out to determine the value of the run-length, LR.

Block 845 determines if three conditions are simultaneously true in which case processing flows to block 846 which sets LR equal to IL(5,LP), the run-length value determined in Pass 1 and saved. Said three conditions are the Global Erase Flag, FZG, being equal to zero, the present path number, LP, greater than the last prevent path EG%, and the parameter, FSE, not equal to two. If any one of these three tests is not true then processing flow passes to block 847 which tests FZG for being equal to zero. If this test passes then in block 848 LR is set equal to IL(2,LP) which is saved over from Pass 1. Finally, if the test in block 847 fails then in block 849 LR is set equal to IL(6,LP), the value determined in Pass 1 and saved.

Processing next passes to block 850 wherein the flag FEE is first set equal to zero to indicate later in processing flow that the present processing for the current value of index N is for an Establish Vector. A transmission vector is formed by setting IT(1,LT) equal to the value of the vector coefficient, IL(1,LP) determined in Pass 1 and IT(2, LT) equal to the run-length LR. The values for IL(3,LP) and IL(4,LP) are copied into the temporary registers F3 and F4 respectively for future use.

Processing next passes to block 851. The 2^6 bit of IL(3,LP) is herein tested for being non-zero. If this test passes the meaning is that Pass 1 has directed that a scalar path erase should occur. Accordingly the flow passes to block 852 wherein the parameter, ESE, is set equal to one to indicate later in the processing of the present Establish Vector path that a scaler path erase should be transmitted. If the test in block 851 fails then processing flows directly to block 853 wherein the transmission token index, LT, is incremented.

If in block 844 the combined test fails then an Establish Vector is not to be next transmitted and processing flows to block 859 in FIG. 25b. Herein the flag FEE is set equal to one to indicate later in the processing that an Erase Vector is being processed; the run-length count mode, FLR2, is also set equal to one.

Processing next passes to block 861 which tests the status generated in Pass 1. The test is performed on the 2^2 bit which if non-zero indicates that the present erase vector is to be implemented with a scalar path erase, which was determined in Pass 1. This directs processing to block 863 which tests to determine if either of the Skip flags, FSG or FSP, have been previously set in which case processing flow passes to block 864 wherein the JL(*,*) array index, JP, is incremented and no further action is taken on a vector transmission.

If the test in block 863 fails then processing passes to block 866 wherein the status bit 2^1 is tested for being zero, and hence allowing a Forward Path Vector Erase. If this test passes then processing flow passes to block 868. In block 868 the population of erasures is tested for greater than two; if this test passes then processing is directed to block 869 wherein the parameter FSE is set equal to one indicating a scalar path erase should be performed to handle the erase vector group of erasures. Also the index, JP, is incremented but no transmission token is formed. If the test of population does not pass in block 868 then an Erase Vector is formed in block 871. The parameter FSE is first set to zero. The run-length, LR, for the Erase Vector is first calculated as JL(2,JP) minus N minus 1. The Erase Vector is transmitted by setting IT(1,LT) equal to LR and IT(2,LT) equal to 115, corresponding to a point Vector Erase. Both transmission index, LT, and JL(*,*) index, JP, are then incremented.

If the test in block 866 fails then processing passes to block 879 wherein the condition of bits 2^1 and 2^2 both non-zero is tested. If this test passes then processing flows to block 880 which tests the population counter JL(3,JP) for being greater than one. If this test passes then processing passes to block 894 wherein a transmission token is formed. In block 894 FSE is first set equal to two to indicate that a scalar erase has been superseded by the vector erase to be formed. Next the run-length, LR, is calculated as JL(2,JP) minus N minus one and the transmission token formed by setting IT(1,LT) equal to LR and IT(2,LT) equal to 117 for a Backward Vector Erase. The indexes LT and JP are next incremented.

If the test in block 880 fails then processing flows to block 882 wherein a point Erase Vector is formed. The parameter FSE is first set to zero and the run-length calculated as in block 894. Next IT(1,LT) is set equal to LR and IT(2,LT) set equal to 115. The indexes LT and JP are incremented.

If the test in block 879 fails then processing passes to block 881 wherein the run-length, LR, is first calculated as in block 894. The transmission token is next formed in block 881 by setting IT(1,LT) equal to LR and IT(2,LT) equal to 115. Processing next flows to block 883 wherein the population count, JL(3,JP), is tested for being greater than one. If this test passes then the parameter FSE is set equal to one in block 884 to indicate a path scalar erase is expected. If the test in block 883 fails then FSE is set equal to zero in block 885. The indexes LT and JP are then incremented in block 886. This completes the description of the EVECTORS routine for Pass 2.

Figure 25C:
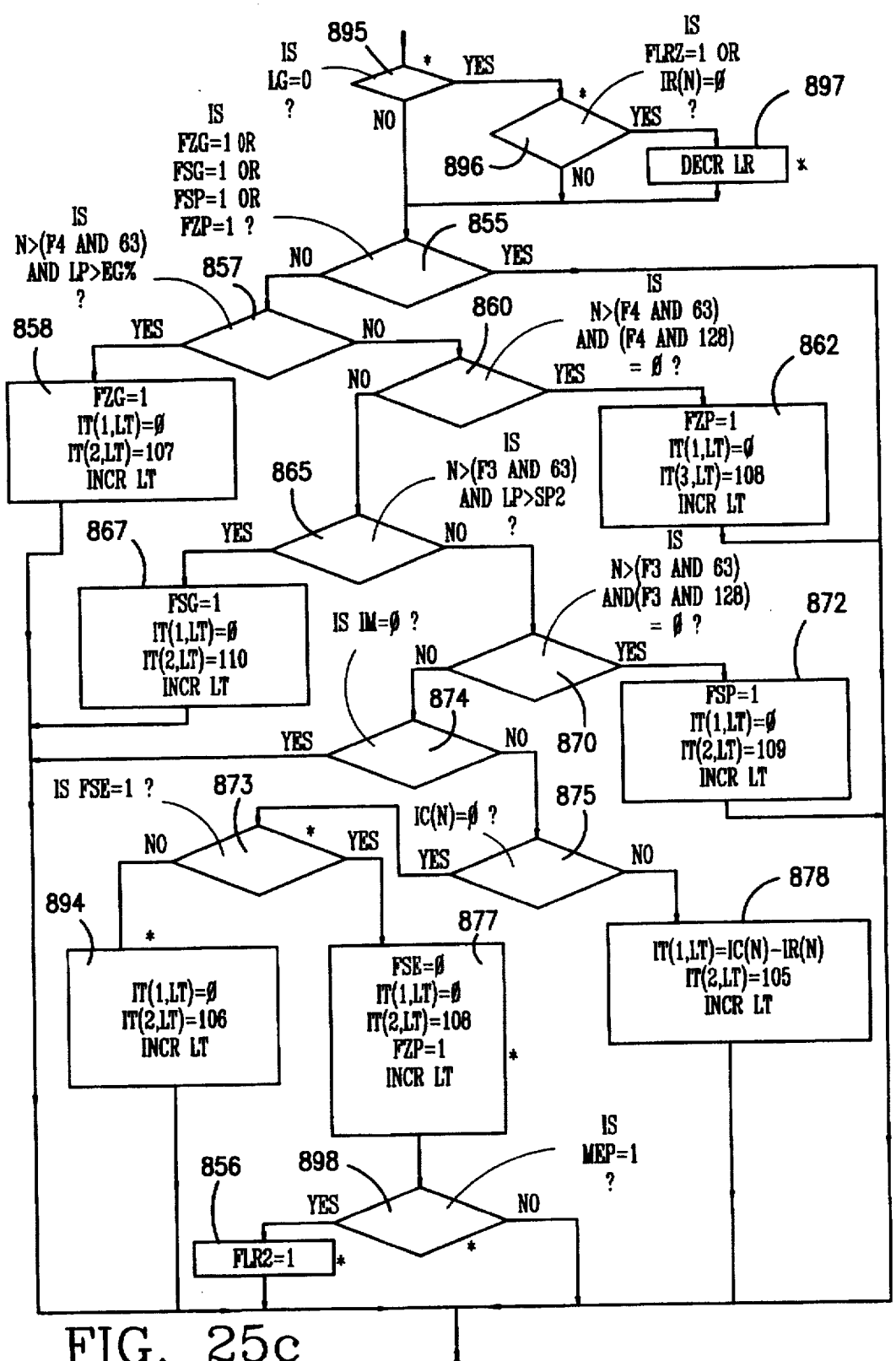

The ESCALARS routine is next described with reference to FIG. 25c. This routine is an expanded version of ESCALARS for the precise calculation case shown in FIG. 15b. Blocks in FIG. 25c which are different from those in FIG. 15b are shown with an asterisk.

Processing starts at block 895 which tests LG equal to zero which means an active path prior to the after-path. If this test passes then processing flows to block 896 wherein the count mode, FLR2 is tested for being equal to one, and the reference coefficient value IR(N) being equal to zero. If either of these tests pass then processing flows to block 897 wherein the run-length, LR, is decremented. This corresponds to the mode wherein a bin having a scaler action is counted in the run-length because of ambiguities otherwise. If both tests in block 896 fail then LR is not decremented since the improved efficiency count mode can be used without ambiguity. The precise calculation case does not have blocks corresponding to blocks 895, 896 and 897 in FIG. 25c since the improved efficiency can always be used in that case. Processing next passes to block 855. Blocks 855, 857, 858, 860, 862, 865, 867, 870, 872, 874, 875 and 878 in FIG. 25c directly correspond to the processing in FIG. 15b of blocks 455, 457, 458, 460, 462, 465, 467, 470, 472, 474, 475 and 478.

If the test in block 875 passes then processing flows to block 873 wherein a test is made of the parameter FSE equal to one. If this test passes then a path scalar erase is expected and processing flows to block 877. In block 877 the parameter FSE is first reset and then a transmission token formed by setting IT(1,LT) equal to zero and IT(2,LT) equal to 108 to effect the scalar path erase. The scalar path erase flag FZP is next set to one and the transmission index, LT, incremented. Processing next flows to block 898 wherein MEP is tested for being equal to one. If this test passes it means that transform and motion vector calculations are performed in this block of coefficients and hence the calculations are not precise and the run-length counting mode indicator, FLR2, must be set to one in block 856.

If the test in block 873 fails then processing passes to block 894 wherein a point scalar erase is performed by establishing the transmission token with IT(1,LT) equal to zero and IT(2,LT) equal to 106. The token index, LT, is then incremented.

If the test in block 875 fails the processing passes to block 878 wherein the transmission token is formed with IT(1,LT) equal to IC(N) minus IR(N), and IT(2,LT) equal to 105. The transmission token index, LT, is incremented. This concludes the description of the routine ESCALARS in FIG. 25c for the non-precise calculation case.

Figure 26:
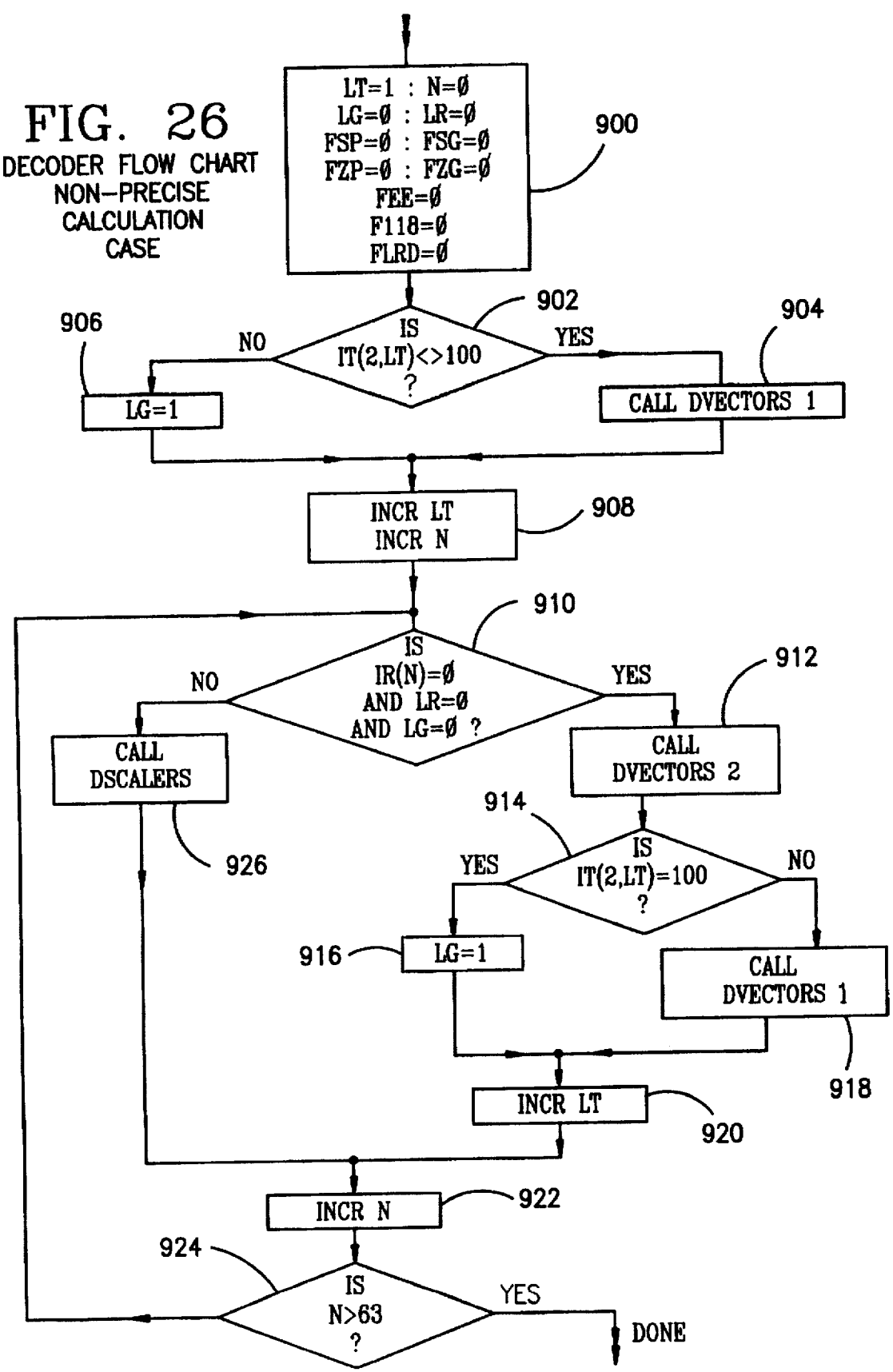
FIG. 26 is a flow chart of decoder processing in the non-precise calculation case.

The decoder for the non-precise calculation case is next described with reference to FIG. 26. FIG. 26 has the same format as FIG. 16 which shows the Decoder for the precise calculation case. The differences between FIG. 16 and FIG. 26 are now described. In block 900 of FIG. 26 the three flags FEE, F118 and FLRD are initialized to zero; all of the operations of block 500 in FIG. 16 are also performed in block 900 of FIG. 26.

The operations in block 504 of FIG. 16 are replaced in block 904 of FIG. 26 by calling the routine DVECTORS1. Also the operations of block 512 of FIG. 16 are replaced in block 912 of FIG. 26 by calling the routine DVECTORS2. Finally, the operations in block 518 of FIG. 16 are replaced in block 918 of FIG. 26 by calling the routine DVECTORS1.

DVECTORS1 is an expanded version of the processing found in blocks 504 and 518 of FIG. 16, and DVECTORS2 is an expanded version of the processing found in block 512 of FIG. 16. Also, the DSCALARS processing in block 926 of FIG. 26 is a slightly expanded version of the DSCALARS processing in block 526 of FIG. 16.

Figure 27A:
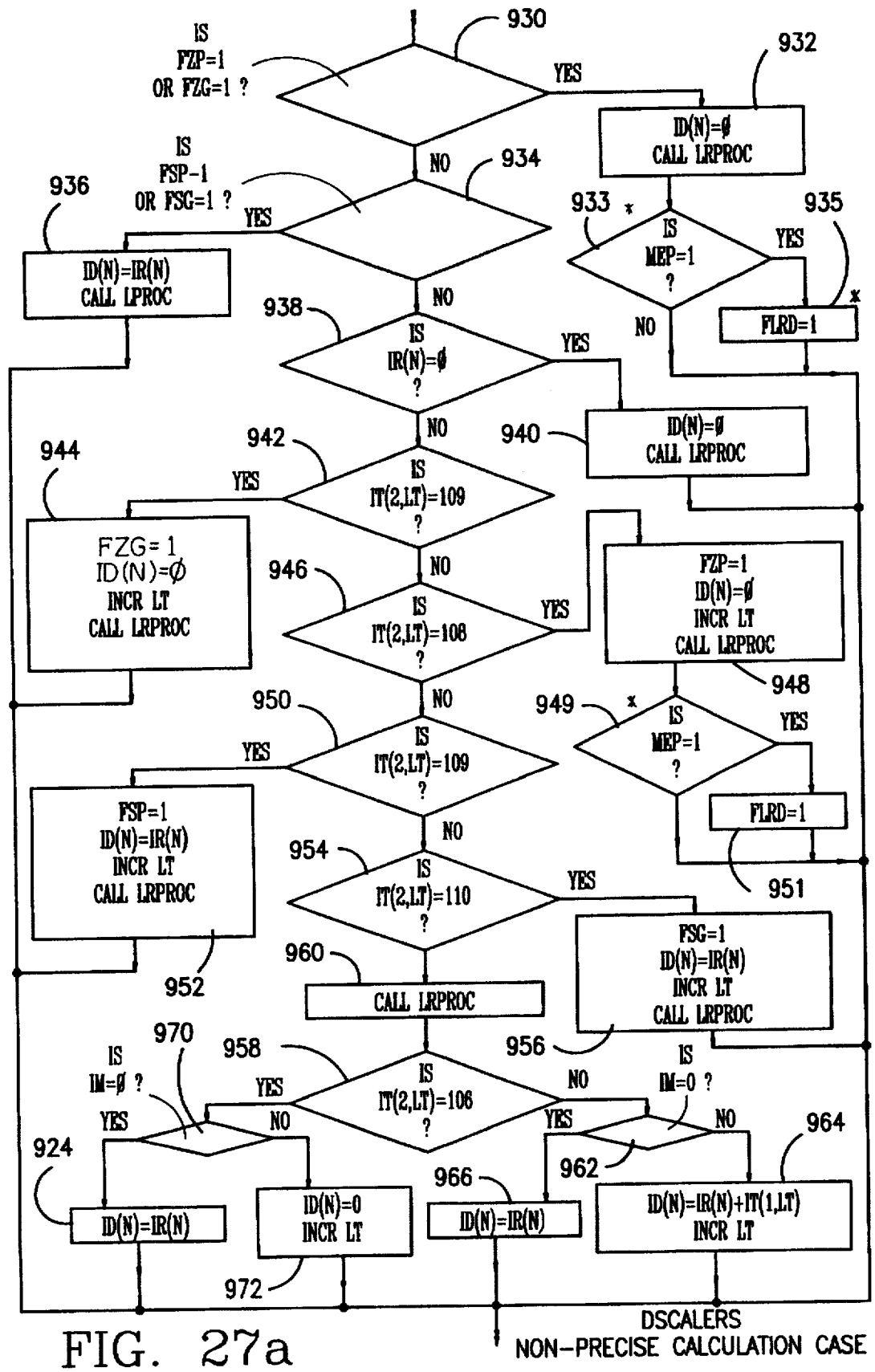
FIGS. 27a, 27b, 27c and 27d are flow charts of additional details of processing in the non-precise calculation case.

FIG. 27a shows the processing of DSCALARS for the non-precise calculation case. The processing in FIG. 27a includes all of the processing of DSCALARS in FIG. 17a with two additions. Following block 932 in FIG. 27a are blocks 933 and 935 which do not have a counterpart in FIG. 17a. In block 933 the value of the flag, MEP, is tested for being equal to one. If this test passes the processing flows to block 935 wherein the counting mode flag for the run-length, FLD, is set to one. The same two processing steps as performed in 932 and 935 are also performed in blocks 949 and 951 in FIG. 27a which follow the block 948 and which do not have a counterpart in FIG. 17a.

Block 960 which calls the processing in LRPROC is relocated before the block 958 in FIG. 27a rather than in two places after block 558 in FIG. 17a. This movement does not affect processing outcome between FIG. 17a and FIG. 27a. This completes the description of the scalar processing in DSCALARS in the decoder for the non-precise calculation case.

Figure 27B:
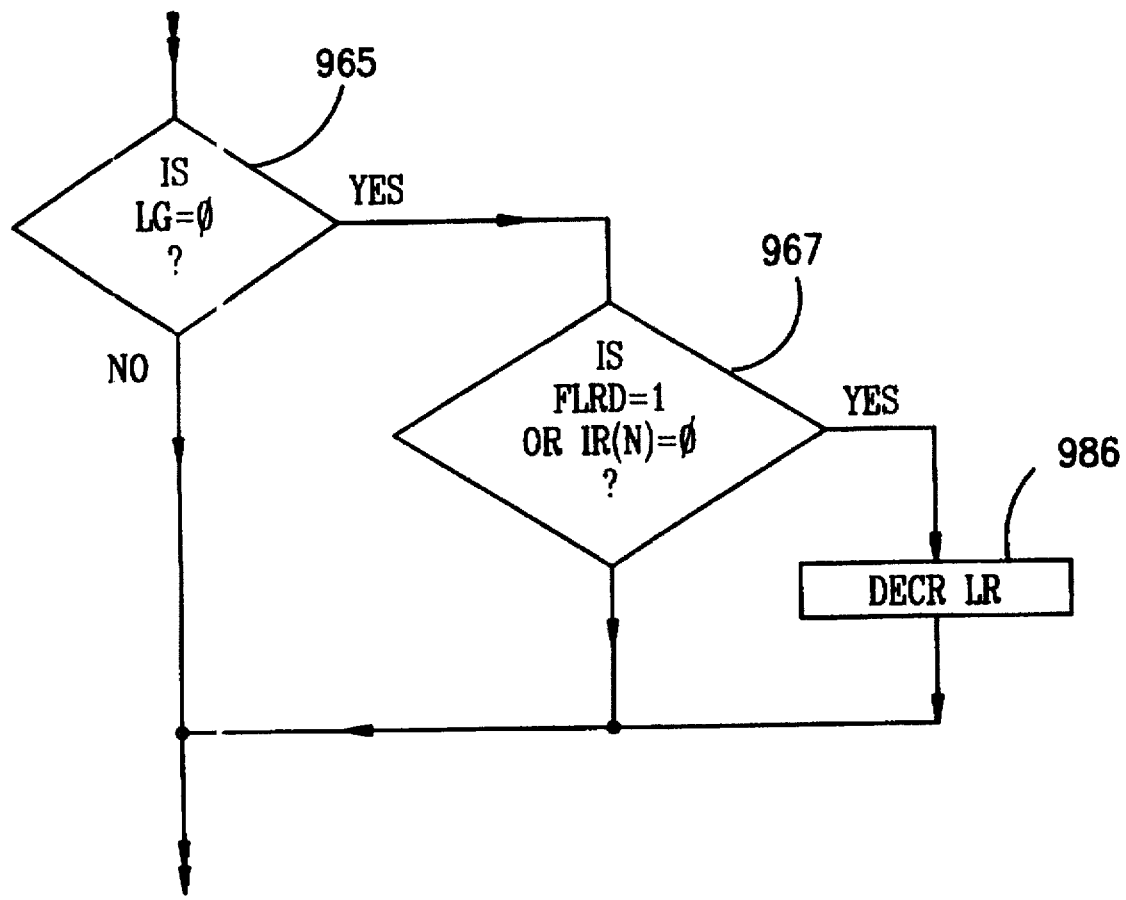

FIG. 27b shows the processing for LRPROC which is quite similar to the LRPROC processing for the precise calculation case shown in FIG. 17b. The difference between these two figures is in the blocks 567 in FIG. 17b and block 967 in FIG. 27b. In block 967 the flag, FLRD, is additionally tested for being equal to one as a condition for directing flow to block 986. Thus if either FLRD is equal to one or IR(N) is equal to zero then the run-length, LR, is decremented in block 986.

Figure 27C:
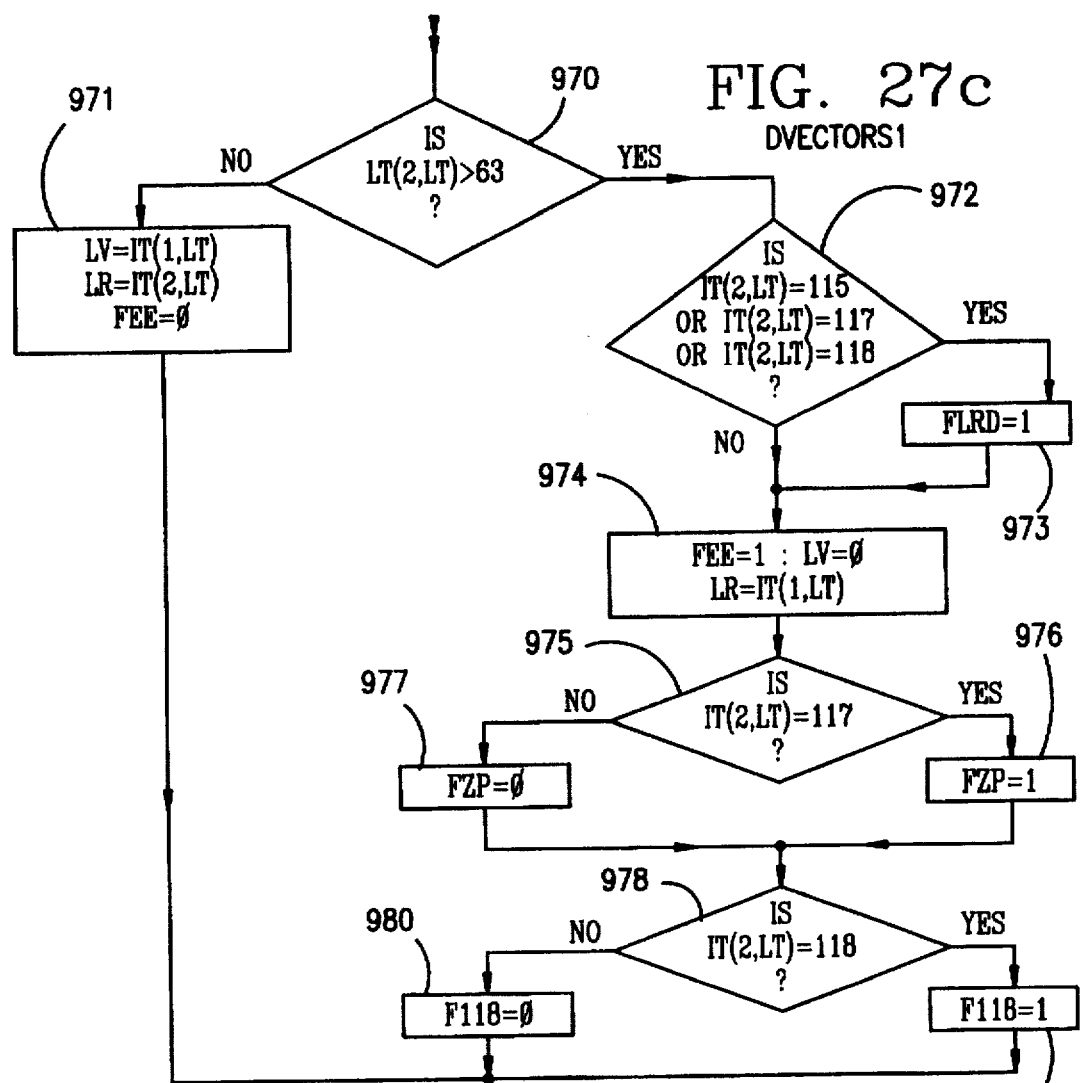

The processing for DVECTORS1 is next shown in FIG. 27c. The tasks performed by this processing are to assign values to the run-length LR, the coefficient, if any, LC, the path erase flag, FZP, the type of vector flag, FEE, the run-length count mode, FLRD, and the temporary flag F118. In block 970 the value of transmission token part IT(2,LT) is tested for being greater than 63. All values above 63, except the End-of-Vectors message, correspond to Erase vector actions whereas values of 63 and below correspond to run-length for Establish Vectors. Thus if the test fails the flow passes to block 971 wherein LV is set equal to IT(1,LT) and LR set equal to IT(2,LT). The mode flag, FEE, is set equal to zero to signal to processing blocks later that the Vector Establish mode is being processed for this index value of N.

If the test in block 970 passes then processing flows to block 972 wherein Vector Erase mode processing commences. The transmission token part, IT(2,LT) is tested for the values 115, 117 and 118. If IT(2,LT) is any of these three values the processing flows to block 273 wherein the run-length count mode flag, FLRD, is set to one.

Processing next passes to block 974 wherein the mode flag, FEE, is set to one, LV set to zero, and the run-length, LR, set to IT(1,LT). Processing next flows to block 975 wherein IT(2,LT) is tested for being equal to 117. If this test passes then the erase path flag, FZP, is set equal to one; if the test fails then FZP is set equal to zero in block 977.

Processing next passes to block 978 wherein IT(2,LT) is tested for being equal to 118. If the test passes then processing flows to block 979 wherein the flag marker, F118 is set equal to one. If the test fails then F118 is set to zero in block 980. This flag later determines in DVECTORS2 whether the erase path flag FZP is set to one. FZP cannot be set to one during processing in DVECTORS1 since it must continue to reflect its previous value until processing in DVECTORS2. This completes the processing for DVECTORS1.

Figure 27D:
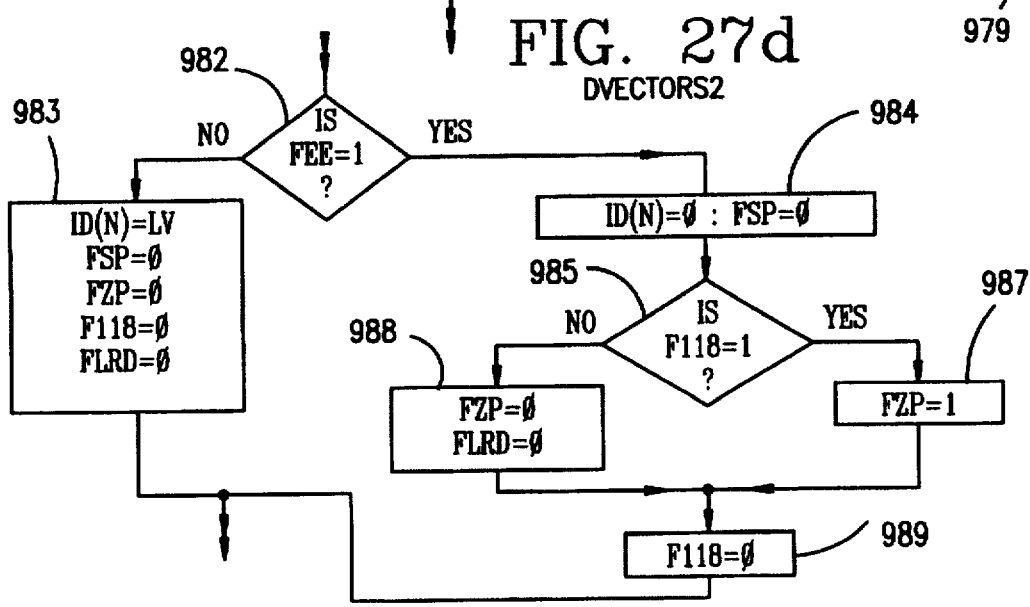

The processing for DVECTORS2 is next shown with reference to FIG. 27d. This processing is performed if the criteria in block 910 of FIG. 26 is passed, corresponding to the end point of a vector on an active path. In block 982 of FIG. 27d the flag, FEE, is tested for being one, corresponding to an Erase Vector. If this test fails then the processing for concluding an Establish Vector is performed in block 983. This consists of setting the decoder coefficient value, ID(N), equal to LV and of resetting to zero the flags FSP, FZP, F118 and FLRD.

If the test in block 982 passes then processing proceeds to block 984 wherein the coefficient value, ID(N) is set to zero and the path skip flag reset to zero. Processing next passes to block 985 wherein the temporary flag F118 is tested for being equal to one. If F118 is one then the path erase flag, FZP, is set to one for erase operation on the next subsequent path. If F118 is not one then processing passes to block 988 wherein the path erase flag, FZP, is set to zero and the count mode flag, FLRD, is reset to zero.

Processing next passes to block 989 wherein the temporary flag, F118, is reset to zero. This completes description of the DVECTORS2 processing and of Decoder processing for the non-precise calculation mode.

Fade compensation, where it is applicable, is a method of preprocessing the coefficient values of the previous image transform coefficient model prior to Interframe coding such that more efficient variable length encoding for transmission is obtained. Fade Compensation pre-processing is a predetermined mathematical operation whose result is dependent first upon the previous image transform coefficient model data and second a single multiplying factor, C, formed at the encoder. A yes/no decision made at the encoder and transmitted to the decoder indicates whether or not to actually use Fade Compensation in a given block of coefficients. If and when the decision is transmitted to the decoder to use Fade Compensation the factor, C, is also transmitted to the decoder for use in multiplying all coefficients in the previous image transform coefficient model. Since identical previous image transform coefficient models exist at both encoder and decoder and the factor, C, is also available at both, identical processing operations can be independently performed at both encoder and decoder. After preprocessing the modified previous image transform models at encoder and decoder are still identical to each other.

The preprocessing occurs in two steps which will subsequently be described in greater detail. The first step performed only at the encoder involves calculation of the average ratio of the increase in coefficient magnitude between previous and current transform coefficient models. This first step is performed by calculation of a sequence of individual ratios using only corresponding locations in both previous and current coefficient models where the coefficient value in each is non-zero. An average value of said individual ratios is then calculated. Said average value is called the factor, C. If the decision is made by the encoder to use Fade Compensation for a particular block of transform coefficients then the factor, C, is transmitted to the decoder.

In the second step the factor C is used to multiply every coefficient in the previous image coefficient model to obtain a modified previous image coefficient model at both encoder and decoder. The modified model is then used in place of the previous image coefficient model for performing the encoding for transmission discussed prior to Fade Compensation.

When the image sequence either fades in toward its full brightness or fades out towards black the locations of the transform coefficients tend to be mostly the same between successive images in the sequence. It is the amplitudes of said coefficients and not their location in the transform model which change in response to the fade. This is a result of the transform operation itself being a linear mathematical operation. As a result, a certain percentage increase in the amplitudes of all of the picture elements from a previous to present image will also cause the same percentage increase in the amplitudes of all of the transform coefficients from previous to present image transforms. For a fade-in there will be a portion of zero value coefficients in the previous image model which take on non-zero values in the present image model. Conversely for a fade-out there will be a portion of non-zero value coefficients in the previous image model which take on the value of zero in the present image model. Conversely for a fade-out there will be a portion of non-zero value coefficients in the previous image model which take on the value of zero in the present image model. Thus the process of multiplication of all of the coefficients of the previous image transform model by an appropriate constant factor, C, provides a good predictive approximation to the values of the present image transformation. Using the modified previous image coefficient model as the input to the Interframe encoding process there will be small or zero differences to be transmitted to the decoder. Where the differences are mostly zero the Path or Global Skip command(s) developed earlier in the invention can be used effectively to bypass groups of coefficients not requiring amplitude change. Where differences are small the encoding process will perform more efficiently, compared with not using Fade Compensation, because the smaller coefficient differences will be assigned shorter variable length codes compared with longer variable length codes being assigned to larger coefficient value differences.

A perfect fade-out case wherein the differences between coefficients in the current image model and corresponding coefficients from the modified previous image model is zero can be accomplished by three signals. First the one bit decision to use Fade Compensation is transmitted. Second an End-of-Vectors command is transmitted indicating that no vectors are to be transmitted. Vector transmission is not required because all changes are to only values of coefficients in the previous image transform model whose values are non-zero. Thus, according to the first part of the invention, scalar signalling can accommodate all the required changes. A Global Skip command is transmitted at the occurrence of the first non-zero coefficient which indicates to the decoder that all coefficients for the subsequent coefficient model are to take the values directly from the modified model. In this case, no coefficient difference values need be transmitted.

The encoder must also determine under what condition it is appropriate to determine that Fade Compensation is beneficial and should be used. A criteria is required which shows that the individual ratios calculated are close enough to each other that the multiplication of all coefficients in the previous image block by the single factor, C, will yield modified coefficients close in value to the corresponding coefficients in the present image. To do this a second factor, V, is calculated, which will be described subsequently.

A third consideration is that of calculation precision of the factor, C. The coefficients to be used in the calculations are assumed to be integer values somewhere in their revolution. When the previous and/or present image coefficient values are small a problem can occur with their calculated ratio.

Although the calculated ratio is correct as applied to the case from which it is derived it often does not contain sufficient accuracy to apply to the ratio of large coefficient values. To see this more clearly take the example of a block of coefficients wherein both the previous and present images contain two corresponding coefficients. From the previous image model the values are 1 and −113. The corresponding values in the present image are 2 and −181. The ratio calculated from the first pair, consisting of 2 from the present image and 1 from the previous image, is 2. The ratio calculated from the second pair, consisting of −181 from the present image and −113 from the previous image, is 1.6. Use of the unweighted average of these two ratios, calculated as 0.5*(2+1.6) which equals 1.8, would yield the predicted values for the current image model of 1.8*1=1.8, and 1.8*−113=−203.4. Rounding of these values yields 2 and −203. Although the first coefficient is correctly predicted the second is in error by 12%.

If the factor, C, was formed from only the second pair then the prediction of both the first and second values would have been perfect. That is, 1.6*1=1.6, and is rounded to 2; 1.6*−113=−180.8, and is rounded to −181. This shows that the larger coefficients can be used to more precisely calculate the factor, C. So as not to rely solely on a single pair of values to determine the value, C, it is desirable to weigh the contribution of the ratio formed from the larger coefficient values more heavily than that formed from the lower coefficient values. A weighting method based upon the input value of the present image model coefficient (CIMC) uses the following Look-up Table:

| Absolute value of CIMC | Weight assigned to calculated ratio |
|---|---|
| 1 to 2 | 1 |
| 3 to 5 | 2 |
| 4 to 10 | 4 |
| 21 to 30 | 7 |
| 20 to 30 | 11 |
| greater than 20 | 16 |

FADE COMPENSATION WEIGHT LOOK-UP TABLE

The formation of the factor, C, shall be accomplished according to the formula, $$C = \frac{1}{\sum_{i=1}^{63} w_i} \times \sum_{i=1}^{63} C_i \times w_i$$

where the indicated summations are performed only at coefficient locations wherein both the previous and present image transform coefficients have non-zero values. There are Np of these locations. $w_1$ is the weight assigned from the look-up table to the i-th present model coefficient used. Each Ci is an individual ratio of coefficients formed by, $$C_i = C_{ci}/C_{pi}$$

where $Cc_i$ is the coefficient value from the present image and $C_{pi}$ is the coefficient from the previous image.

The method of calculating the factor, C, is performed in a hardware implementation as shown in FIG. 28a. The present image coefficient is input, $C_{ci}$, is input at 1000 whereas the previous image coefficient is input at 1002. Both inputs pass to the Zero Detect box, 1005, which generates a qualifying output signal at 1012 if both $C_{ci}$ and $C_{pi}$ are both non-zero. This signal passes to the Divider block, 1015, which enables it if both signals at 1000 and 1002 qualify. If one or both input signals do not qualify then the output of Divoder, 1015, is the value zero. Block 1015 otherwise serves to divide the input, $C_{ci}$, by the second input, $C_{pi}$. The elementary ratio, $C_i$, issues from Divider, 1015, and passes to one input of Multiplier, 1020. The other input, $w_i$, to Multiplier, 1020, is the weight assigned by the Weight Look-Up Table block, 1010, in response to its input $C_{ci}$. The qualifying signal, 1012, is also passed to block 1010 such that the weight assigned, $w_i$, is zero if the present pair of input coefficients does not qualify. $w_i$ also is passed to block, 1025, wherein a summation is formed of all of the elementary weights. At the end of the block the output value, WT, of block, 1025, is the final weighting quantity.

The output of Multiplier, 1020, is the elementary ratio, $C_i$, multiplied by the elementary weight, $w_i$, which passes to the summation device, 1030. At the end of the coefficient block the numerator term into Divider 1035 reaches its final value for the weighted sum of the ratios. The output, 1040, of Divider, 1035, is the desired factor, C.

The method of determining whether or not to use Fade Compensation is now described. For effective use of the Fade Compensation method, the individual ratios which form a weighted average should have values which are not far different. A method which forms a test criteria for the variation in the differences of the ratios is given in terms of a calculated value, V. The value, V, is formed using the same weighting as for calculating the factor, C, and is given as, $$V = \frac{1}{\sum_{i=1}^{63} w_i} \times \sum_{i=1}^{63} |C_i - C| \times w_i$$

If the value, V, is less than a threshold value, Vt, then the decision is made to perform Fade Compensation; if the value of V is equal to or greater than Vt then the decision is made not to perform Fade Compensation. A value of Vt of about 0.1 is an appropriate threshold.

The method of calculating the quantity, V, is performed in a hardware implementation as shown in FIG. 28b. The i-th present image coefficient, 1050, and the i-th previous image coefficient, 1052, are passed to the Zero Detect block, 1055, wherein it is determined if both coefficient values are non-zero. If both values are non-zero then the output enables the Divider block, 1065, and the Weight Look-up Table, 1060. If not enabled then block 1060 and 1065 generate the value zero at their respective outputs.

Divider block, 1065, performs the division of the two coefficient values where $C_{ci}$ is the numerator and $C_{pi}$ is the denominator. The output result is the elementary ratio, $C_i$, which is passed to the Subtractor block, 1070 in FIG. 28b. Block 1070 serves to subtract the value of C, 1040 in FIG. 28a, from each value of $C_i$. The output of block 1070 is therefore the difference between each elementary value of the coefficient ratio and the average value of all the elementary ratios, C, calculated by the method of FIG. 28a. The output from block 1070 in FIG. 28b is passed to block 1075 which determines the absolute value of the difference presented to its input so as to always be a positive number, Vi. Vi is then passed to one input of the weight multiplier block 1080.

The Weight Look-up Table 1060 in FIG. 28b operates the same way as the Weight Look-up Table in FIG. 28a operates such as to produce a weight in response to the magnitude of the present image transform coefficient, $C_{ci}$. The weight determined in block 1060 of FIG. 28b is passed to the second input of Multiplier block, 1080. The output of block 1080 is the absolute value of the elementary difference value, Vi, multiplied by the weight, $w_j$, and is passed to the Summation block, 1085. At the end of the block of coefficients the output of block 1085 is the value of the summation of all of the qualifying, weighted values of Vi.

The output of the Summation block, 1085, in FIG. 28b is finally passed to the Divider block, 1095, which performs the division of the Summation from block 1085 by the sum of the weights WT, 1090, and determined in block 1025 of FIG. 28a and saved over for use with block 1095. The result of this division is the value V, 1100.

The value of V is always positive or zero due to the Absolute Value operation performed in block 1075 of FIG. 28b and is next compared with a predetermined threshold value, as previously stated as about 0.1. This comparison is not shown in FIG. 28. Values of V which are less than the threshold amount qualify the block of coefficients for the Fade Compensation process whereas values at or above the threshold do not qualify the coefficient block for Fade Compensation. In addition, the zero detection process in block 1055 of FIG. 28b must also produce one or more qualifications in a block of coefficients to allow the Fade Compensation process to be performed. If no qualifications are generated by block 1055 then Fade Compensation is automatically disallowed for the coefficient block.

If the Fade Compensation is qualified then all of the coefficients in the previous image coefficient model are multiplied by the factor, C. This must be performed identically at both encoder and decoder using an identical round-off procedure such that the modified models at both encoder and decoder are identical. The coefficient models subjected to Fade Compensation are then used as the reference models for encoding the current image at the encoder and reconstructing a current image at the decoder.

It should be noted that Fade Compensation is complimentary to all of the other methods for encoding and transmission of Interframe coefficient data set forth in this invention. It can, additionally, be used without the other methods of this invention but with a system employing coefficient models as the reference basis for interframe coding. In particular, Fade Compensation can be used in conjunction with the methods disclosed in aforementioned U.S. Pat. No. 4,751,742.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. Apparatus for compressing video data comprising:
   a. means for transforming a representation of a present image using a given transform function and for transforming a representation of a previous image using the same transform function image to obtain a plurality of transformed values of said previous image and a plurality of transformed values of said present image;
   b. means for subtracting each one of said plurality of transformed values of said previous image from a corresponding one of said plurality of transformed values of said present image to derive a plurality of difference values, the number of said plurality of difference values being equal to the number of said plurality of transformed values of said previous image and to the number of said plurality of transformed values of said present image;
   c. means for determining which of the difference values require a vector representation and which of the difference values can be represented by a scalar representation;
   d. means for representing for transmission or storage said plurality of difference values as a combination of vectors and scalars, said means for representing operable to represent difference values selectively as vectors and scalars based on the determination of the means for determining, said vectors constituting an ordered set comprising a value and a run length and said scalars constituting a value or a command.

2. The apparatus of claim 1 in which said means for transforming comprises means for performing a discrete cosine transform.

3. The apparatus of claim 1 in which the means for representing said plurality of difference values as vectors and scalars comprises means for subtracting values from two two dimensional arrays and for reading out the elements of the arrays in a zig-zag order beginning with the upper left element of the arrays.

4. The apparatus of claim 1 in which the means for subtracting comprises a present array storing said plurality of transformed values of said present image and a previous array storing said plurality of transformed values of said previous image.

5. The apparatus of claim 4 in which the means for representing said plurality of difference values as vectors and scalars replaces vector transmission with scalar transmission except when one of said plurality of transformed values of said present image is non-zero and the corresponding one of said plurality of transformed values of said previous image is zero.

6. The apparatus of claim 5 in which the means for representing said plurality of difference values as vectors and scalars comprises means for sending only scalar values when one of the plurality of the transformed values of the present image and the corresponding one of the plurality of transformed values of the previous image are both non-zero.

7. The apparatus of claim 1 in which the means for representing said plurality of difference values as vectors and scalars includes means for formatting said difference values selectively as vectors or scalars and means for selectively transmitting said difference values as vectors, scalars or as mixed vectors and scalars.

8. The apparatus of claim 1 in which said means for representing said plurality of difference values as vectors and scalars comprises means for representing said vectors and scalars with transmission codes of variable length.

9. The apparatus of claim 6 in which the means for sending only scalar values sends values which represent the difference between one of said plurality of transform values of the previous image and one of said plurality of transform values of a present image.

10. The apparatus of claim 5 in which said means for representing said plurality of difference values as vectors and scalars comprises means for shortening the sequence of scalar values sent by sending a scalar path erase command, a scalar global erase command, a scalar path skip command or a scalar global skip command.

11. The apparatus of claim 10 further comprising:
   a. means for receiving said plurality of difference values, run lengths and commands represented as vectors and as scalars;
   b. means for adding each one of said plurality of difference values with a corresponding one of a plurality of transformed values of a transform model of the previous image; and
   c. means for constructing a transform model of the present image using said plurality of difference values and said corresponding plurality of transformed values.

12. The apparatus of claim 11 in which the means for constructing a transform model of the present image adds each one of said plurality of difference values and said corresponding one of said plurality of transformed values of said model of the previous image; and further comprises means for using a transform model of the present image as a model of a previous image when receiving coefficient data to construct the subsequent present image transform model.

13. Apparatus for compressing video data comprising:
   a. means for subtracting each one of a plurality of values of a transformed previous image, said previous image being transformed using a given transform function from a corresponding one of a plurality of values of a transformed present image, said present image transformed using the same transform function to derive a plurality of difference values, the number of said plurality of difference values being equal to the number of said plurality of transformed values of said previous image and to the number of said plurality of transformed values of said present image;
   b. means for determining which of the difference values require a vector representation and which of the difference values can be represented by a scalar representation;
   c. means for representing for transmission or storage said plurality of difference values as a combination of vectors and scalars, said means for representing operable to represent difference values selectively as vectors and scalars based on the determination of the means for determining, said vectors constituting an ordered set comprising a value and a run length and said scalars constituting a value or command;
   d. means for periodically sending information about changes to images using an encoder coupled to a decoder over a communications link in which the decoder maintains a model of image information which tracks a model of image information maintained at the encoder;
   e. means for sending vectors and scalars from said encoder to said decoder to update said decoder model with change information about how a model of said present image differs from a model of said previous image;
   f. means for sending correction information to the decoder from the encoder to establish exact correspondence between the models of image information at both the encoder and decoder.

14. A method of encoding video images which are represented as a set of coefficients of an image transformed using a given transform function, comprising:
   a. comparing a set of coefficients of a present image with a set of coefficients derived from a previous image using the same transform function, and thereby generating differences values;
   b. identifying, for a pair of corresponding coefficients in the sets of coefficients, whether the corresponding coefficient of the present image is zero or non-zero and whether the corresponding coefficient of the previous image is zero or non-zero;
   c. generating a signal indicative of one of the four possible combinations of the pair of corresponding coefficients identified as being zero or non-zero;
   d. outputting coding information describing said pair of corresponding coefficients, said coding information being output in one of four possible modes corresponding respectively to said one of the four possible combinations; and
   e. using said coding information to selectively represent each difference value as a vector or as a scalar.

15. The method of claim 14 wherein said coding information is output in a null mode when said pair of coefficients are both zero, in a scalar difference mode when said pair of coefficients are both non-zero, in a vector establish mode when the coefficient of said previous image is zero and the coefficient of the present image is non-zero and in a scalar erase mode when the coefficient of said previous image is non-zero and the coefficient of the previous image is zero.

16. A method of encoding video images which are represented as a set of coefficients of an image transformed using a given transform function, comprising:
   a. comparing a set of coefficients of a present image with a coefficient model derived from a previous image using the same transform function;
   b. identifying non-zero coefficients of the set of coefficients of said present image which were also non-zero in the set of coefficients of said previous image; and
   c. sending scalar information about the difference in scalar values of non-zero coefficients of the sets of coefficients of said previous and present images.

17. A method of encoding video images which are represented as a set of coefficients of an image transformed using a given transform function, comprising:
   a. comparing a set of coefficients of a present image with a set of coefficients derived from a previous image using the same transform function;
   b. identifying non-zero coefficients of a set of coefficients of the previous image which have a zero value at corresponding locations in the set of coefficients of said present image; and
   c. updating a model of the previous image using a scalar erase mode to send information to cause zero values to be written in a model of the present image.

18. A method of encoding video images which are represented as a set of coefficients of an image transformed using a given transfer function, comprising:
   a. comparing a set of coefficients of a present image with a set of coefficients derived from a previous image using the same transfer function;
   b. identifying one or more non-zero coefficients of the set of coefficients of the present image which were zero in the set of coefficients of the previous image; and
   c. identifying non-zero coefficients of the set of coefficients of said present image which were also non-zero in the set of coefficients of said previous image; and
   d. identifying non-zero coefficients of the set of coefficients of the previous image which have a zero value at corresponding locations in the set of coefficients of said present image;
   e. outputting vectors describing said non-zero coefficients of the set of coefficients of the present image which were zero in the set of coefficients of the previous image in a vector establish mode;
   f. sending scalar information about the difference in scalar values of non-zero coefficients of the sets of coefficients of said previous and present images;
   g. updating a model of the previous image using a scalar erase mode to send information to cause zero values to be written in set of coefficients of the present image in locations where non-zero values exist in the set of coefficients of the previous image.

19. A method of fading video images each of which is represented as a set of coefficients derived from an image using a common transform function:

a. comparing a set of coefficients of the present image with a set of coefficients derived from the previous image;
b. sending information about the difference in scalar values of said sets of coefficients from an encoder to a decoder by:
  b(1) at said encoder, calculating an average ratio of non-zero value coefficients of said set of coefficients of the present image to corresponding coefficients of the set of coefficients of the previous image,
  b(2) sending from said encoder to said decoder an indication of a fade mode of operation together with said average ratio, and
  b(3) at the decoder, adjusting all coefficients of said set of coefficients of the previous image by multiplying each by said average ratio to produce a corresponding coefficient of said set of coefficients of the present image.

20. The method of claim 19 in which the indication to use a fade mode of operation is based on an average value of the differences between the individual ratios and said average ratio.

21. The method of claim 20 in which said average value of the differences is a weighted average.

22. The method of claim 19 in which corrections to coefficients in an adjusted set of coefficients are made by sending scalar values.

23. A method of improving efficiency of image compression transmission in an image compression system which sends information about images using both vectors and scalars comprising:

calculating a run-length from a previous vector point to a subsequent vector point to be the measured run-length between said previous and subsequent vector points minus the number of scalars interposed between said previous and subsequent vector points to improve transmission bit-rate efficiency by increasing the usage of shorter variable length transmission codes corresponding to shorter run-lengths and decreasing the usage of longer variable length transmission codes corresponding to longer run-lengths.

24. Decoder apparatus for decoding encoded and compressed video data, comprising:

a. means for receiving a plurality of difference coefficients formed by subtracting each one of a plurality of coefficients of an array constituting a transform model of a previous image from a corresponding one of a plurality of coefficients of an array of coefficients constituting a transform model of a present image, said transform models generated using a common transform function, some of the difference coefficients being in vector representation, said vector representation including a value and a run-length, and other of the difference coefficients, after a first coefficient, being in scaler representation, said scalar representation constituting a value;
b. means for adding each one of a plurality of received difference coefficients to a corresponding one of a plurality of coefficients of an array of a transform model of the previous image to produce an array of a transform model of the present image; and
c. means for storing a transform model of the present image for subsequent use as a transform model of the previous image.

25. Decoder apparatus of claim 24 further comprising means for performing an inverse transform on a transform model of the present image to produce a digital image.

* * * * *